(12) United States Patent
Shibata et al.

(10) Patent No.: US 8,948,377 B2
(45) Date of Patent: Feb. 3, 2015

(54) ENCRYPTION DEVICE, ENCRYPTION SYSTEM, ENCRYPTION METHOD, AND ENCRYPTION PROGRAM

(75) Inventors: Yoichi Shibata, Tokyo (JP); Hirosato Tsuji, Tokyo (JP); Mitsuru Matsui, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 44 days.

(21) Appl. No.: 13/816,736

(22) PCT Filed: Aug. 24, 2010

(86) PCT No.: PCT/JP2010/064238
§ 371 (c)(1),
(2), (4) Date: Feb. 13, 2013

(87) PCT Pub. No.: WO2012/025988
PCT Pub. Date: Mar. 1, 2012

(65) Prior Publication Data
US 2013/0142328 A1   Jun. 6, 2013

(51) Int. Cl.
*G06F 21/00* (2013.01)
*H04L 9/28* (2006.01)
*H04L 9/06* (2006.01)

(52) U.S. Cl.
CPC .. *H04L 9/28* (2013.01); *H04L 9/06* (2013.01); *H04L 9/0656* (2013.01)
USPC .......................................................... 380/28

(58) Field of Classification Search
CPC .............. H04L 9/06; H04L 9/28; H04L 9/656
USPC .......................................................... 380/28
See application file for complete search history.

(56) References Cited

U.S. PATENT DOCUMENTS

| 1,310,719 A | 7/1919 | Vernam |
| 5,652,662 A | 7/1997 | Nakamura et al. |

(Continued)

FOREIGN PATENT DOCUMENTS

| JP | 7 250057 | 9/1995 |
| JP | 11 17673 | 1/1999 |

(Continued)

OTHER PUBLICATIONS

U.S. Appl. No. 14/118,954, filed Nov. 20, 2013, Shibata et al.

(Continued)

*Primary Examiner* — Hadi Armouche
*Assistant Examiner* — Shahriar Zarrineh
(74) *Attorney, Agent, or Firm* — Oblon, Spivak, McClelland, Maier & Neustadt, L.L.P.

(57) ABSTRACT

The object is to enable cipher communication even when a cipher key in a one-time pad cipher (Vernam cipher) is running short. A one-time pad encrypting part encrypts communication data by the one-time pad cipher by sequentially using part of a one-time pad cipher key stored in a one-time pad cipher key storage part, to generate encrypted data. A block-encrypting part encrypts communication data by a block cipher by using a block-cipher key stored in a block-cipher key storage part, to generate encrypted data. An encryption control part controls whether the communication data is to be encrypted by the one-time pad encrypting part, or by the block-encrypting part, depending on a remaining bit count of the one-time pad cipher key stored in the one-time pad cipher key storage part.

17 Claims, 50 Drawing Sheets

(56) References Cited

U.S. PATENT DOCUMENTS

| | | | |
|---|---|---|---|
| 6,307,940 | B1 | 10/2001 | Yamamoto et al. |
| 6,598,161 | B1* | 7/2003 | Kluttz et al. ................ 713/166 |
| 7,734,757 | B2 | 6/2010 | Maeda et al. |
| 8,160,243 | B1* | 4/2012 | Bean ............................. 380/28 |
| 8,204,231 | B2 | 6/2012 | Maeda et al. |
| 2002/0001386 | A1* | 1/2002 | Akiyama ..................... 380/201 |
| 2003/0091184 | A1* | 5/2003 | Chui ............................. 380/37 |
| 2004/0096056 | A1* | 5/2004 | Boren et al. ................... 380/28 |
| 2006/0177065 | A1* | 8/2006 | Halbert ......................... 380/277 |
| 2006/0227965 | A1* | 10/2006 | Zhu et al. ...................... 380/37 |
| 2008/0013717 | A1* | 1/2008 | Brown et al. .................. 380/30 |
| 2008/0219435 | A1* | 9/2008 | Kodama et al. ............... 380/28 |
| 2008/0260143 | A1* | 10/2008 | Ibrahim ........................ 380/28 |
| 2009/0060197 | A1* | 3/2009 | Taylor et al. .................. 380/277 |
| 2009/0210709 | A1* | 8/2009 | Fujiwara et al. .............. 713/171 |
| 2010/0111297 | A1* | 5/2010 | Pauker et al. ................. 380/37 |
| 2010/0290627 | A1 | 11/2010 | Tsuji et al. |
| 2011/0116627 | A1* | 5/2011 | Deng ............................ 380/44 |
| 2011/0249815 | A1* | 10/2011 | Robshaw et al. ............. 380/28 |

FOREIGN PATENT DOCUMENTS

| | | |
|---|---|---|
| JP | 2000 278260 | 10/2000 |
| JP | 2003 283485 | 10/2003 |
| JP | 2007 258850 | 10/2007 |
| JP | 2008 154019 | 7/2008 |
| JP | 2008 306633 | 12/2008 |

OTHER PUBLICATIONS

International Search Report Issued Oct. 5, 2010 in PCT/JP10/64238 Filed Aug. 24, 2010.

* cited by examiner

ENCRYPTION DEVICE, ENCRYPTION SYSTEM, ENCRYPTION METHOD, AND ENCRYPTION PROGRAM

TECHNICAL FIELD

The present invention relates to a technique that controls the choice as to with which cryptosystem, between a one-time pad cipher and a block cipher, communication data is to be encrypted.

BACKGROUND ART

The one-time pad cipher is one common key cryptosystem with which a key is shared between the transmission side and the reception side. With the one-time pad cipher, encryption is carried out using a cipher key of the same amount (the same bit count) as that of communication data. With the one-time pad cipher, a cipher key is used only once and will not be reused.

A typical example of the one-time pad cipher includes a Vernam cipher, with which bitwise exclusive OR or the like of communication data and a cipher key is calculated and the calculated result is treated as encrypted communication data.

The block cipher is one common key cryptosystem, as with the one-time pad cipher. With the block cipher, data is divided into units (usually having a fixed length) called blocks, and each block is encrypted using a cipher key. Normally, with the block cipher, a plurality of blocks are encrypted by the same cipher key.

Examples of the block cipher include Camellia (registered trademark), AES (Advanced Encryption Standard), and the like.

Cipher communication by means of a one-time pad cipher requires a cipher key of a large amount because it consumes the same amount of the cipher key as that of the communication data. With the one-time pad cipher, once the cipher key is exhausted, cipher communication can no longer be performed.

The one-time pad cipher is, however, undecryptable and is much safer than the block cipher.

Patent literature 1 includes a description on the choice of a cryptosystem to apply between the one-time pad cipher and the block cipher depending on the significance of the communication data to be encrypted. This reduces the consumption of the cipher key in the one-time pad cipher.

Patent literature 2 includes a description on how the accumulated amount of the cipher key of each terminal device is monitored so that a cipher key is generated with a higher priority for a terminal device having a small accumulation amount. This is aimed at prevention of the exhaustion of the cipher key in a particular terminal device.

CITATION LIST

Patent Literature

Patent Literature 1: JP 2007-258850
Patent Literature 2: JP 2008-306633

SUMMARY OF INVENTION

Technical Problem

The method described in Patent literature 1 suppresses consumption of the cipher key for a one-time pad cipher by choosing a cryptosystem to apply depending on the significance of the communication data. Even with the method described in Patent literature 1, however, there may be a case where the cipher key for the one-time pad cipher is running short and cipher communication cannot be performed.

The significance of the communication data is a matter of a subjective criterion. The user or the administrator must judge the significance of the communication data which is the encryption target, at the start of or before the communication. For this reason, the user must judge the significance during a period since the communication data is inputted until the communication data is encrypted, and the entire process concerning the cipher communication cannot be automated.

Furthermore, depending on the type of the communication data, the significance cannot be judged in advance, as in a case where a voice communication includes a significant conversation. Therefore, it is not generally effective to switch the cryptosystem based on the significance of the communication data which is the encryption target.

According to the method described in Patent literature 2, if the terminal device is, for example, a mobile terminal which is not capable of continuous communication, it may be impossible to supplement the lack of the cipher key. Hence, a case may arise where cipher communication cannot be performed.

It is an object of the present invention to enable cipher communication even if the cipher key for the one-time pad cipher is running short.

Solution to Problem

An encryption device according to the present invention includes:

a one-time pad cipher key storage part which stores a one-time pad cipher key formed of a plurality of bits and used in a one-time pad cipher;

a one-time pad encrypting part which encrypts communication data by the one-time pad cipher by sequentially using part of the one-time pad cipher key stored in the one-time pad cipher key storage part, to generate encrypted data;

a block-cipher key storage part which stores a block-cipher key used in a block cipher;

a block-encrypting part which encrypts the communication data by the block cipher by using the block-cipher key stored in the block-cipher key storage part, to generate encrypted data; and an encryption control part which controls whether the communication data is to be encrypted by the one-time pad encrypting part, or by the block-encrypting part, depending on a remaining bit count of the one-time pad cipher key stored in the one-time pad cipher key storage part.

Advantageous Effects of Invention

An encryption device according to the present invention controls whether to use a one-time pad cipher or a block cipher, depending on the remaining amount of the one-time pad cipher key. Hence, a control operation can be performed such that when the one-time pad cipher key is running short, cipher communication is performed using the block cipher. Even if the cipher key for the one-time pad cipher is running short, cipher communication can be performed.

DESCRIPTION OF EMBODIMENTS

Embodiments of the present invention will be described with reference to the drawings.

In the following description, the processing device is a CPU 911 to be described later, or the like. The storage device is a storage device such as a ROM 913, a RAM 914, or a magnetic disk device 920 to be described later. Namely, the processing device and the storage device are hardware.

The following description will be made by employing a Vernal cipher as an example of the one-time pad cipher. Another one-time pad cipher may naturally be employed instead. In that case, the Vernam cipher in the following description may be replaced with the one-time pad cipher.

Embodiment 1

Embodiment 1 will describe a technique which switches the cryptosystem from the Vernam cipher to the block cipher such as Camellia (registered trademark), AES, or the like when the cipher key for the Vernam cipher (to be referred to as the Vernam-cipher key hereinafter) is exhausted. This enables continuation of the cipher communication even in a period before the Vernam-cipher key is replenished, without causing interruption of the cipher communication due to the shortage of the Vernam-cipher key.

In Embodiment 1, the cryptosystem is chosen depending on the remaining amount (remaining bit count) of the Vernam-cipher key. The remaining amount of the Vernam-cipher key is information that the device can learn easily. Hence, a system can be realized that switches the cryptosystem automatically based on the remaining amount of the Vernam-cipher key, so that the cryptosystem can be switched without requiring the user of the device to perform an operation for switching the cryptosystem.

Figure 1:
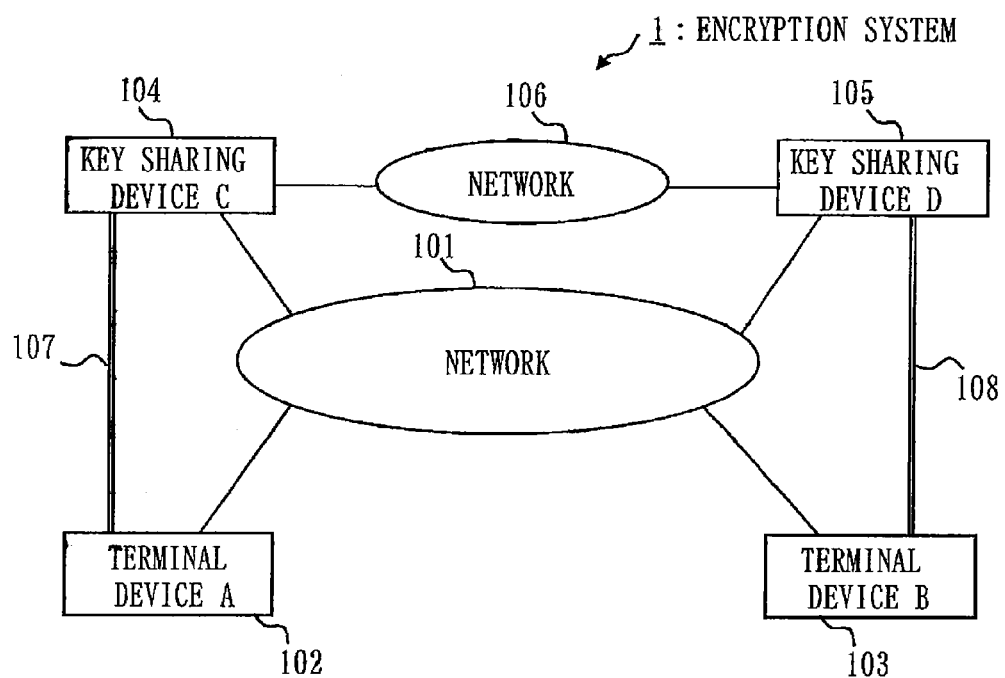
FIG. 1 is a schematic diagram of an encryption system 1 to which a communication scheme according to Embodiment 1 can be applied.

FIG. 1 is a schematic diagram of an encryption system 1 to which a communication scheme according to Embodiment 1 can be applied.

A network 101 such as the Internet is connected to a terminal device A 102 and a terminal device B 103. A key sharing device C 104 and a key sharing device D 105 are connected to the network 101, or a network 106 which is not connected to the network 101 physically or logically. Furthermore, the terminal device A 102 and the key sharing device C 104 are connected to each other via a communication cable 107 such as a USB (Universal Serial Bus) cable. Similarly, the terminal device B 103 and the key sharing device D 105 are connected to each other via a communication cable 108.

An example will be described hereinafter where cipher communication takes place between the terminal device A 102 and the terminal device B 103 using a Vernam-cipher key shared by the key sharing device C 104 and the key sharing device D 105.

Note that each of the terminal device A 102 and the terminal device B 103 is a transmission-side communication device (encryption device) which transmits encrypted data, and at the same time a reception-side communication device (decryption device) which receives the encrypted data. In the following description, the terminal device A 102 is an example of the transmission-side communication device and the terminal device B 103 is an example of the reception-side communication device.

Also, note that the terminal device A 102 acquires the Vernam-cipher key from the key sharing device C 104, and that the terminal device B 103 acquires the Vernam-cipher key from the key sharing device D 105.

First, a method with which key sharing devices share the Vernam-cipher key will be described.

Figure 2:
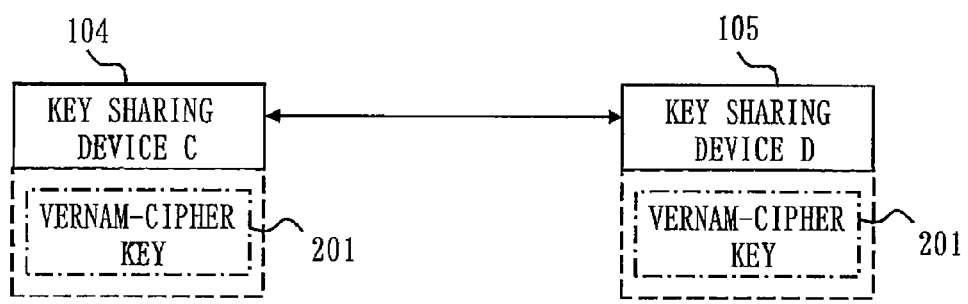
FIG. 2 is a diagram briefly showing the operation of a case where a key sharing device C 104 and a key sharing device D 105 share a Vernam-cipher key via a network 101, or a network 106 which is not connected to the network 101 physically or logically.

FIG. 2 is a diagram briefly showing the operation of a case where the key sharing device C 104 and the key sharing device D 105 share the Vernam-cipher key via the network 101, or the network 106 which is not connected to the network 101 physically or logically.

The key sharing device C 104 and the key sharing device D 105 share a Vernam-cipher key 201 by a predetermined method (key sharing algorithm) via the network 101 or the network 106. Any method may be employed to share the Vernam-cipher key 201. For example, the key sharing device C 104 and the key sharing device D 105 may be connected to each other via a physically or logically secure communication path, and may share the Vernam-cipher key 201. In Embodiment 1, assume that the key is shared by quantum cipher communication.

The operation of a case will be briefly described wherein the terminal device acquires the Vernam-cipher key from the key sharing device.

Figure 3:
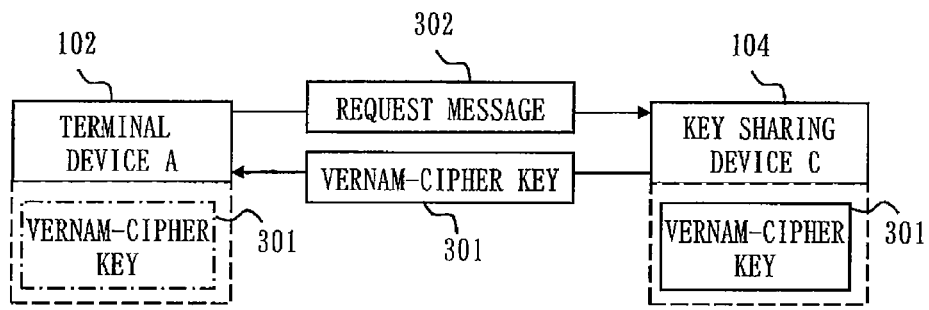
FIG. 3 is a diagram briefly showing the operation of a case where a terminal device A 102 acquires a Vernam-cipher key 301 from the key sharing device C 104 via a communication cable 107.

FIG. 3 is a diagram briefly showing the operation of a case where the terminal device A 102 acquires a Vernam-cipher key 301 from the key sharing device C 104 via the communication cable 107.

First, the terminal device A 102 transmits a Vernam-cipher key request message 302 to the key sharing device C 104. After receiving the Vernam-cipher key request message 302, the key sharing device C 104 transmits the Vernam-cipher key 301 it holds, to the terminal device A 102. The terminal device A 102 which has received the Vernam-cipher key 301 stores the Vernam-cipher key 301 in a storage device.

In the same manner, the terminal device B 103 acquires the Vernam-cipher key from the key sharing device D 105 via the communication cable 108.

The operation of a case will be briefly described where the terminal device A 102 and the terminal device B 103 start cipher communication using the Vernam cipher, and switch to the cipher communication scheme using the block cipher at the point when the cipher key for the Vernam cipher starts to run short.

Figure 4:
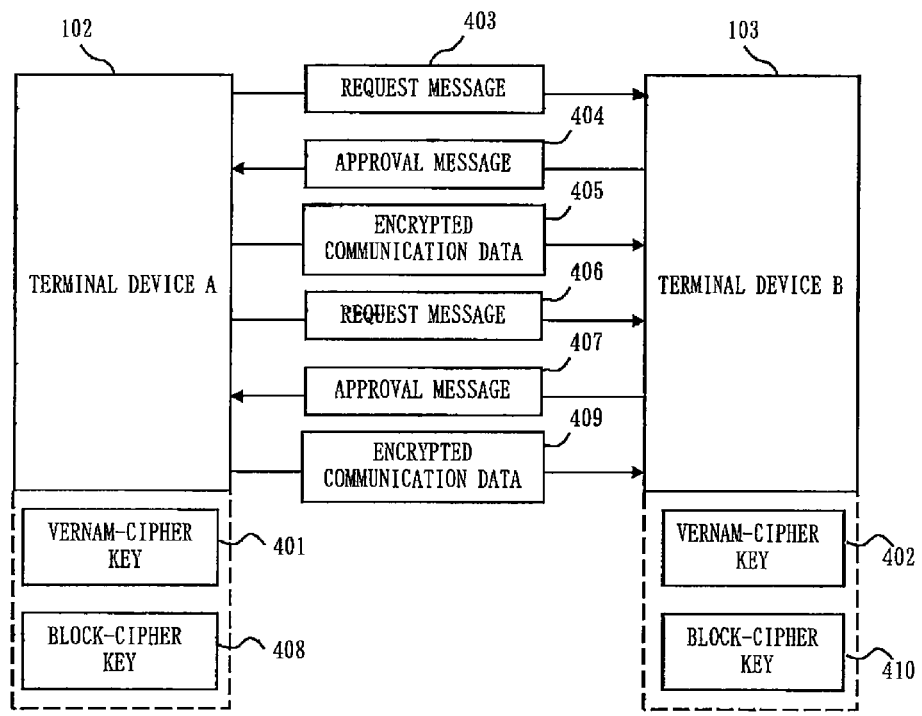
FIG. 4 is a diagram briefly showing the operation of a case where the terminal device A 102 and a terminal device B 103 start cipher communication using a Vernam cipher and switch to the cipher communication scheme using the block cipher when the cipher key for the Vernam cipher starts to run short.

FIG. 4 is a diagram briefly showing the operation of the case where the terminal device A 102 and the terminal device B 103 start cipher communication using the Vernam cipher, and switch to the cipher communication scheme using the block cipher at the point when the cipher key for the Vernam cipher starts to run short.

As the preparation for cipher communication, the terminal device A 102 holds a cipher key 401 for the Vernam cipher, and the terminal device B 103 holds a Vernam-cipher key 402. The Vernam-cipher key 401 held by the terminal device A 102 and the Vernam-cipher key 402 held by the terminal device B 103 are acquired from the key sharing device C 104 and the key sharing device D 105, respectively, by the method described above. In Embodiment 1, assume that the Vernam-cipher key 401 and the Vernam-cipher key 402 are the same.

The terminal device A 102 holds a block-cipher key 408 for the block cipher. The terminal device B 103 also holds a block-cipher key 410. Assume that the block-cipher key 408 held by the terminal device A 102 and the block-cipher key 410 held by the terminal device B 103 are the same. A method of sharing the block-cipher key between the terminal device A 102 and the terminal device B 103 will be described in a later embodiment.

First, the terminal device A 102 checks the remaining amount of the Vernam-cipher key 401 it holds. Assume that the Vernam-cipher key 401 is left. Based on the remaining amount of the Vernam-cipher key 401, the terminal device A 102 calculates the data communication amount that can be handled by the Vernam cipher. The terminal device A 102 transmits a Vernam-cipher communication request message 403 to the terminal device B 103.

The terminal device B 103 which has received the Vernam-cipher communication request message 403 checks the remaining amount of the Vernam-cipher key 402 it holds. Assume that the Vernam-cipher key 402 is left in the same remaining amount as the Vernam-cipher key 401 is. Thus, based on the remaining amount of the Vernam-cipher key 402, the terminal device B 103 calculates the data communication amount that can be handled by the Vernam cipher. The terminal device B 103 transmits a Vernam-cipher communication approval message 404 to the terminal device A 102.

The terminal device A 102 which has received the Vernam-cipher communication approval message 404 encrypts the communication data by the Vernam cipher using the Vernam-cipher key 401, to generate encrypted communication data 405. The terminal device A 102 transmits the generated encrypted communication data 405 to the terminal device B 103.

The terminal device B 103 which has received the encrypted communication data 405 decrypts the encrypted communication data 405 by the Vernam-cipher key 402, to obtain communication data. As the Vernam-cipher key 401 and the Vernam-cipher key 402 are the same, the encrypted communication data 405 encrypted by the Vernam-cipher key 401 can be decrypted by the Vernam-cipher key 402.

When generating the encrypted communication data 405 in the terminal device A 102, if encryption need be performed to a degree exceeding the data communication amount that can be handled by the Vernam cipher, the terminal device A 102 transmits a block-cipher switching request message 406 to the terminal device B 103.

The terminal device B 103 which has received the block-cipher switching request message 406 transmits a block-cipher switching approval message 407 to the terminal device A 102.

The terminal device A 102 which has received the block-cipher switching approval message 407 encrypts the communication data by the block-cipher key 408, to generate encrypted communication data 409. The terminal device A 102 transmits the generated encrypted communication data 409 to the terminal device B 103.

The terminal device B 103 which has received the encrypted communication data 409 decrypts the encrypted communication data 409 by the block-cipher key 410, to obtain communication data. As the block-cipher key 408 and the block-cipher key 410 are the same, the encrypted communication data 409 encrypted by block-cipher key 408 can be decrypted by the block-cipher key 410.

Figure 5:
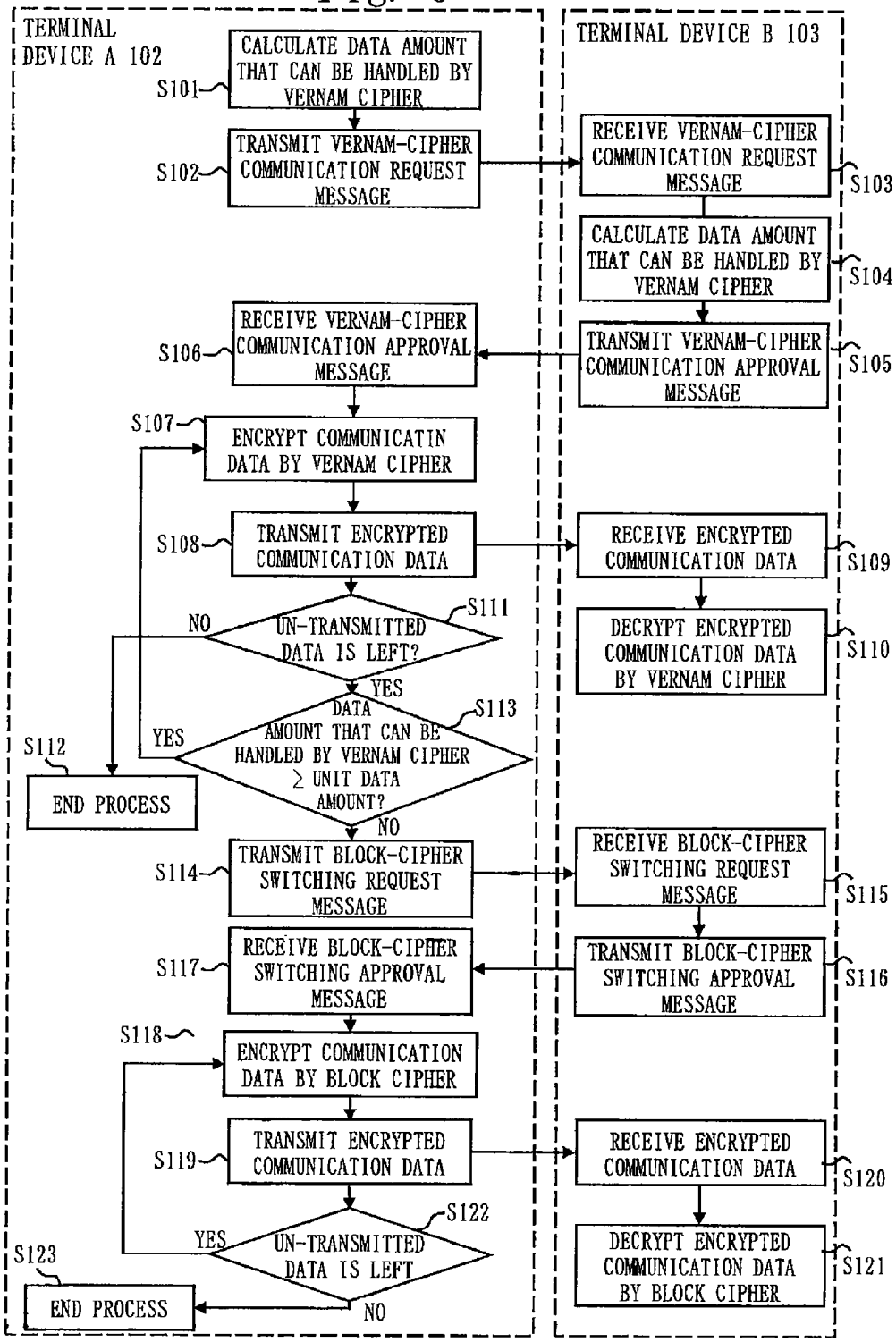
FIG. 5 is a flowchart showing the communication process flow of FIG. 4.

The communication process of FIG. 4 will be described in detail. FIG. 5 is a flowchart showing the communication process flow of FIG. 4.

The terminal device A 102 checks the amount (bit count) of the Vernam-cipher key 401 it holds, and calculates the data amount that can be cipher-communicated by the Vernam cipher (S101). The terminal device A 102 then transmits the Vernam-cipher communication request message 403 to the terminal device B 103 (S102).

The terminal device B 103 receives the Vernam-cipher communication request message 403 from the terminal device A 102 (S103). Then, the terminal device B 103 checks the amount of the Vernam-cipher key 402 it holds, and calculates the data amount that can be cipher-communicated by the Vernam cipher (S104). The terminal device B 103 transmits the Vernam-cipher communication approval message 404 to the terminal device A 102 (S105).

The terminal device A 102 receives the Vernam-cipher communication approval message 404 from the terminal device B 103 (S106). Then, the terminal device A 102 encrypts data of a unitary data amount, out of the communication data by the Vernam-cipher key 401, to generate the encrypted communication data 405 (S107). Note that the data of the unitary data amount is data having a predetermined bit count, or data of a predetermined unit, for example, 1-file data. For example, if voice call data of a mobile phone is concerned, data of the unitary data amount is voice call data of a short period of time of, for example, about 10 to 20 milliseconds. The terminal device A 102 transmits the encrypted communication data 405 to the terminal device B 103 (S108).

The terminal device B 103 receives the encrypted communication data 405 from the terminal device A 102 (S109). Then, the terminal device B 103 decrypts the encrypted communication data 405 by the Vernam-cipher key 402, thus obtaining communication data (S110).

Subsequently, the terminal device A 102 checks whether there is un-transmitted communication data (S111). If there is no un-transmitted communication data (NO in S111), the terminal device A 102 ends the process (S112). If there is un-transmitted communication data (YES in S111), the terminal device A 102 advances to the process of S113.

The terminal device A 102 checks whether the data amount that can be cipher-communicated by the Vernam cipher is equal to or larger than the unitary data amount encrypted by one encryption (S113). At this time, the terminal device A 102 calculates the data amount that can be currently cipher-communicated by the Vernam cipher, by subtracting the data amount of the communication data that has been transmitted to the terminal device B 103 as the encrypted communication data so far, from the data amount calculated in S101 that can be cipher-communicated by the Vernam cipher.

If the data amount that can be cipher-communicated by the Vernam cipher is equal to or larger than the unitary data amount (YES in S113), the terminal device A 102 returns to the process of S107. If the data amount that can be cipher-communicated by the Vernam cipher is smaller than the unitary data amount (NO in S113), the terminal device A 102 transmits the block-cipher switching request message 406 to the terminal device B 103 (S114).

The terminal device B 103 receives the block-cipher switching request message 406 (S115). Then, the terminal device B 103 transmits the block-cipher switching approval message 407 to the terminal device A 102 (S116).

The terminal device A 102 receives the block-cipher switching approval message 407 (S117). Then, the terminal device A 102 encrypts data of the unitary data amount, out of the communication data by the block-cipher key 408, to generate the encrypted communication data 409 (S118). The terminal device A 102 transmits the encrypted communication data 409 to the terminal device B 103 (S119).

The terminal device B 103 receives the encrypted communication data 409 (S120). Then, the terminal device B 103 decrypts the encrypted communication data 409 by the block-cipher key 410, to obtain the communication data (S121).

Subsequently, the terminal device A 102 checks whether there is un-transmitted communication data (S122). If there is no un-transmitted communication data (NO in S122), the terminal device A 102 ends the process (S123). If there is un-transmitted communication data (YES in S122), the terminal device A 102 returns to the process of S118.

The operation of a case will be briefly described where cipher communication by the block cipher is to be started when the Vernam-cipher key is running short at the start of communication and cipher communication by the Vernam cipher cannot be performed.

Figure 6:
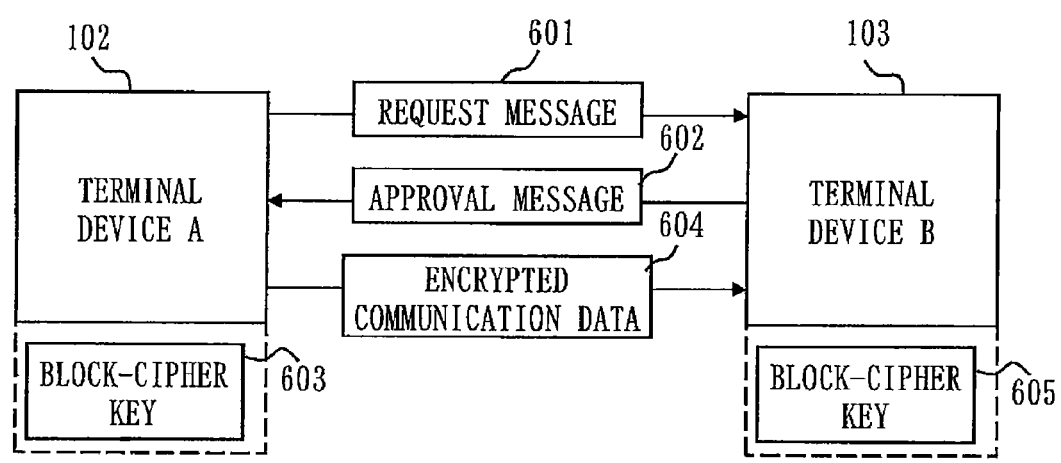
FIG. 6 is a diagram briefly showing the operation of a case where the terminal device A 102 and the terminal device B 103 start cipher communication by the block cipher because the Vernam-cipher key is running short at the start of the cipher communication.

FIG. 6 is a diagram briefly showing the operation of a case where the terminal device A 102 and the terminal device B 103 start cipher communication using the block cipher because the Vernam-cipher key is running short at the start of the cipher communication.

The terminal device A 102 has a block-cipher key 603 for the block cipher. The terminal device B 103 also has a block-cipher key 605. Note that the block-cipher key 603 held by the terminal device A 102 and the block-cipher key 605 held by the terminal device B 103 are the same. A method of sharing the block-cipher key between the terminal device A 102 and the terminal device B 103 will be described in a later embodiment.

First, the terminal device A 102 checks the amount of the Vernam-cipher key it holds. Assume that the Vernam-cipher key is exhausted (0 bit). Hence, the terminal device A 102 transmits a block-cipher communication request message 601 to the terminal device B 103.

The terminal device B 103 which has received the block-cipher communication request message 601 transmits a block-cipher communication approval message 602 to the terminal device A 102.

The terminal device A 102 which has received the block-cipher communication approval message 602 encrypts the communication data by the block cipher using the block-cipher key 603, to generate encrypted communication data 604. Then, the terminal device A 102 transmits the generated encrypted communication data 604 to the terminal device B 103.

The terminal device B 103 which has received the encrypted communication data 604 decrypts the encrypted communication data 604 by the block-cipher key 605, to obtain communication data. Since the block-cipher key 603 and the block-cipher key 605 are the same, the encrypted communication data 604 encrypted by the block-cipher key 603 can be decrypted by the block-cipher key 605.

Figure 7:
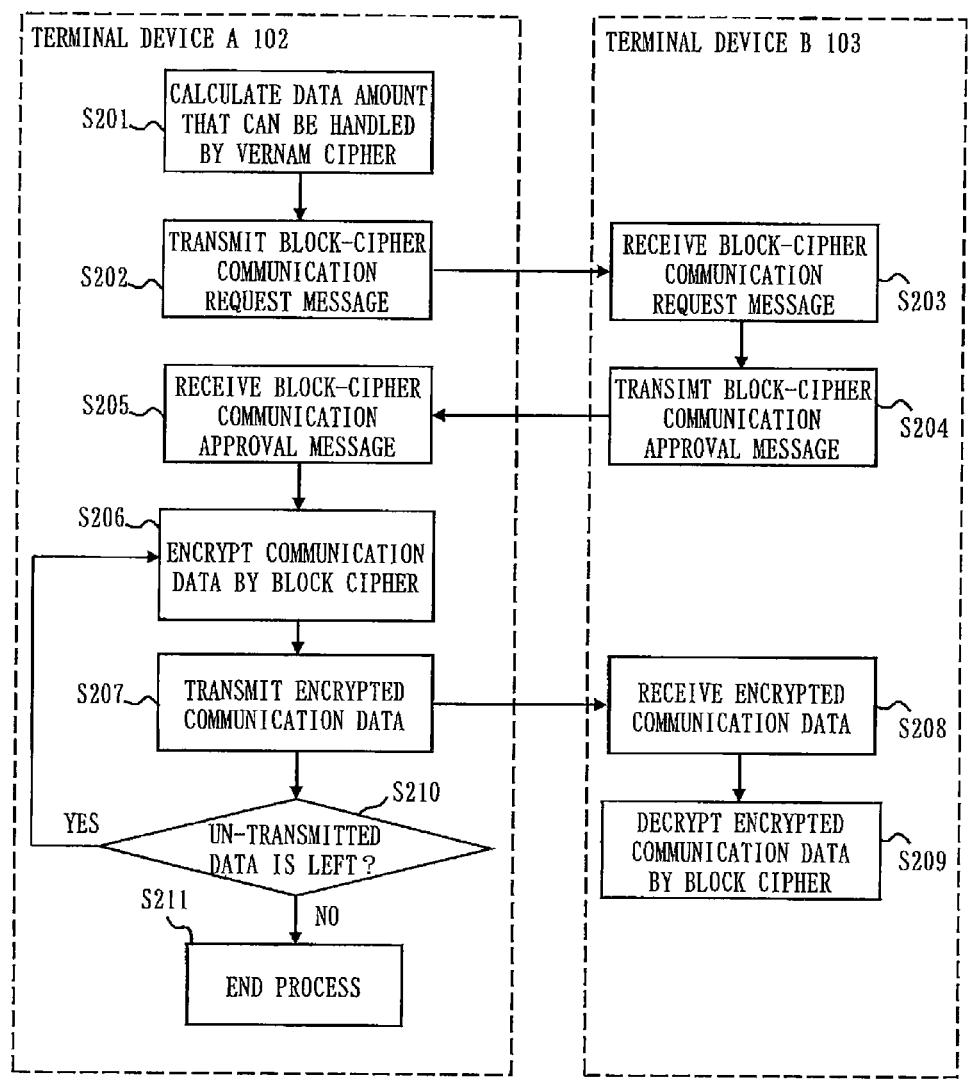
FIG. 7 is a flowchart showing the communication process flow of FIG. 6.

The communication process of FIG. 6 will be described in detail. FIG. 7 is a flowchart showing the communication process flow of FIG. 6.

The terminal device A 102 checks the amount of the Vernam-cipher key it holds, and learns that the Vernam-cipher key is running short (S201). When the data amount that can be cipher-communicated by the Vernam cipher is smaller than the unitary data amount encrypted by one encryption, it is determined that the Vernam-cipher key is running short. The terminal device A 102 transmits the block-cipher communication request message 601 to the terminal device B 103 (S202).

The terminal device B 103 receives the block-cipher communication request message 601 from the terminal device A 102 (S203). The terminal device B 103 transmits the block-cipher communication approval message 602 to the terminal device A 102 (S204).

The terminal device A 102 receives the block-cipher communication approval message 602 from the terminal device B 103 (S205). Then, the terminal device A 102 encrypts data of the unitary data amount, out of the communication data by the block-cipher key 603, to generate the encrypted communication data 604 (S206). The terminal device A 102 transmits the encrypted communication data 604 to the terminal device B 103 (S207).

The terminal device B 103 receives the encrypted communication data 604 (S208). Then, the terminal device B 103 decrypts the encrypted communication data 604 by the block-cipher key 605, to obtain communication data (S209).

Subsequently, the terminal device A 102 checks whether there is un-transmitted communication data (S210). If there is no un-transmitted communication data (NO in S210), the terminal device A 102 ends the process (S211). If there is un-transmitted communication data (YES in S210), the terminal device A 102 returns to the process of S206.

The functions of the terminal device A 102 and the terminal device B 103 in Embodiment 1 will be described.

Figure 8:
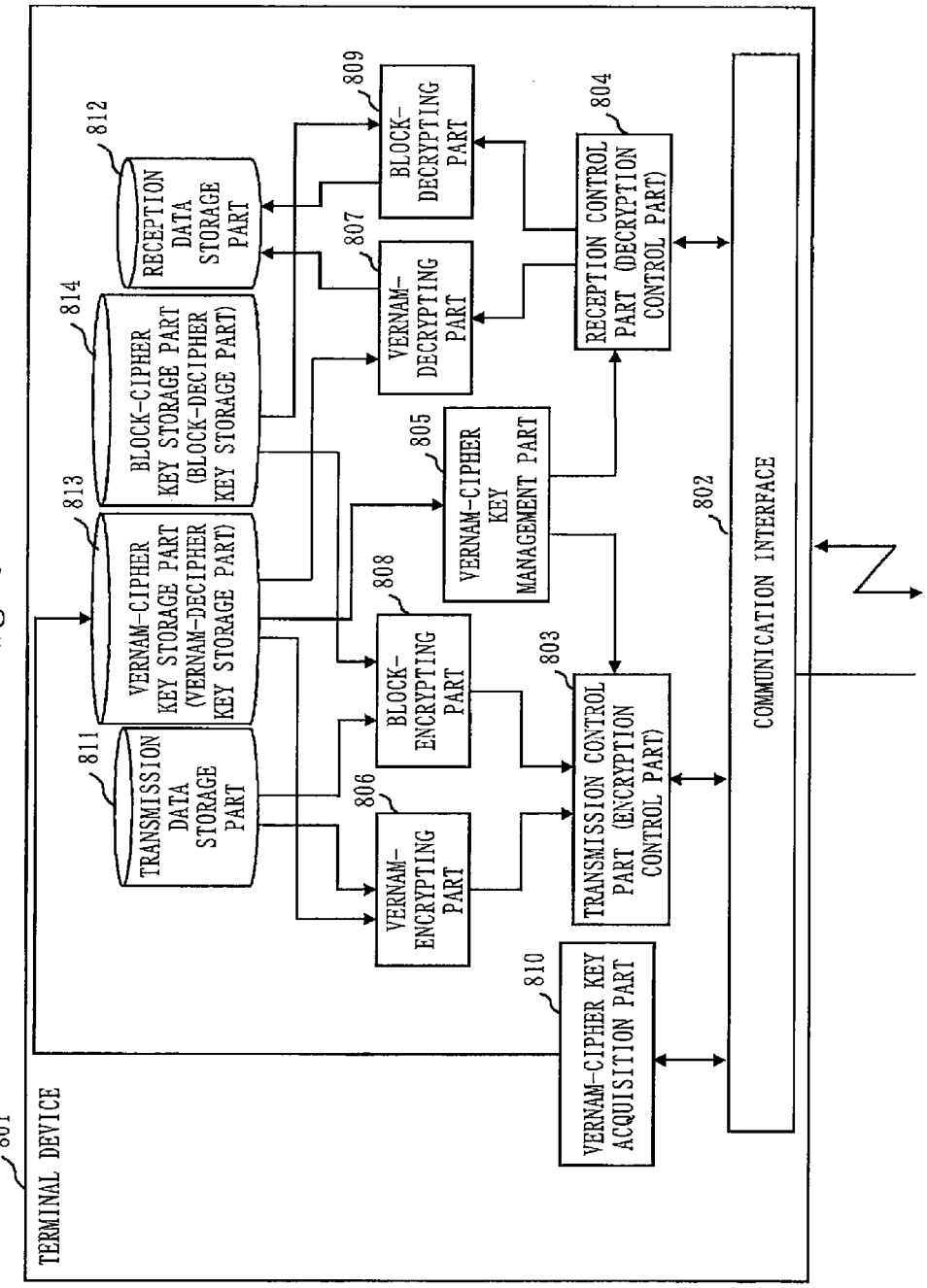
FIG. 8 is a function block diagram showing the functional configuration of the terminal device A 102 and terminal device B 103 in Embodiment 1.

FIG. 8 is a function block diagram showing the functional configuration of the terminal device A 102 and terminal device B 103 in Embodiment 1. The terminal device A 102 and the terminal device B 103 have the same functional configuration. Hence, a terminal device 801 will be described hereinafter to represent both the terminal device A 102 and the terminal device B 103.

The terminal device 801 is provided with a communication interface 802, a transmission control part 803 (encryption control part), a reception control part 804 (decryption control part), a Vernam-cipher key management part 805, a Vernam-encrypting part 806, a Vernam-decrypting part 807, a block-encrypting part 808, a block-decrypting part 809, a Vernam-cipher key acquisition part 810, a transmission data storage part 811, a reception data storage part 812, a Vernam-cipher key storage part 813 (Vernam-decipher key storage part), and a block-cipher key storage part 814 (block-decipher key storage part).

The communication interface 802 is a communication device that communicates with an external device.

More specifically, the communication interface 802 is a device serving to receive the Vernam-cipher key from the key sharing device C 104 and the key sharing device D 105.

The communication interface 802 is a device serving to transmit encrypted communication data to a reception-side terminal device when the terminal device 801 is on the transmission side of cipher communication, and to receive encrypted communication data from a transmission-side terminal device when the communication interface 802 is on the reception side of cipher communication.

The transmission control part 803 refers to the remaining amount information of the Vernam-cipher key obtained from the Vernam-cipher key management part 805, and controls, by the processing device, which one of the Vernam-encrypting part 806 and the block-encrypting part 808 is to encrypt the communication data. The transmission control part 803 also transmits the encrypted communication data which is obtained through encryption by the Vernam-encrypting part 806 or block-encrypting part 808.

The reception control part 804 receives the encrypted communication data. Then, the reception control part 804 refers to the remaining amount information of the Vernam key obtained from the Vernam-cipher key management part 805, and controls, by the processing device, which one of the Vernam-decrypting part 807 and the block-decrypting part 809 is to decrypt the received encrypted communication data.

The Vernam-cipher key management part 805 provides the information on the remaining amount of the Vernam-cipher key, which is stored in the Vernam-cipher key storage part 813 to the transmission control part 803 and the reception control part 804. More specifically, the Vernam-cipher key management part 805 provides information indicating whether or not the remaining amount of the Vernam-cipher key is running short.

When the data amount that can be cipher-communicated by the Vernam cipher is smaller than the unitary data amount encrypted by one encryption, the Vernam-cipher key management part 805 determines that the Vernam-cipher key is running short.

The Vernam-encrypting part 806 acquires the communication data from the transmission data storage part 811 and acquires the Vernam-cipher key from the Vernam-cipher key storage part 813. The Vernam-encrypting part 806, by the processing device, encrypts the communication data in accordance with the Vernam cipher using the Vernam-cipher key, to generate encrypted communication data. The obtained encrypted communication data is transferred to the transmission control part 803.

The Vernam-decrypting part 807 acquires the Vernam-cipher key from the Vernam-cipher key storage part 813 and acquires the encrypted communication data from the reception control part 804. The Vernam-decrypting part 807, by the processing device, decrypts the encrypted communication data by using the Vernam-cipher key, to generate communication data. The obtained communication data is stored in the reception data storage part 812.

The block-encrypting part 808 acquires communication data from the transmission data storage part 811 and acquires a block-cipher key from the block-cipher key storage part 814. The block-encrypting part 808, by the processing device, encrypts the communication data in accordance with the block cipher using the block-cipher key, to generate encrypted communication data. The obtained encrypted communication data is transferred to the transmission control part 803.

The block-decrypting part 809 acquires the block-cipher key from the block-cipher key storage part 814 and acquires the encrypted communication data from the reception control part 804. The block-decrypting part 809, by the processing device, decrypts the encrypted communication data by using the block-cipher key, to generate communication data. The obtained communication data is stored in the reception data storage part 812.

The Vernam-cipher key acquisition part 810 acquires the Vernam-cipher key from a key sharing device such as the key sharing device C 104 or key sharing device D 105, and stores the obtained Vernam-cipher key in the Vernam-cipher key storage part 813.

The transmission data storage part 811 is a storage device that stores communication data which is to be transmitted to the reception-side terminal device.

The reception data storage part 812 is a storage device that stores communication data acquired from the transmission-side terminal device.

The Vernam-cipher key storage part 813 is a storage device that stores the Vernam-cipher key.

The block-cipher key storage part 814 is a storage device that stores the block-cipher key.

The process of the terminal device A 102 which is the transmission-side terminal device will be described in detail.

Figure 9:
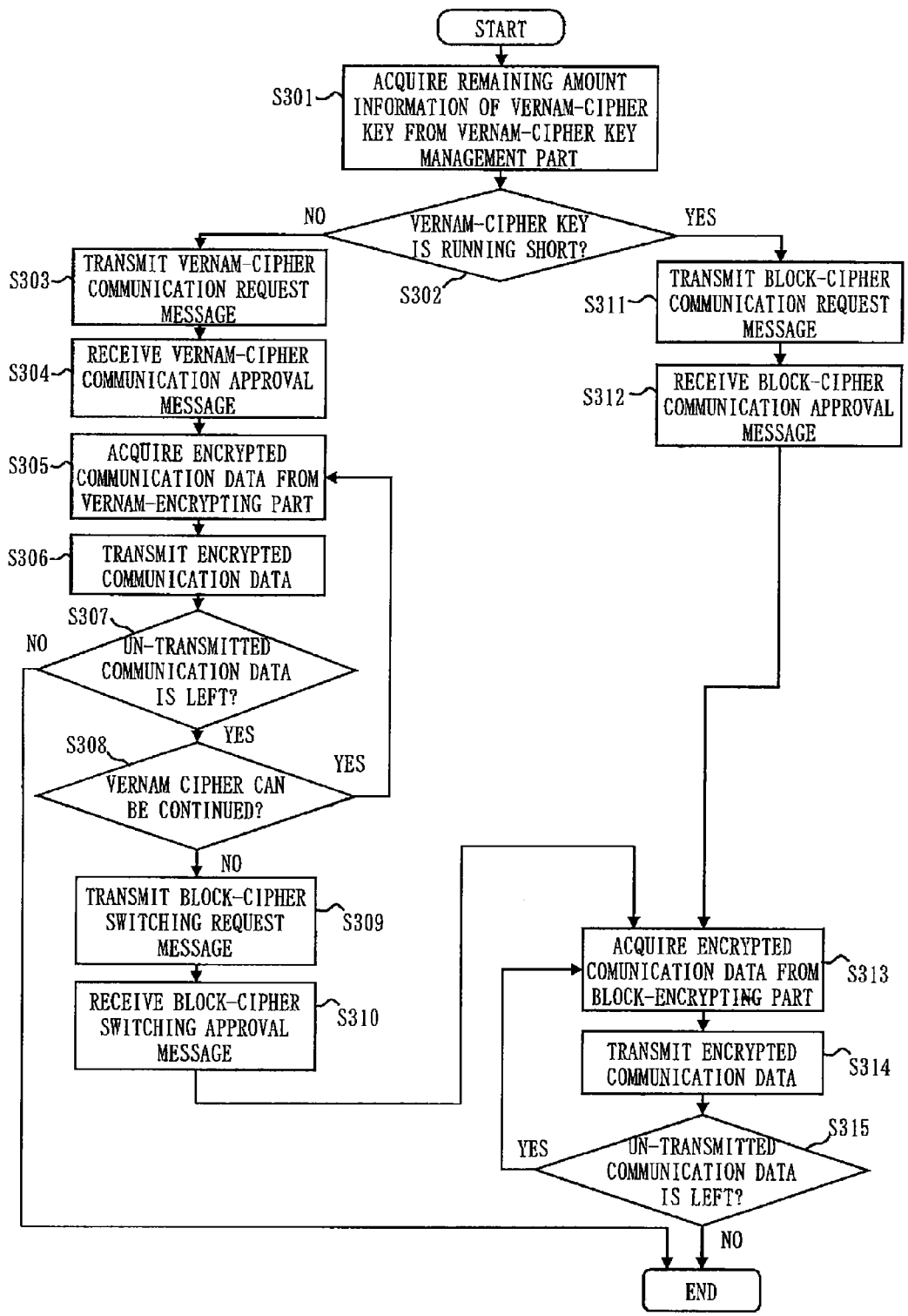
FIG. 9 is a flowchart showing the process flow of a transmission control part 803 of a terminal device 801.

FIG. 9 is a flowchart showing the process flow of the transmission control part 803 of the terminal device 801.

The transmission control part 803 acquires remaining amount information indicating whether or not the remaining amount of the Vernam-cipher key is running short, from the Vernam-cipher key management part 805 (S301). If the remaining amount of the Vernam-cipher key is not running short (NO in S302), the transmission control part 803 advances to the process of S303. If the remaining amount of the Vernam-cipher key is running short (YES in S302), the transmission control part 803 advances to the process of S311 (S302).

The process from S303 through S310 will be described.

The transmission control part 803 transmits a Vernam-cipher communication request message to the terminal device B 103 via the communication interface 802 (S303) and receives a Vernam-cipher communication approval message from the terminal device B 103 (S304). The transmission control part 803 then causes the Vernam-encrypting part 806 to encrypt data of the unitary data amount, out of the communication data, to acquire encrypted communication data (S305). The transmission control part 803 transmits the acquired encrypted communication data to the terminal device B 103 via the communication interface 802 (S306).

Subsequently, the transmission control part 803 checks whether there is un-transmitted communication data (S307). If there is no un-transmitted communication data (NO in S307), the transmission control part 803 ends the process. If there is un-transmitted data (YES in S307), the transmission control part 803 advances to the process of S308.

The transmission control part 803 acquires the remaining amount information indicating whether or not the remaining amount of the Vernam-cipher key is running short, from the Vernam-cipher key management part 805, and determines whether or not cipher communication by the Vernam cipher can be continued (S308). If the communication can be continued (YES in S308), the transmission control part 803 returns to the process of S305. If the communication cannot be continued (NO in S308), the transmission control part 803 advances to the process of S309.

The transmission control part 803 transmits a block-cipher switching request message to the terminal device B 103 via the communication interface 802 (S309), receives a block-cipher switching approval message from the terminal device B 103 (S310), and advances to the process of S313.

The process from S311 through 312 will be described.

The transmission control part 803 transmits a block-cipher communication request message to the terminal device B 103 (S311), receives a block-cipher communication approval message from the terminal device B 103 (S312), and advances to the process of S313.

The process from S313 downward will be described.

The transmission control part 803 causes the block-encrypting part 808 to encrypt data of the unitary data amount, out of the communication data, to acquire encrypted communication data (S313). The transmission control part 803 then transmits the encrypted communication data to the terminal device B 103 (S314).

Subsequently, the transmission control part 803 checks whether there is un-transmitted communication data (S315). If there is no un-transmitted communication data (NO in S315), the transmission control part 803 ends the process. If there is un-transmitted data (YES in S315), the transmission control part 803 returns to the process of S313.

The process of the terminal device B 103 which is the reception-side terminal device will be described in detail.

Figure 10:
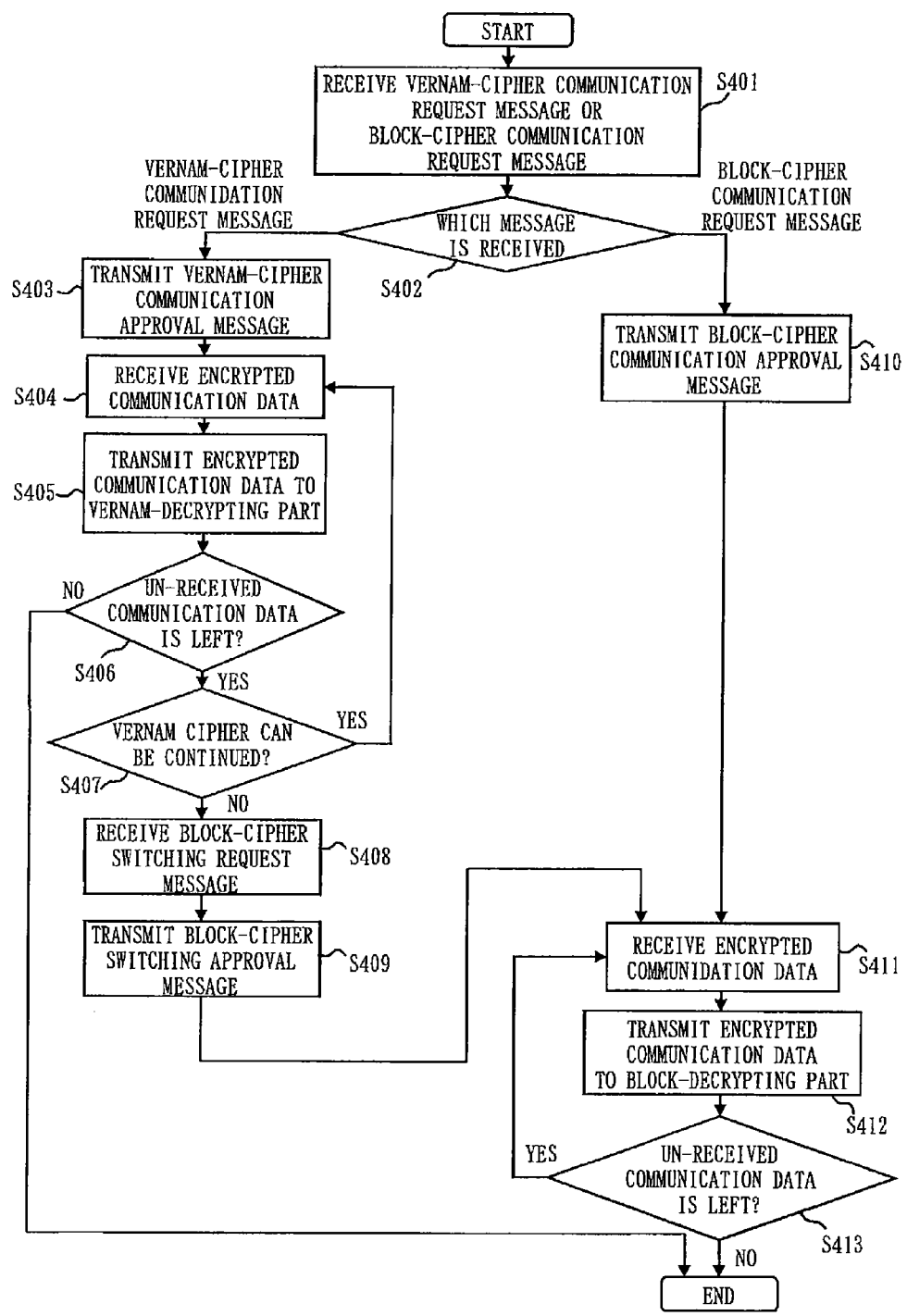
FIG. 10 is a flowchart showing the process flow of a reception control part 804 of the terminal device 801.

FIG. 10 is a flowchart showing the process flow of the reception control part 804 of the terminal device 801.

The reception control part 804 receives a Vernam-cipher communication request message or block-cipher communication request message from the terminal device A 102 via the communication interface 802 (S401). If the reception control part 804 receives a Vernam-cipher request message, it advances to the process of S403. If the reception control part 804 receives a block-cipher request message, it advances to the process of S410 (S402).

The process from S403 through S409 will be described.

The reception control part 804 transmits a Vernam-cipher approval message to the terminal device A 102 via the communication interface 802 (S403) and receives encrypted communication data from the terminal device A 102 (S404). The reception control part 804 transmits the received encrypted communication data to the Vernam-decrypting part 807 to have it decrypted, to generate communication data (S405). The generated communication data is stored in the reception data storage part 812.

Subsequently, the reception control part 804 checks whether there is un-received communication data (S406). If there is no un-received communication data (NO in S406), the reception control part 804 ends the process. If there is un-received communication data (YES in S406), the reception control part 804 advances to the process of S407.

Whether or not there is un-received communication data is determined based on, for example, which one of the next encrypted data and a block-cipher switching request message has been transmitted during a predetermined period of time.

The reception control part 804 acquires the remaining amount information indicating whether or not the remaining amount of the Vernam-cipher key is running short, from the Vernam-cipher key management part 805, and checks whether or not cipher communication by the Vernam cipher can be continued (S407). If the communication can be continued (YES in S407), the reception control part 804 returns to the process of S404. If the communication cannot be continued (NO in S407), the reception control part 804 advances to the process of S408.

The reception control part 804 receives the block-cipher switching request message from the terminal device A 102 (S408), transmits a block-cipher switching approval message to the terminal device A 102 (S409), and advances to the process of S411.

The process of S410 will be described.

The reception control part 804 transmits a block-cipher communication approval message to the terminal device A 102 (S410) and advances to the process of S411.

The process from S411 downward will be described.

The reception control part 804 receives the encrypted communication data from the terminal device A 102 (S411). The reception control part 804 transmits the received encrypted communication data to the block-decrypting part 809 to have it decrypted, to generate communication data (S412). The generated communication data is stored in the reception data storage part 812.

Subsequently, the reception control part 804 checks whether there is un-transmitted communication data (S413). If there is no un-transmitted communication data (NO in S413), the reception control part 804 ends the process. If there is un-transmitted communication data (YES in S413), the reception control part 804 returns to the process of S411.

In the above description, the reception control part 804 determines in S407 whether or not cipher communication by the Vernam cipher can be continued, to decide whether cipher communication by the Vernam cipher is to be continued or the cipher communication is to be switched to that by the block cipher. Alternatively, instead of determining whether or not cipher communication by the Vernam cipher can be continued, the reception control part 804 may decide whether cipher communication by the Vernam cipher is to be continued, or the cipher communication is to be switched to that by the block cipher, in accordance with whether or not the reception control part 804 has received a block-cipher switching request message from the terminal device A 102.

The functions of the key sharing device C 104 and key sharing device D 105 in Embodiment 1 will now be described.

Figure 11:
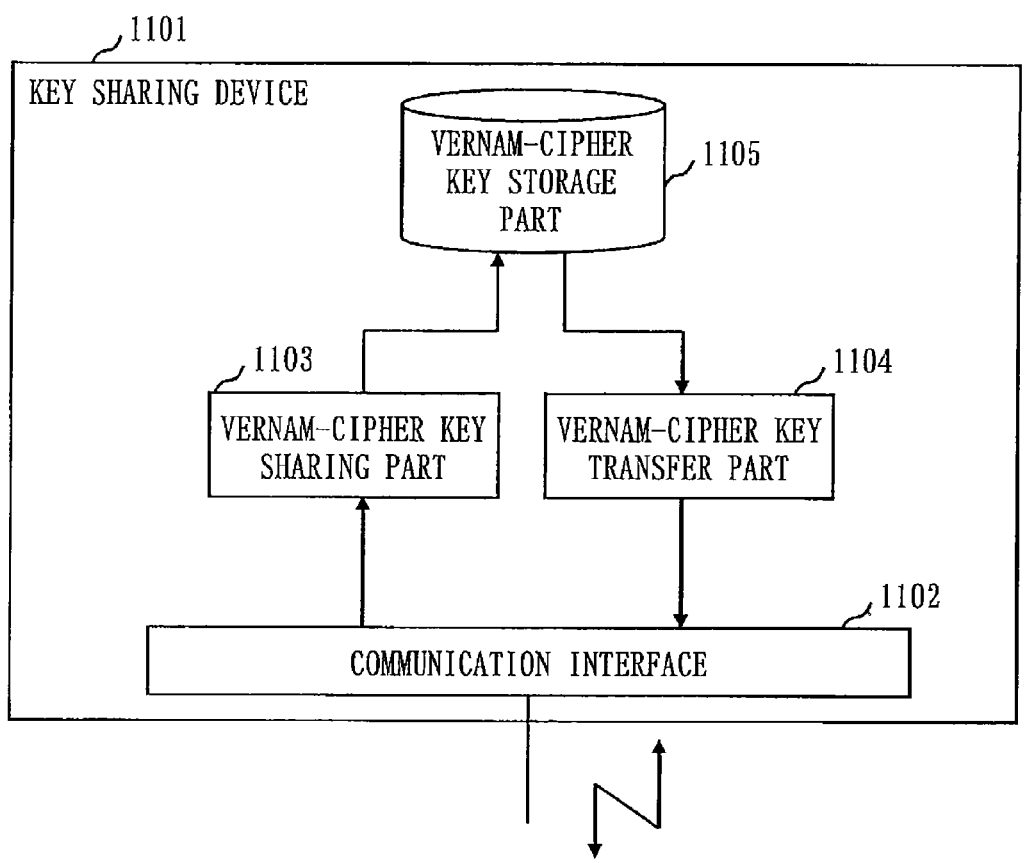
FIG. 11 is a function block diagram showing the functional configuration of the key sharing device C 104 and key sharing device D 105 in Embodiment 1.

FIG. 11 is a function block diagram showing the functional configuration of the key sharing device C 104 and key sharing device D 105 in Embodiment 1. The key sharing device C 104 and the key sharing device D 105 have the same functional configuration. Hence, a key sharing device 1101 will be described hereinafter to represent both the key sharing device C 104 and the key sharing device D 105.

The key sharing device 1101 is provided with a communication interface 1102, a Vernam-cipher key sharing part 1103, a Vernam-cipher key transfer part 1104, and a Vernam-cipher key storage part 1105.

The communication interface 1102 is a communication device that communicates with an external device.

More specifically, the communication interface 1102 communicates with another key sharing device to share the Vernam-cipher key.

The communication interface 1102 also transmits the Vernam-cipher key to a terminal device connected to the communication interface 1102 via a communication cable or the like.

The Vernam-cipher key sharing part 1103 communicates with another key sharing device, shares the Vernam-cipher key, and stores the shared Vernam-cipher key in the Vernam-cipher key storage part 1105.

The Vernam-cipher key transfer part 1104 acquires the Vernam-cipher key from the Vernam-cipher key storage part 1105 and transmits the Vernam-cipher key to the terminal device.

The Vernam-cipher key storage part 1105 is a storage device that stores the Vernam-cipher key obtained through communication with another key sharing device.

As described above, in the encryption system 1 according to Embodiment 1, the shortage of the Vernam-cipher key is detected during cipher communication by the Vernam cipher which is conducted between two parties. Hence, even if the Vernam-cipher key runs short during cipher communication or at the start of cipher communication, cipher communication by the Vernam cipher can be switched to cipher communication by the block cipher, so that cipher communication can be continued.

In Embodiment 1, cipher communication by the Vernam cipher switches to cipher communication by the block cipher when the Vernam-cipher key runs short. As the shortage of the Vernam-cipher key can be detected within the device, switching of cipher communication can be realized without requiring the judgment or process by the user of the terminal device A 102 or the terminal device B 103.

During cipher communication by the block cipher, the terminal device A 102 or terminal device B 103 may possibly acquire a Vernam-cipher key from the key sharing device C 104 or key sharing device D 105, and the remaining bit count of the Vernam-cipher key becomes equal to or exceeds the predetermined bit count again. In this case, the terminal device A 102 and the terminal device B 103 may switch from cipher communication by the block cipher to cipher communication by the Vernam cipher.

Embodiment 2

A method of sharing a block-cipher key will be described in Embodiment 2. When the terminal device A 102 and the terminal device B 103 acquire the Vernam-cipher key from the key sharing device C 104 and the key sharing device D 105 as in Embodiment 1, they also acquire the block-cipher key in Embodiment 2. Hence, the block-cipher key is also shared between the terminal devices securely.

A method of sharing the Vernam-cipher key and block-cipher key between key sharing devices will be described first.

Figure 12:
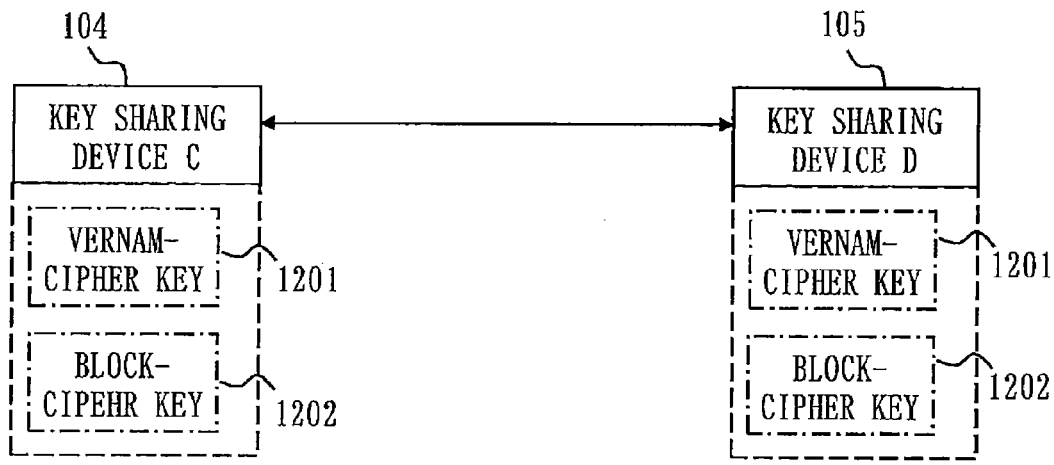
FIG. 12 is a diagram briefly showing the operation of a case where the key sharing device C 104 and the key sharing device D 105 share a Vernam-cipher key 1201 and a block-cipher key 1202 via the network 101 or network 106.

FIG. 12 is a diagram briefly showing the operation of a case where the key sharing device C 104 and the key sharing device D 105 share a Vernam-cipher key 1201 and a block-cipher key 1202 via the network 101 or network 106.

The key sharing device C 104 and the key sharing device D 105 share the Vernam-cipher key 1201 and the block-cipher key 1202 via the network 101 or the network 106 by a predetermined method (key sharing algorithm). Any method can be employed to share the Vernam-cipher key 1201 and the block-cipher key 1202. For example, the key sharing device C 104 and the key sharing device D 105 may be connected to each other by a physically or logically secure communication path, and then may share the Vernam-cipher key 1201 and the block-cipher key 1202. In Embodiment 2, assume that key sharing by means of quantum cipher communication is performed as an example.

The operation of a case will be briefly described where the terminal device acquires the Vernam-cipher key and the block-cipher key from the key sharing device.

Figure 13:
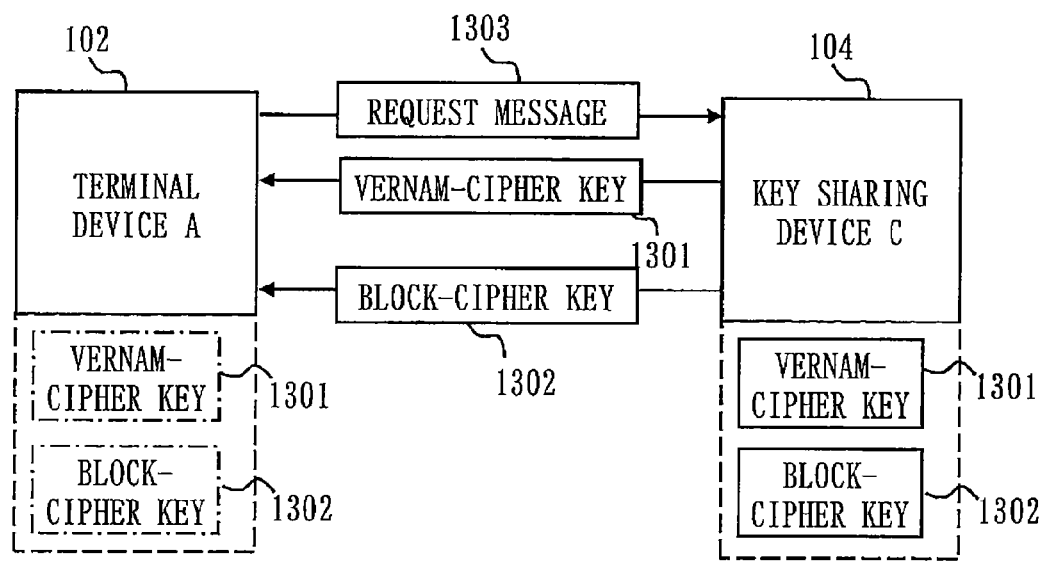
FIG. 13 is a diagram briefly showing the operation of a case where the terminal device A 102 acquires a Vernam-cipher key 1301 and a block-cipher key 1302 from the key sharing device C 104 via the communication cable 107.

FIG. 13 is a diagram briefly showing the operation of a case where the terminal device A 102 acquires a Vernam-cipher key 1301 and a block-cipher key 1302 from the key sharing device C 104 via the communication cable 107.

First, the terminal device A 102 transmits a cipher key request message 1303 to the key sharing device C 104. The key sharing device C 104, after receiving the cipher key request message 1303, transmits the Vernam-cipher key 1301 and block-cipher key 1302 it holds to the terminal device A 102. The terminal device A 102 which has received the Vernam-cipher key 1301 and the block-cipher key 1302 stores the Vernam-cipher key 1301 and the block-cipher key 1302.

The terminal device B 103 acquires the Vernam-cipher key and the block-cipher key from the key sharing device D 105 via the communication cable 108 in the same manner.

The functions of the terminal device A 102 and the terminal device B 103 in Embodiment 2 will be described.

Figure 14:
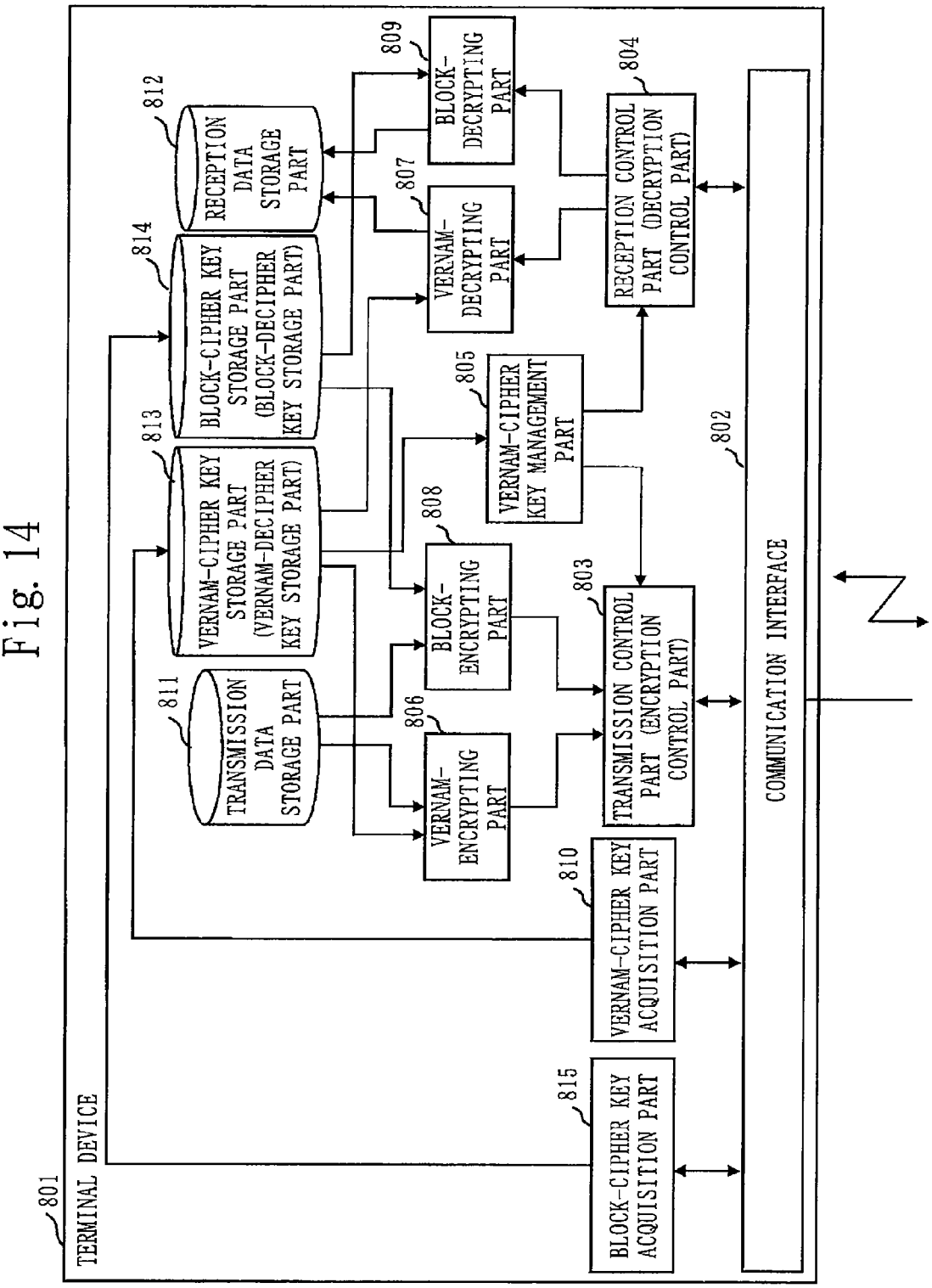
FIG. 14 is a function block diagram showing the functional configuration of a terminal device A 102 and terminal device B 103 in Embodiment 2.

FIG. 14 is a function block diagram showing the functional configuration of the terminal device A 102 and the terminal device B 103 in Embodiment 2. The terminal device shown in FIG. 14 is provided with a block-cipher key acquisition part 815, in addition to the function provided to the terminal device shown in FIG. 8.

The block-cipher key acquisition part 815 acquires the block-cipher key from a key sharing device such as the key sharing device C 104 or the key sharing device D 105, and stores the obtained block-cipher key in the block-cipher key storage part 814.

The functions of the key sharing device C 104 and key sharing device D 105 in Embodiment 2 will now be described.

Figure 15:
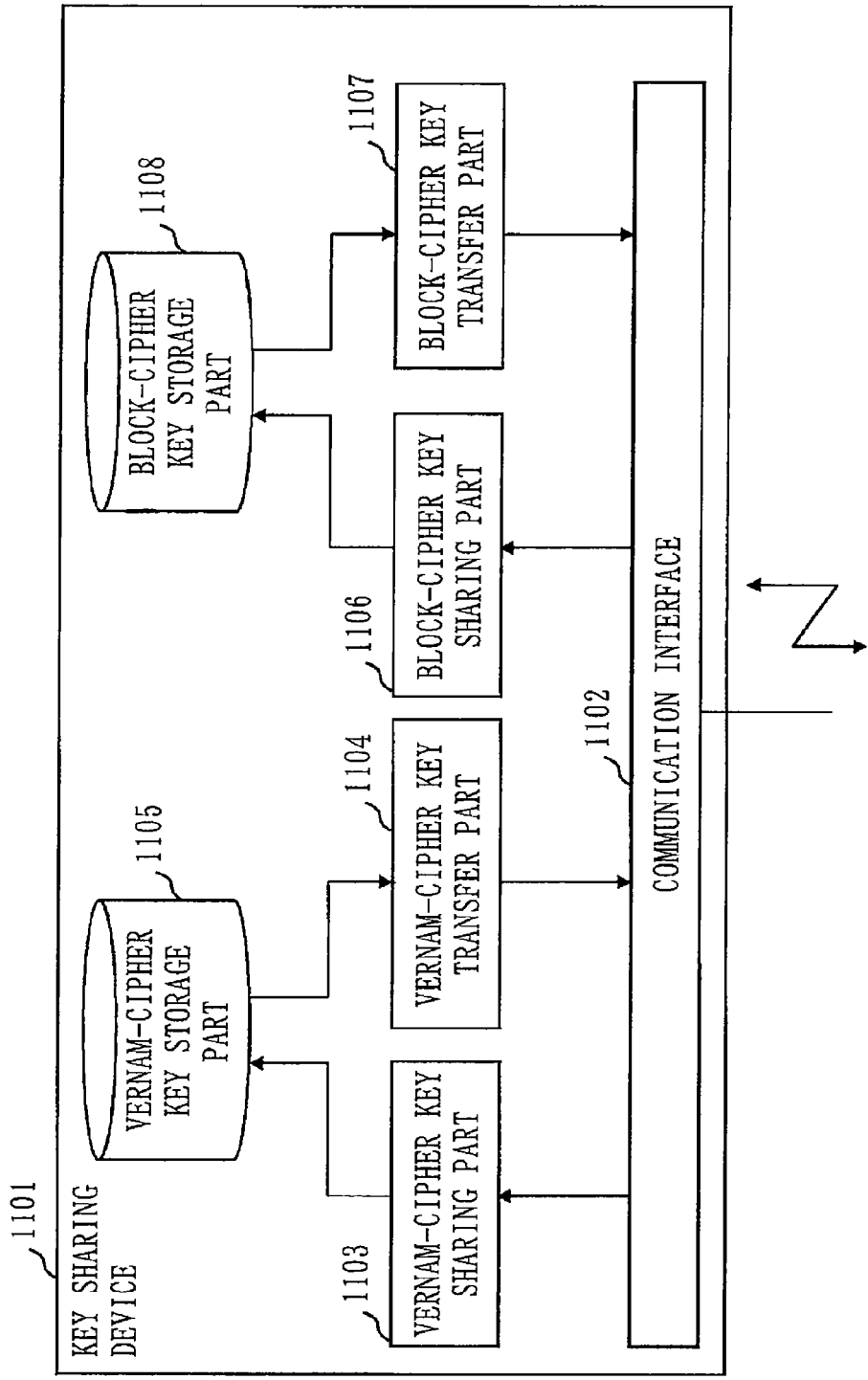
FIG. 15 is a function block diagram for explaining the functional configuration of a key sharing device C 104 and key sharing device D 105 in Embodiment 2.

FIG. 15 is a function block diagram for explaining the functional configuration of the key sharing device C 104 and the key sharing device D 105 in Embodiment 2. The key sharing device shown in FIG. 15 is provided with a block-cipher key sharing part 1106, a block-cipher key transfer part 1107, and a block-cipher key storage part 1108, in addition to the function provided to the key sharing device shown in FIG. 11.

The block-cipher key sharing part 1106 communicates with another key sharing device to share the block-cipher key, and stores the shared block-cipher key in the block-cipher key storage part 1108.

The block-cipher key transfer part 1107 acquires the block-cipher key from the block-cipher key storage part 1108 and transfers it to the terminal device.

The block-cipher key storage part 1108 is a storage device that stores the block-cipher key obtained through communication with another key sharing device.

As described above, in the encryption system 1 according to Embodiment 2, the key sharing device C 104 and the key sharing device D 105 share the block-cipher key as well as the Vernam-cipher key. The terminal device A 102 and the terminal device B 103 acquire the block-cipher key as well as the Vernam-cipher key from the key sharing device C 104 and the key sharing device D 105, respectively. Thus, the terminal devices safely share the block-cipher key as well.

Embodiment 3

Embodiment 3 describes how a block-cipher key is generated out of the remaining Vernam-cipher key at the point when the remaining amount of the Vernam-cipher key becomes smaller than a predetermined amount. Hence, even if the terminal devices do not share the block-cipher key in advance, they can switch to cipher communication by a block cipher when the Vernam-cipher key runs short.

In Embodiment 3, assume that, at the start of cipher communication, the terminal device A 102 and the terminal device B 103 share only the Vernam-cipher key and do not hold a block-cipher key.

Explanation will be made on the premise that, at the point when the Vernam-cipher key runs short, it is left in an amount necessary for the generation of the block-cipher key.

The operation of a case will be briefly described where, in Embodiment 3, the terminal devices start cipher communication by the Vernam cipher, and switch the cryptosystem to cipher communication by the block cipher at the point when the cipher key for the Vernam cipher starts to run short.

Figure 16:
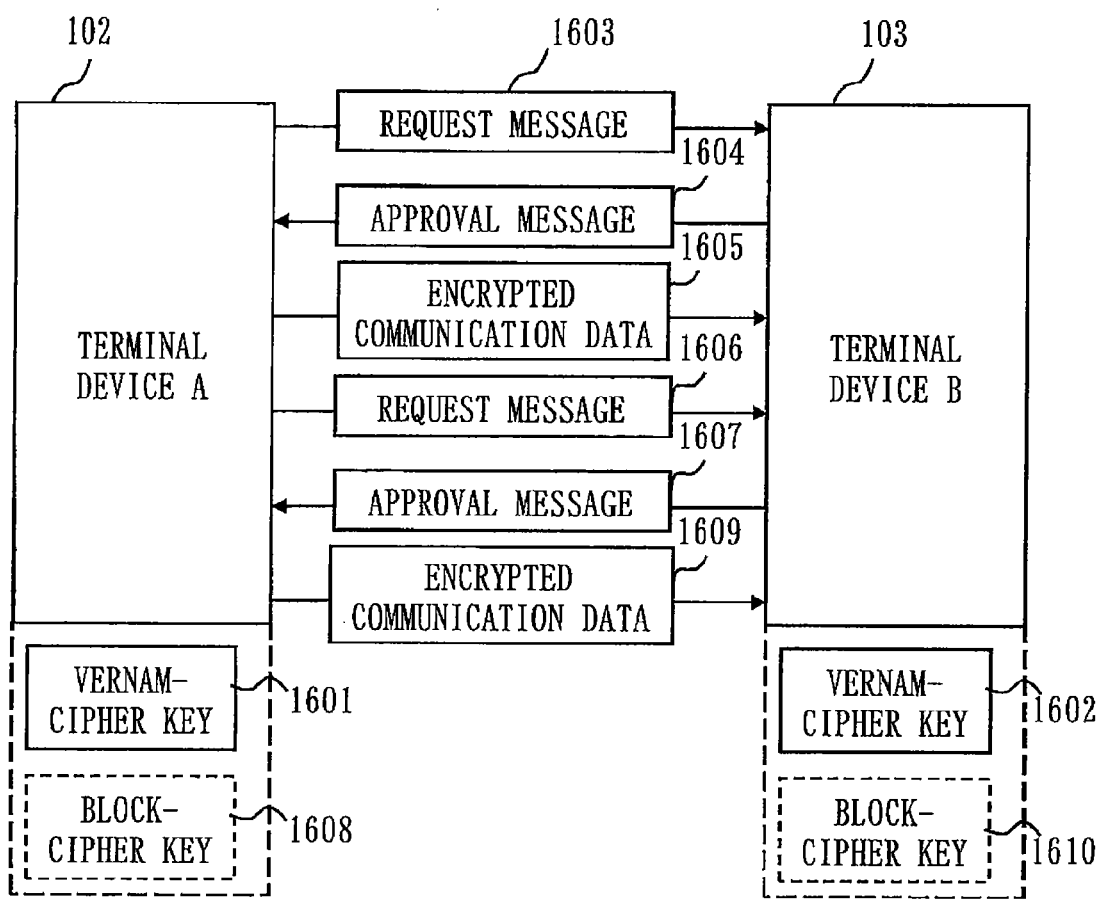
FIG. 16 is a diagram briefly showing the operation of a case where the terminal device A 102 and the terminal device B 103 start cipher communication using the Vernam cipher and switch to cipher communication using the block cipher at the point when the cipher key for the Vernam cipher starts to run short.

FIG. 16 is a diagram briefly showing the operation of a case where the terminal device A 102 and the terminal device B 103 start cipher communication by the Vernam cipher, and switch the cryptosystem to cipher communication by the block cipher at the point when the cipher key for the Vernam cipher starts to run short. In the process shown in FIG. 16, a process of generating a block-cipher key out of a Vernam-cipher key is executed in addition to the process of FIG. 4 in Embodiment 1.

As the preparation of the cipher communication, the terminal device A 102 holds a Vernam-cipher key 1601 for the Vernam cipher. The terminal device B 103 also holds a Vernam-cipher key 1602. The Vernam-cipher key 1601 held by the terminal device A 102 and the Vernam-cipher key 1602 held by the terminal device B 103 have been acquired from the key sharing device C 104 and the key sharing device D 105, respectively, by the method described above. In Embodiment 3, assume that the Vernam-cipher key 1601 and the Vernam-cipher key 1602 are the same.

Before start of the cipher communication, the terminal device A 102 and the terminal device B 103 hold neither a block-cipher key 1608 nor a block-cipher key 1610, respectively.

The process performed since the process start until the terminal device B 103 transmits a block-cipher switching approval message 1607 to the terminal device A 102 is the same as the process shown in FIG. 4, and accordingly an explanation thereof will be omitted.

The terminal device A 102 which has received the block-cipher key switching approval message 1607 generates the block-cipher key 1608 out of the remaining Vernam-cipher key 1601. The terminal device A 102 encrypts the communication data by the block-cipher key 1608, to generate encrypted communication data 1609. The terminal device A 102 then transmits the generated encrypted communication data 1609 to the terminal device B 103.

The terminal device B 103 which has received the encrypted communication data 1609 generates a block-cipher key 1610 out of the remaining Vernam-cipher key 1602. The terminal device B 103 decrypts the encrypted communication data 1609 by the block-cipher key 1610, to obtain communication data.

Assume that the terminal device A 102 and the terminal device B 103 generate the block-cipher key out of the Vernam-cipher key in accordance with the same method which they share in advance.

For example, each of the terminal device A 102 and the terminal device B 103 treats part of the remaining Vernam-cipher key, as the block-cipher key directly. Namely, when the block-cipher key has 256 bits, predetermined 256 bits of the remaining Vernam-cipher key are extracted and treated as a block-cipher key.

Figure 17:
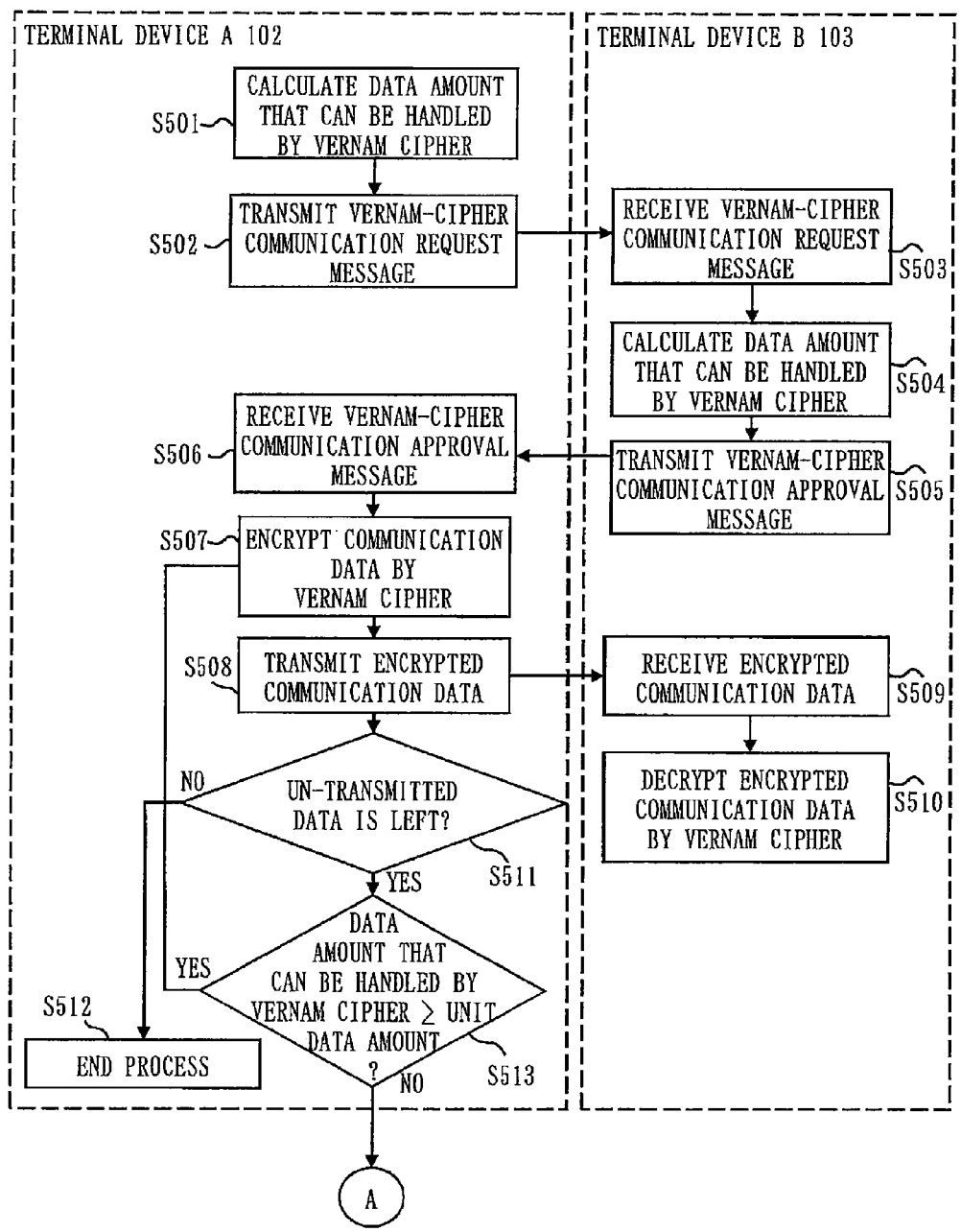
FIG. 17 is a flowchart showing the communication process flow of FIG. 16.
Figure 18:
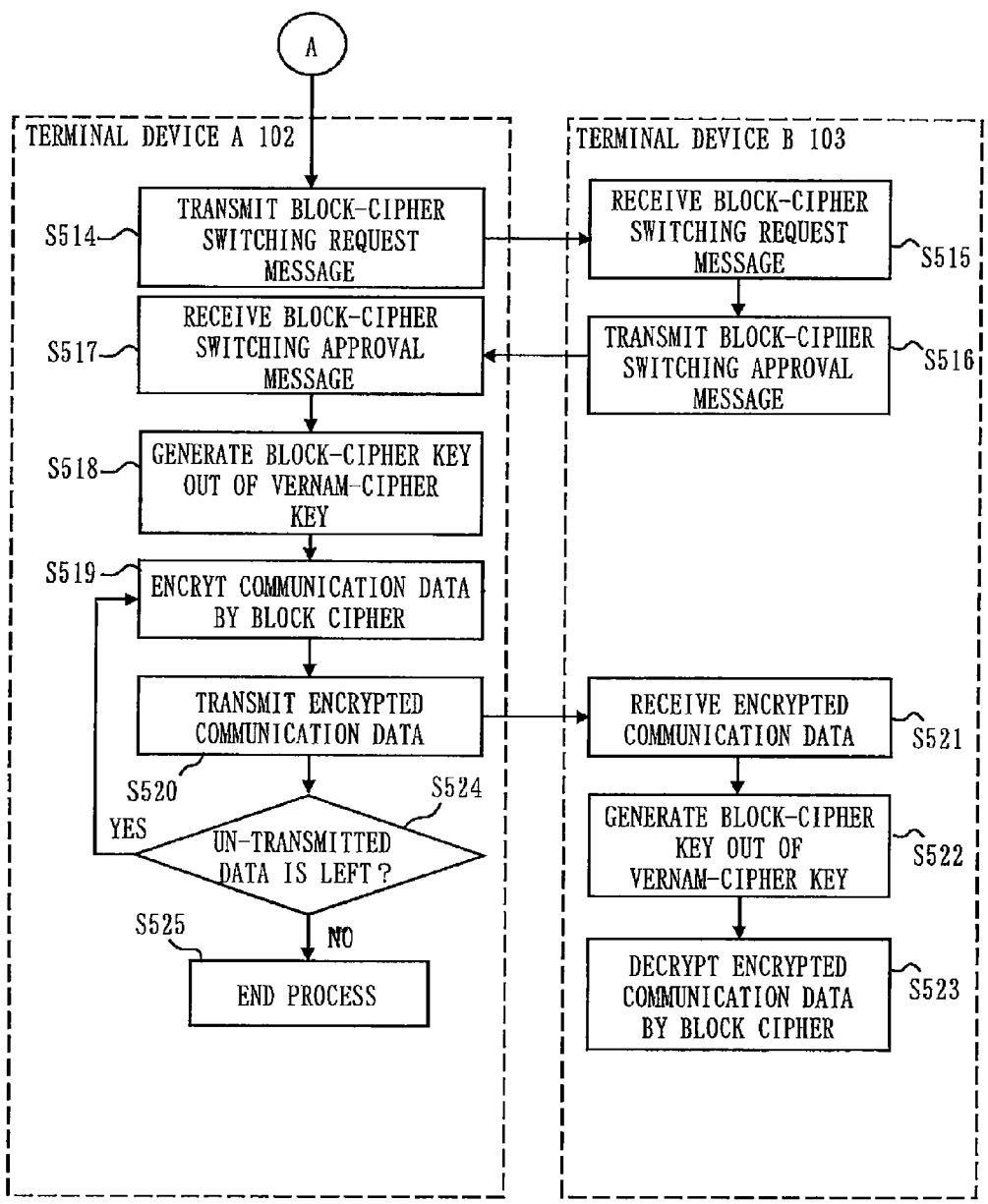
FIG. 18 is a flowchart showing the communication process flow of FIG. 16.

The communication process of FIG. 16 will now be described in detail. FIGS. 17 and 18 are flowcharts showing the communication process flow of FIG. 16. In the process shown in FIGS. 17 and 18, the process of generating the block-cipher key out of the Vernam-cipher key is performed, in addition to the process shown in FIG. 5 of Embodiment 1.

The process from S501 through S517 is the same as the process from S101 through S117 shown in FIG. 5, and a description thereof will accordingly be omitted.

The terminal device A 102, after receiving the block-cipher switching approval message 407, generates the block-cipher key 1608 out of the remaining Vernam-cipher key 1601 (S518). The terminal device A 102 encrypts data of the unitary data amount, out of the communication data by the block-cipher key 1608, to generate the encrypted communication data 1609 (S519). The terminal device A 102 then transmits the encrypted communication data 1609 to the terminal device B 103 (S520).

The terminal device B 103 receives the encrypted communication data 1609 (S521). Then, the terminal device B 103 generates the block-cipher key 1610 out of the remaining Vernam-cipher key 1602 (S522). The terminal device B 103 decrypts the encrypted communication data 1609 by the block-cipher key 1610, to obtain communication data (S523).

The process from S524 through S525 is the same as the process from S122 through S123 shown in FIG. 5, and a description thereof will accordingly be omitted.

The operation of a case in Embodiment 3 will be briefly described where cipher communication by the block cipher is to be started when the remaining amount of the Vernam-cipher key is scarce at the start of communication and cipher communication by the Vernam cipher cannot be performed.

Figure 19:
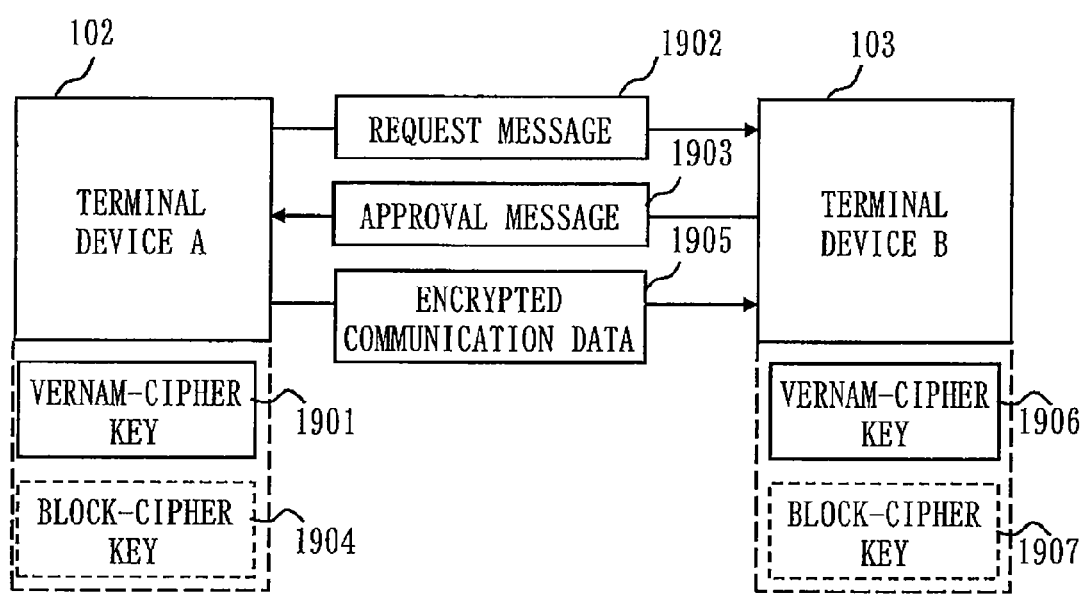
FIG. 19 is a diagram briefly showing the operation of a case where the terminal device A 102 and the terminal device B 103 start cipher communication by the block cipher because the Vernam-cipher key is running short at the start of the cipher communication.

FIG. 19 is a diagram briefly showing the operation of a case where the terminal device A 102 and the terminal device B 103 start cipher communication by the block cipher because the Vernam-cipher key is running short at the start of the cipher communication. In the process shown in FIG. 19, a process of generating the block-cipher key out of the Vernam-cipher key is performed, in addition to the process of FIG. 6 in Embodiment 1.

Assume that the Vernam-cipher key is not exhausted at the start of communication but is left in an amount equal to or more than an amount necessary for generation of the block-cipher key.

The process performed since the process is started until the terminal device B 103 transmits a block-cipher switching approval message 1903 to the terminal device A 102 is the same as the process shown in FIG. 6, and a description thereof will accordingly be omitted.

The terminal device A 102 which has received block-cipher switching approval message 1903 generates a block-cipher key 1904 out of a remaining Vernam-cipher key 1901. The terminal device A 102 encrypts communication data by the block-cipher key 1904, to generate encrypted communication data 1905. The terminal device A 102 then transmits the generated encrypted communication data 1905 to the terminal device B 103.

The terminal device B 103 which has received the encrypted communication data 1905 generates a block-cipher key 1907 out of a remaining Vernam-cipher key 1906. The terminal device B 103 decrypts the encrypted communication data 1905 by the block-cipher key 1907, to obtain communication data.

Figure 20:
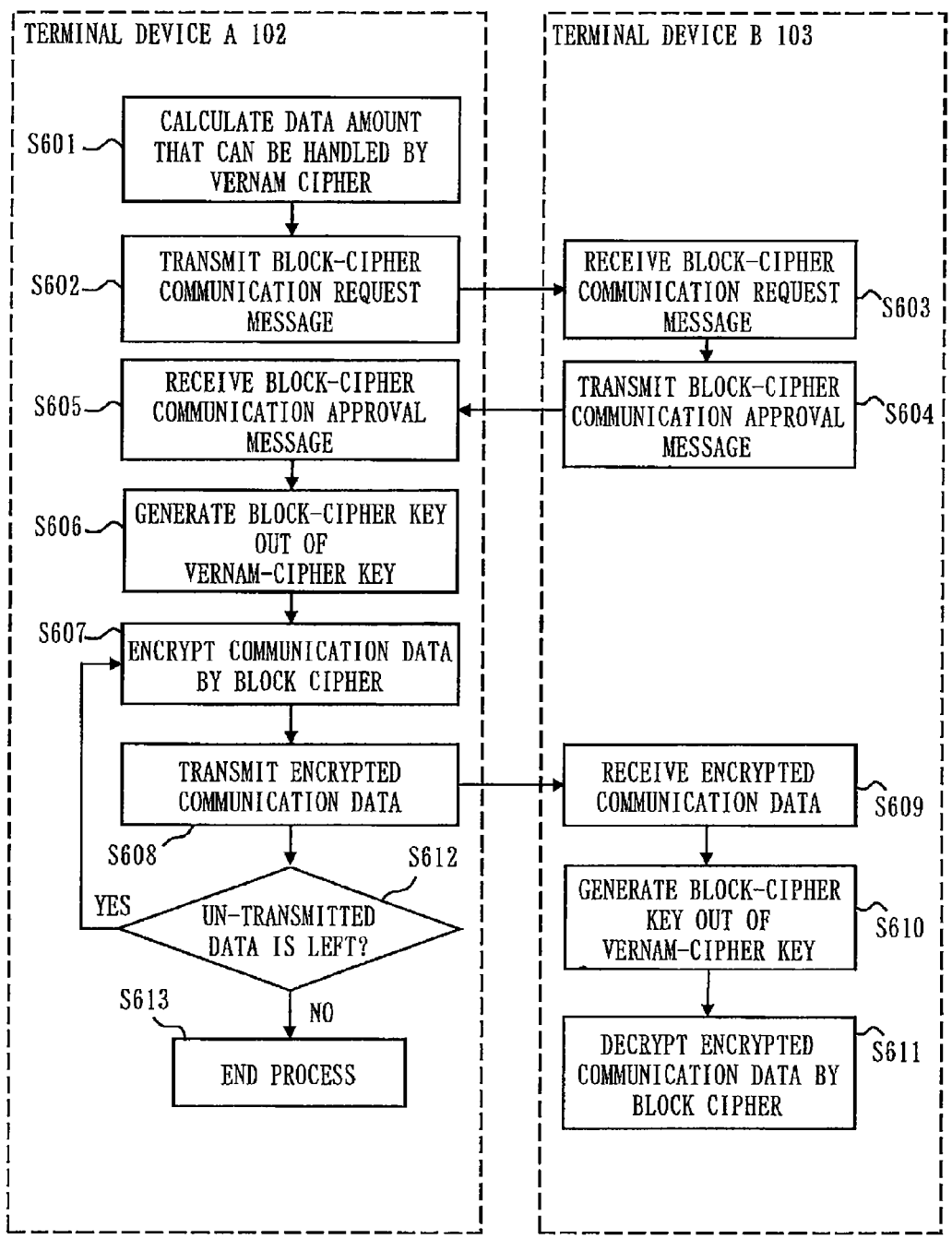
FIG. 20 is a flowchart showing the communication process flow of FIG. 19.

The communication process of FIG. 19 will be described in detail. FIG. 20 is a flowchart showing the communication process flow of FIG. 19. In the process shown in FIG. 19, the process of generating the block-key cipher out of the Vernam-cipher key cipher is performed, in addition to the process shown in FIG. 7 of Embodiment 1.

The process from S601 through S605 is the same as the process from S201 through S205 shown in FIG. 7, and a description thereof will accordingly be omitted.

The terminal device A 102, after receiving the block-cipher switching approval message 1903, generates the block-cipher key 1904 out of the remaining Vernam-cipher key 1901 (S606). The terminal device A 102 encrypts data of the unitary data amount, out of the communication data by the block-cipher key 1904, to generate the encrypted communication data 1905 (S607). The terminal device A 102 then transmits the encrypted communication data 1905 to the terminal device B 103 (S608).

The terminal device B 103 receives the encrypted communication data 1905 (S609). Then, the terminal device B 103 generates the block-cipher key 1907 out of the remaining Vernam-cipher key 1906 (S610). The terminal device B 103 decrypts the encrypted communication data 1905 by the block-cipher key 1907, to obtain communication data (S611).

The process from S612 through S613 is the same as the process from S210 through S211 shown in FIG. 7, and a description thereof will accordingly be omitted.

The functions of the terminal device A 102 and terminal device B 103 in Embodiment 3 will now be described.

Figure 21:
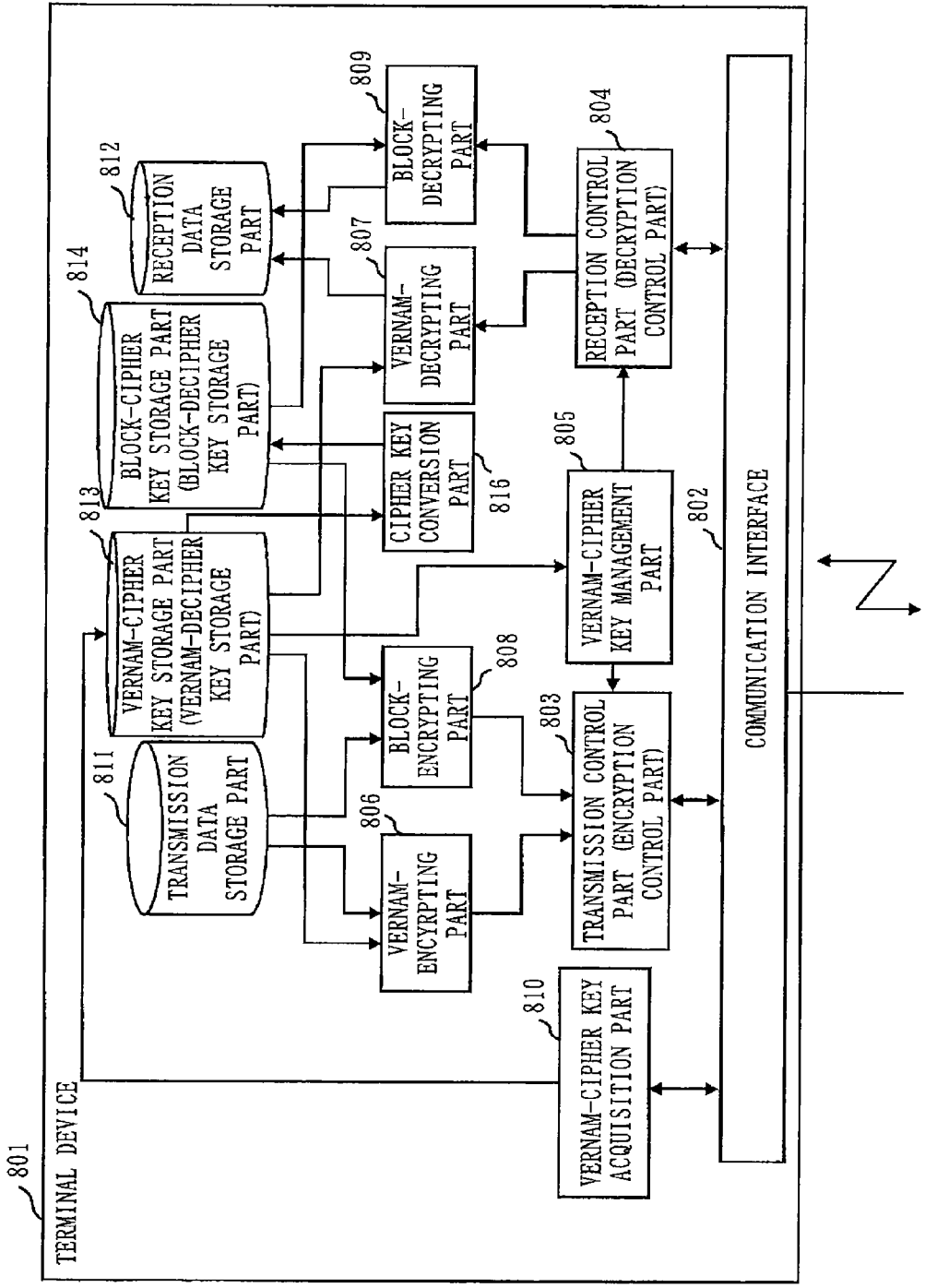
FIG. 21 is a function block diagram showing the functional configuration of a key sharing device C 104 and key sharing device D 105 in Embodiment 3.

FIG. 21 is a function block diagram showing the functional configuration of the terminal device A 102 and the terminal device B 103 in Embodiment 3. The terminal device shown in FIG. 21 is provided with a cipher key conversion part 816, in addition to the function provided to the terminal device shown in FIG. 8.

The cipher key conversion part 816 acquires the Vernam-cipher key from the Vernam-cipher key storage part 813, generates the block-cipher key out of the acquired Vernam-cipher key by the processing device, and stores the block-cipher key in the block-cipher key storage part 814.

As described above, in the encryption system 1 according to Embodiment 3, the block-cipher key is generated out of the remaining Vernam-cipher key. Hence, cipher communication by the Vernam-cipher key can be switched to cipher communication by the block cipher without sharing the block-cipher key in advance, unlike in Embodiment 2.

In the above description, when the Vernam-cipher key is running short, the block-cipher key is generated out of the remaining Vernam-cipher key. This is based on a premise that, at the point when the Vernam-cipher key starts to run short, the Vernam-cipher key should remain in an amount equal to or larger than the amount necessary for generating the block-cipher key.

Hence, the block-cipher key may be generated out of the remaining Vernam-cipher key before the Vernam-cipher key starts to run short. For example, at the point when the terminal device acquires the Vernam-cipher key from the key sharing device, the block-cipher key may be generated out of the remaining Vernam-cipher key. In this case, the Vernam-cipher key remains in an amount equal to or larger than the amount necessary for generating the block-cipher key. Thus, the block-cipher key never fails to be generated out of the remaining Vernam-cipher key.

Embodiment 4

Embodiment 4 describes how a plurality of block-cipher keys are held, the block-cipher key used for cipher communication is discarded periodically, and cipher communication is performed using a new block-cipher key. This realizes more secure cipher communication that uses the block cipher.

The following description shows an example in which the above function is added to Embodiment 1.

First, the operation of a case in Embodiment 4 will be briefly described where terminal devices start cipher communication with each other by the Vernam cipher, and switch to cipher communication by the block cipher at the point when the cipher key for the Vernam cipher starts to run short.

Figure 22:
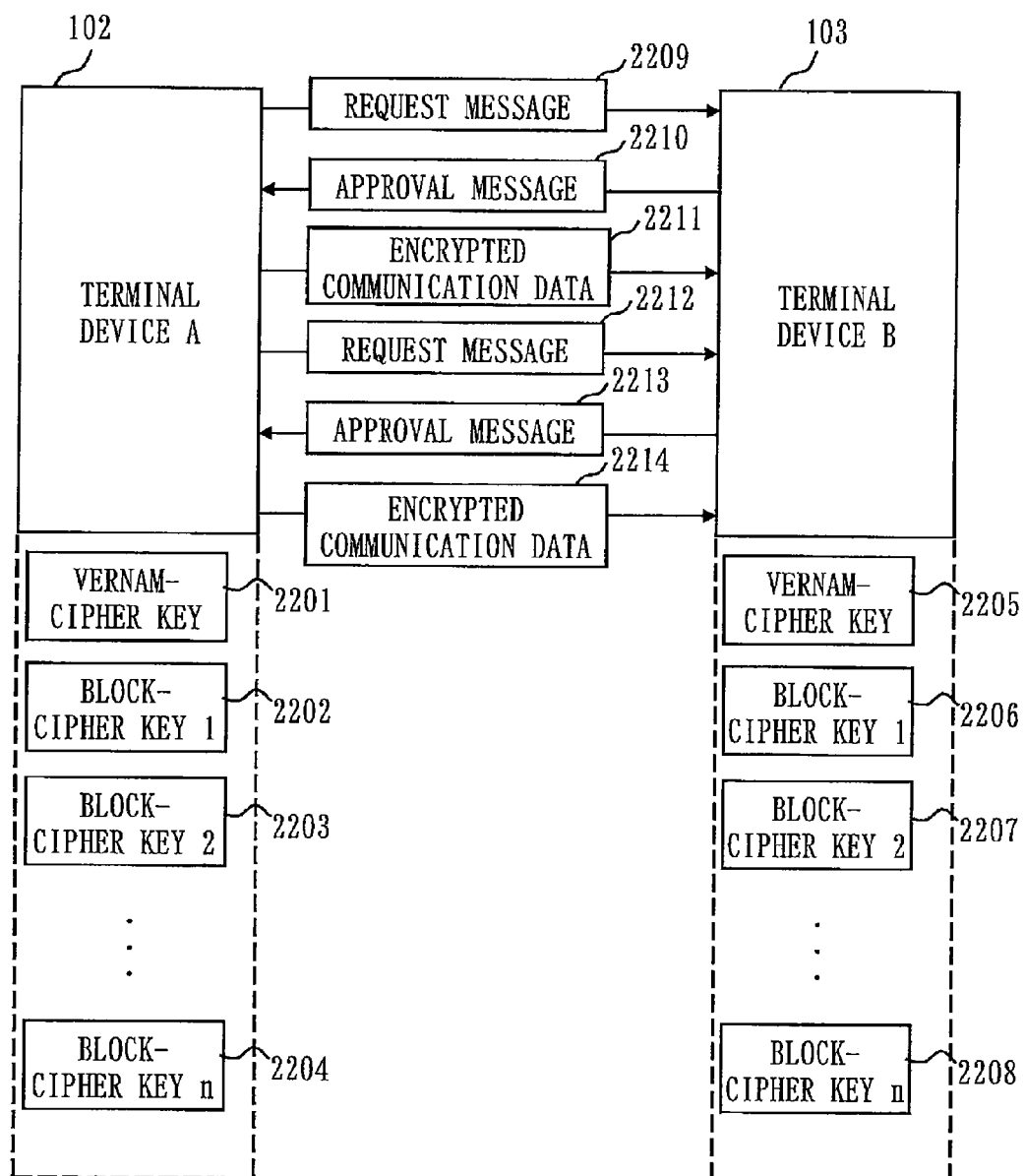
FIG. 22 is a diagram briefly showing the operation of a case where the terminal device A 102 and the terminal device B 103 start cipher communication using the Vernam cipher and switch the cipher communication scheme using the block cipher at the point when the cipher key for the Vernam cipher is exhausted.

FIG. 22 is a diagram briefly showing the operation of a case where the terminal device A 102 and the terminal device B 103 start cipher communication by the Vernam cipher, and switch to cipher communication using the block cipher at the point when the cipher key for the Vernam cipher starts to run short. In the process shown in FIG. 22, a process of discarding a used block-cipher key and setting a next block-cipher key is performed, in addition to the process of FIG. 4 in Embodiment 1.

As the preparation of cipher communication, the terminal device A 102 holds a Vernam-cipher key 2201 for Vernam cipher and a plurality of block-cipher keys 2202 to 2204 (block-cipher keys 1 to n). Similarly, the terminal device B 103 holds a Vernam-cipher key 2205 and a plurality of block-cipher keys 2206 to 2208 (block-cipher keys 1 to n). In Embodiment 4, the Vernam-cipher key 2201 and the Vernam-cipher key 2205 are the same, and the block-cipher keys 2202 to 2204 and the block-cipher keys 2206 to 2208 are the same.

The values of 1 to n of the block-cipher keys are identification numbers (identification information) for identifying the block-cipher keys.

The process performed since the process start until the terminal device B 103 transmits a block-cipher switching approval message 2213 to the terminal device A 102 is the same as the process shown in FIG. 4, and a description thereof will accordingly be omitted.

The terminal device A 102 which has received the block-cipher switching approval message 2213 encrypts the communication data by the block-cipher key 2202, to generate encrypted communication data 2214, and transmits the encrypted communication data 2214 to the terminal device B 103.

The terminal device B 103 which has received the encrypted communication data 2214 decrypts the encrypted communication data 2214 by the block-cipher key 2206, thus obtaining communication data.

The terminal device A 102 and terminal device B 103 respectively discard the block-cipher key 2202 and the block-cipher key 2206. The terminal device A 102 and the terminal device B 103 are set to respectively use the block-cipher key 2203 and the block-cipher key 2207 next time they perform encryption by a block-cipher key.

Figure 23:
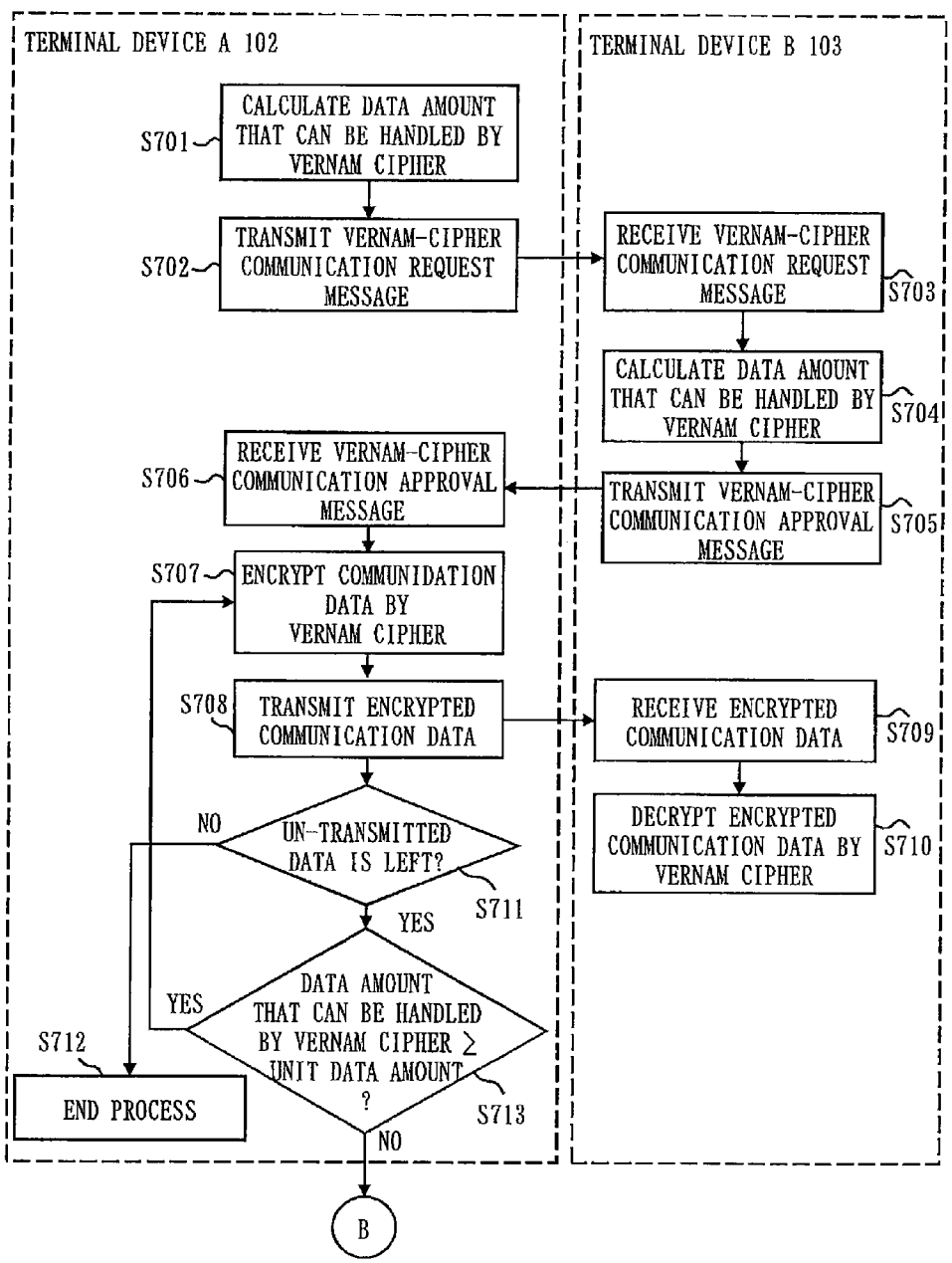
FIG. 23 is a flowchart showing the communication process flow of FIG. 22.
Figure 24:
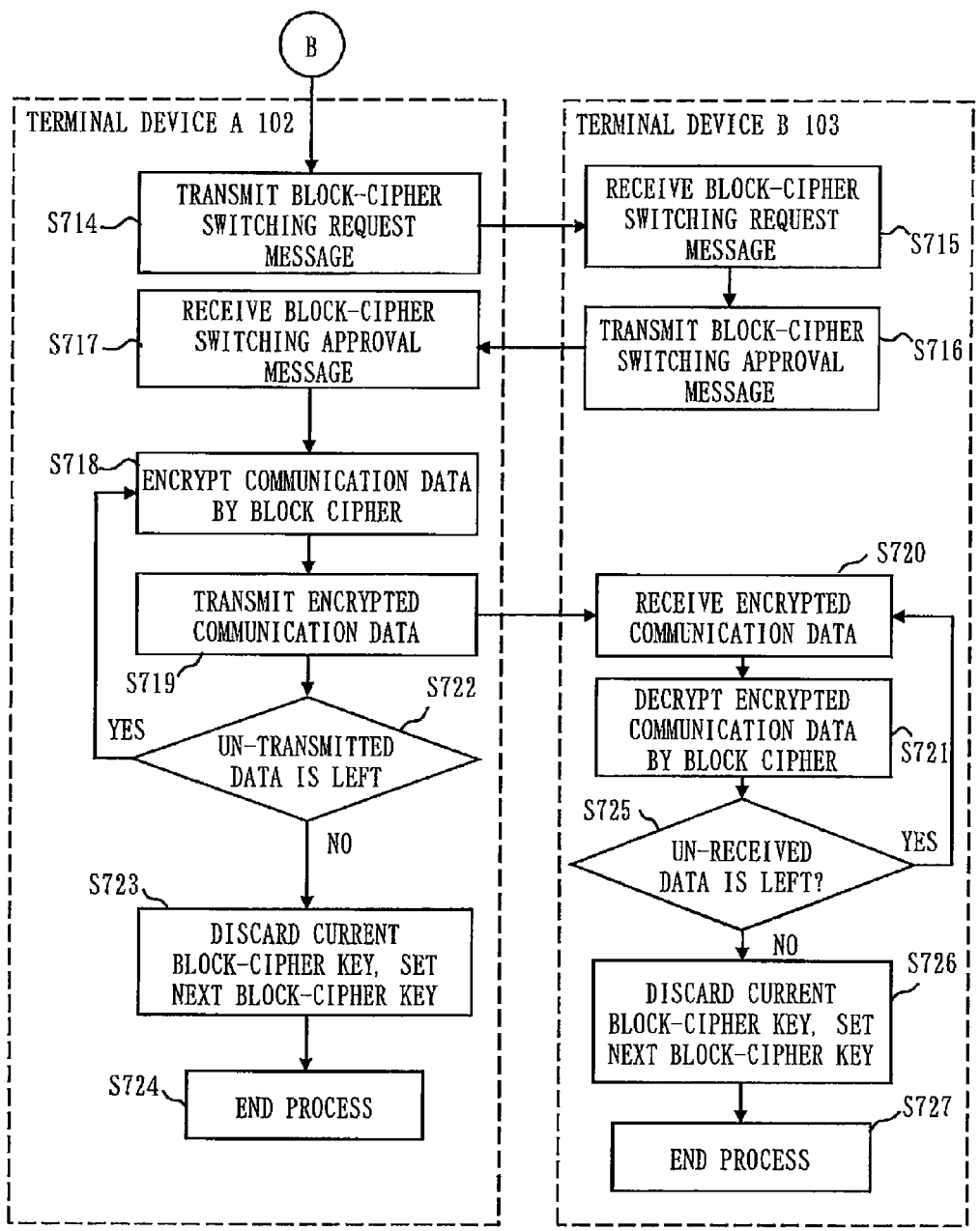
FIG. 24 is a flowchart showing the communication process flow of FIG. 22.

The communication process of FIG. 22 will be described in detail. FIGS. 23 and 24 are flowcharts showing the communication process flow of FIG. 22. In the process shown in FIGS. 23 and 24, a process of discarding a used block-cipher key and setting the next block-cipher key is performed, in addition to the process shown in FIG. 5 of Embodiment 1.

The process from S701 through S717 is the same as the process from S101 through S117 shown in FIG. 5, and a description thereof will accordingly be omitted.

When the terminal device A 102 receives the block-cipher switching approval message 2213, the terminal device A 102 encrypts data of the unitary data amount, out of the communication data by the block-cipher key 2202, to generate the encrypted communication data 2214 (S718). The terminal device A 102 transmits the encrypted communication data 2214 to the terminal device B 103 (S719).

The terminal device B 103 receives the encrypted communication data 2214 (S720). Then, the terminal device B 103 decrypts the encrypted communication data 2214 by the block-cipher key 2206, to obtain communication data (S721).

Subsequently, the terminal device A 102 checks whether there is un-transmitted communication data (S722). If there is no un-transmitted communication data (NO in S722), the terminal device A 102 discards the block-cipher key 2202, and is set to use the block-cipher key 2203 next time the terminal device A 102 performs encryption by a block-cipher key (S723). Then, the terminal device A 102 ends the process (S724). If there is un-transmitted communication data (YES in S722), the terminal device A 102 returns to the process of S718.

Similarly, the terminal device B 103 checks whether there is un-received communication data (S725). When the terminal device B 103 does not receive next communication data from the terminal device A 102 within a predetermined time, the terminal device B 103 determines that there is no un-received communication data. If there is no un-received communication data (NO in S725), the terminal device A 102 discards the block-cipher key 2206, and is set to use the block-cipher key 2207 next time encryption by a block-cipher key is to be performed (S726). Then, the terminal device B 103 ends the process (S727). If there is un-transmitted communication data (YES in S725), the terminal device B 103 returns to the process of S720.

The operation of a case in Embodiment 4 will be briefly described where cipher communication by the block cipher is to be started when the Vernam-cipher key is running short at the start of communication and cipher communication by the Vernam cipher cannot be performed.

Figure 25:
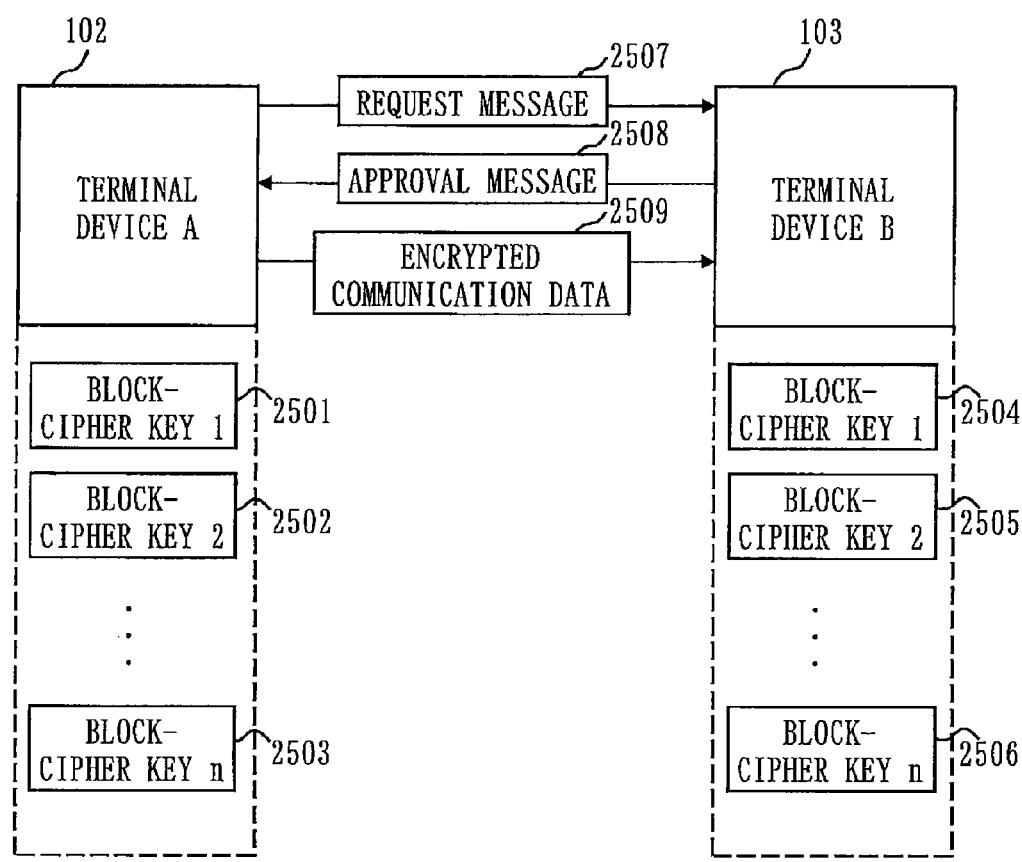
FIG. 25 is a diagram briefly showing the operation of a case where the terminal device A 102 and the terminal device B 103 start cipher communication by the block cipher because the Vernam-cipher key is exhausted at the start of the cipher communication.

FIG. 25 is a diagram briefly showing the operation of a case where the terminal device A 102 and the terminal device B 103 start cipher communication by the block cipher because the Vernam-cipher key is running short at the start of the cipher communication. According to the process shown in FIG. 25, in addition to the process of FIG. 6 in Embodiment 1, a process of discarding a used block-cipher key and setting a next block-cipher key is performed.

As the preparation of cipher communication, the terminal device A 102 holds a plurality of block-cipher keys 2501 to 2503 (block-cipher keys 1 to n). Similarly, the terminal device B 103 holds a plurality of block-cipher keys 2504 to 2506 (block-cipher keys 1 to n). The block-cipher keys 2501 to 2503 held by the terminal device A 102 and the block-cipher key 2504 to 2506 held by the terminal device B 103 are the same.

The process performed since the process is started until the terminal device B 103 transmits a block-cipher switching approval message 2508 to the terminal device A 102 is the same as the process shown in FIG. 6, and a description thereof will accordingly be omitted.

The terminal device A 102 which has received the block-cipher communication approval message 2508 encrypts the communication data by the block cipher using the block-cipher key 2501, to generate encrypted communication data 2509. Then, the terminal device A 102 transmits the generated encrypted communication data 2509 to the terminal device B 103.

The terminal device B 103 which has received the encrypted communication data 2509 decrypts the encrypted communication data 2509 by the block-cipher key 2504, to obtain communication data.

After the cipher communication is ended, the terminal device A 102 and the terminal device B 103 respectively discard the block-cipher key 2501 and the block-cipher key 2504, and are set to respectively use the block-cipher key 2502 and the block-cipher key 2505 next time the terminal device A 102 and the terminal device B 103 are to perform encryption by block-cipher keys.

The terminal device A 102 and the terminal device B 103 respectively discard the block-cipher key 2501 and the block-cipher key 2504, and are set to respectively use the block-cipher key 2502 and the block-cipher key 2505 next time the terminal device A 102 and the terminal device B 103 are to perform encryption by block-cipher keys.

Figure 26:
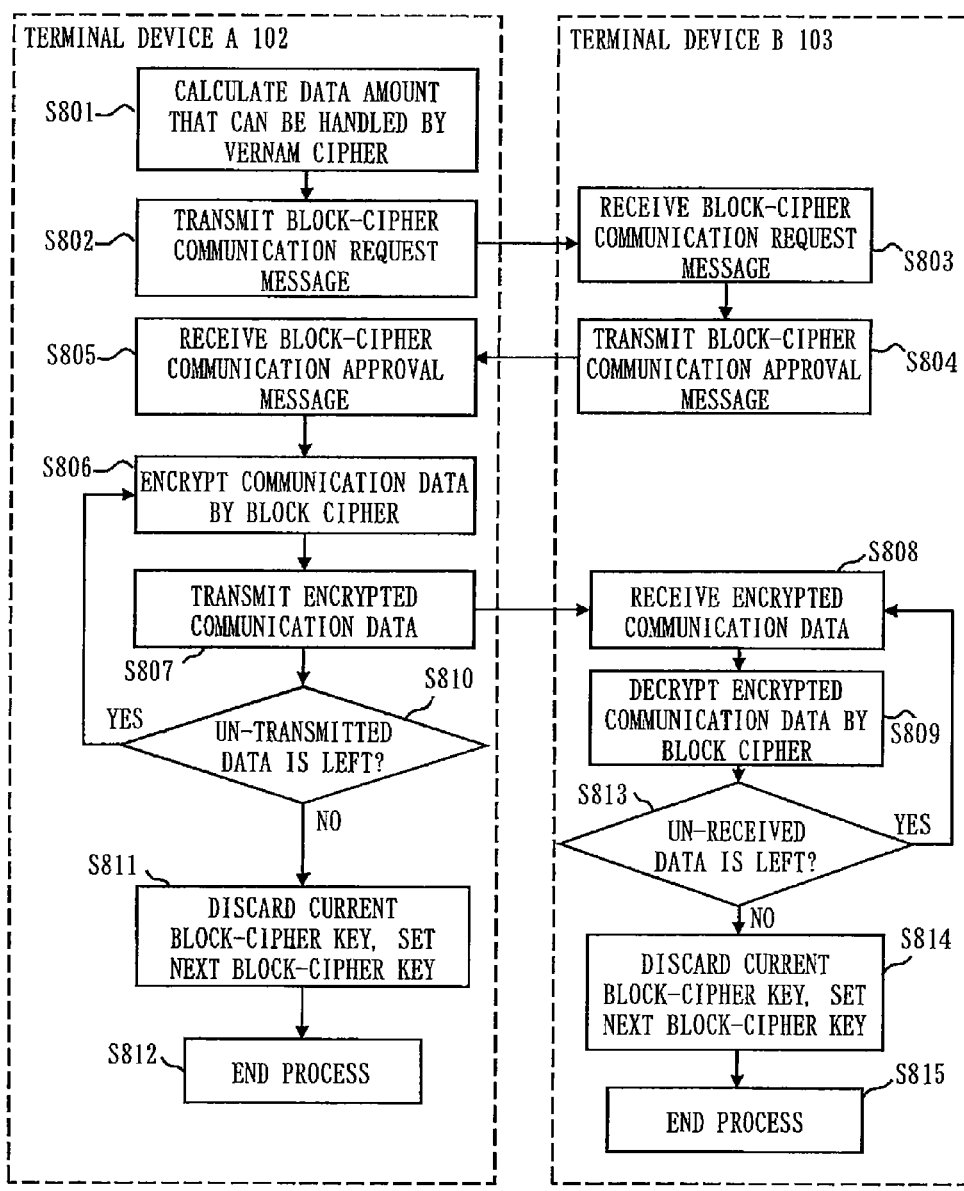
FIG. 26 is a flowchart showing the communication process flow of FIG. 25.

The communication process of FIG. 25 will be described in detail. FIG. 26 is a flowchart showing the communication process flow of FIG. 25. In the process shown in FIG. 26, in addition to the process shown in FIG. 7 of Embodiment 1, a process of discarding the used block-cipher keys and setting the next block-cipher keys is performed.

The process from S801 through S805 is the same as the process from S201 through S205 shown in FIG. 7, and a description thereof will be omitted.

When the terminal device A 102 receives the block-cipher communication approval message 2508 from the terminal device B 103, the terminal device A 102 encrypts data of the unitary data amount, out of the communication data by the block-cipher key 2501, to generate the encrypted communication data 2509 (S806). Then, the terminal device A 102 transmits the encrypted communication data 2509 to the terminal device B 103 (S807).

The terminal device B 103 receives the encrypted communication data 2509 (S808). Then, the terminal device B 103 decrypts the encrypted communication data 2509 by the block-cipher key 2504, to obtain communication data (S809).

Subsequently, the terminal device A 102 checks whether there is un-transmitted communication data (S810). If there is no un-transmitted communication data (NO in S810), the terminal device A 102 discards the block-cipher key 2501, and is set to use the block-cipher key 2502 next time the terminal device A 102 is to perform encryption by a block-cipher key (S811). Then, the terminal device A 102 ends the process (S812). If there is un-transmitted communication data (YES in S810), the terminal device A 102 returns to the process of S806.

Similarly, the terminal device B 103 checks whether there is un-transmitted communication data (S813). When the terminal device B 103 does not receive the next communication data from the terminal device A 102 within a predetermined time, the terminal device B 103 determines that there is no un-transmitted communication data. If there is no un-received communication data (NO in S813), the terminal device B 103 discards the block-cipher key 2504, and is set to use the block-cipher key 2505 next time the terminal device B 103 is to perform encryption by a block-cipher key (S814). Then, the terminal device B 103 ends the process (S815). If there is un-received communication data (YES in S813), the terminal device A 102 returns to the process of S808.

The functions of the terminal device A 102 and terminal device B 103 of Embodiment 4 will now be described.

Figure 27:
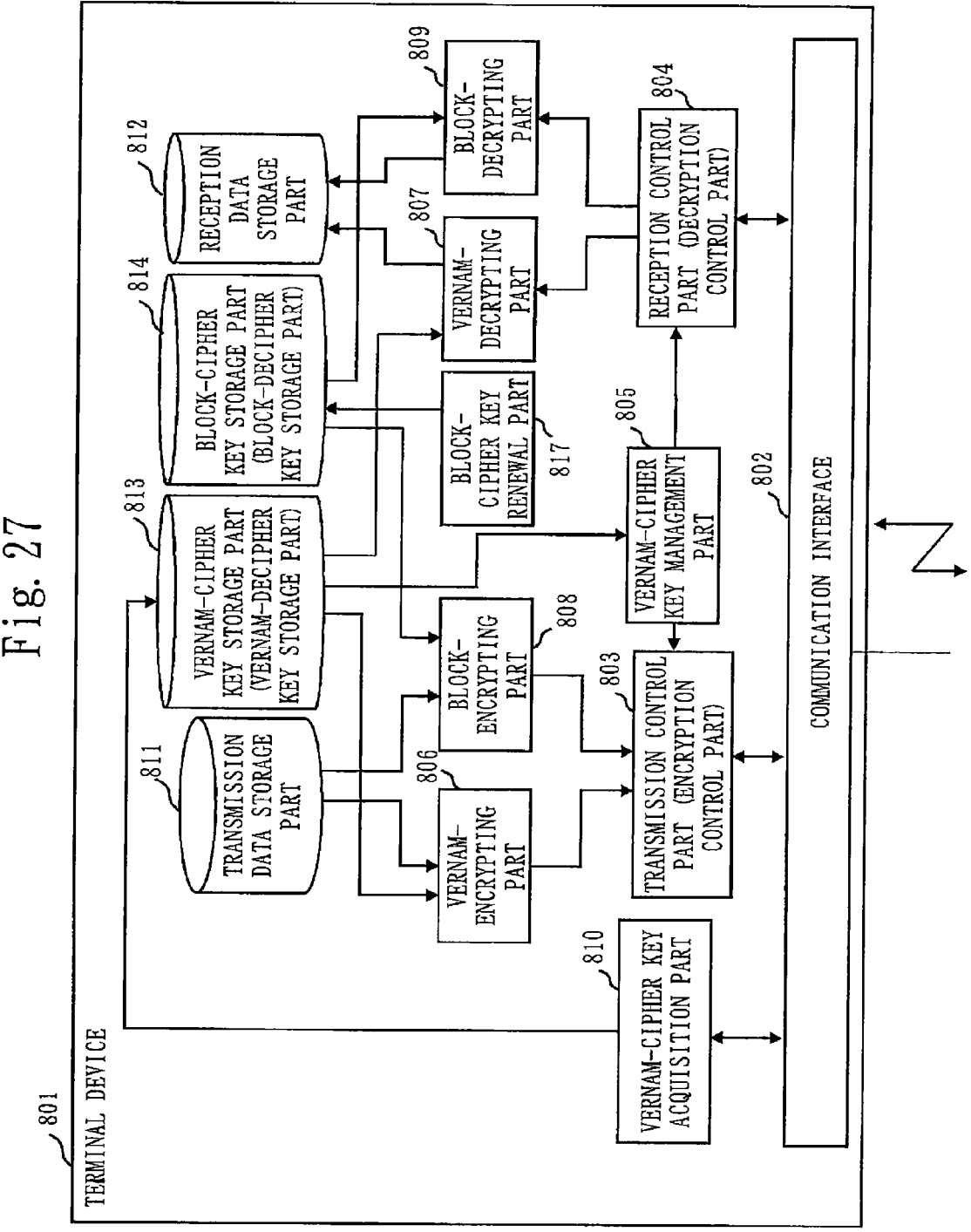
FIG. 27 is a function block diagram showing the functional configuration of a terminal device A 102 and terminal device B 103 in Embodiment 4.

FIG. 27 is a function block diagram showing the functional configuration of the terminal device A 102 and the terminal device B 103 in Embodiment 4. The terminal device shown in FIG. 27 is provided with a block-cipher key renewal part 817, in addition to the function provided to the terminal device shown in FIG. 8.

The block-cipher key renewal part 817 deletes the currently employed block-cipher key from the block-cipher key storage part 814, and sets the next block-cipher key.

As described above, in the encryption system 1 according to Embodiment 4, a plurality of block-cipher keys are held. The block-cipher key which is utilized for cipher communication is discarded periodically, and cipher communication is performed using a new block-cipher key. This can improve the security of cipher communication by the block-cipher key.

The case has been described above where the function of discarding the block-cipher key periodically and performing cipher communication using a new block-cipher key is added to the encryption system 1 according to Embodiment 1. Alternatively, a function of discarding the block-cipher key periodically and performing cipher communication by using a new block-cipher key may be added to the encryption system 1 according to Embodiment 3. In this case, the cipher key conversion part 816 (see FIG. 21) generates a plurality of block-cipher keys out of a Vernam-cipher key. For example, the cipher key conversion part 816 divides the remaining Vernam-cipher key at every predetermined bit count to obtain a plurality of block-cipher keys. More specifically, when the block-cipher key consists of 256 bits, the cipher key conversion part 816 divides (part of) the remaining Vernam-cipher key at every 256 bits to obtain a plurality of block-cipher keys.

Embodiment 5

Embodiment 5 describes how the current block-cipher key is renewed by randomization using a hash function or the like in a case where encryption by the block cipher of Embodiment 4 is to be conducted at the point when only one block-cipher key is left. This can prevent degradation in security resulting from repeated use of the same block-cipher key. This technique will be described.

When the Vernam-cipher key is running short and only one block-cipher key is left, if cipher communication by the block cipher is conducted between terminal devices, the same block-cipher key will be used in subsequent cipher communication as well by the block cipher. As a result, the more cipher communication is performed, the lower the security of cipher communication becomes.

In view of this, in Embodiment 5, if cipher communication by the block cipher of Embodiment 4 is conducted when only one block-cipher key is left, the block-cipher key is renewed by randomization using a hash function or the like.

First, the operation of a case will be briefly described where cipher communication by the block cipher is to be started when the Vernam-cipher key is running short and only one block-cipher key is left at the start of communication.

Figure 28:
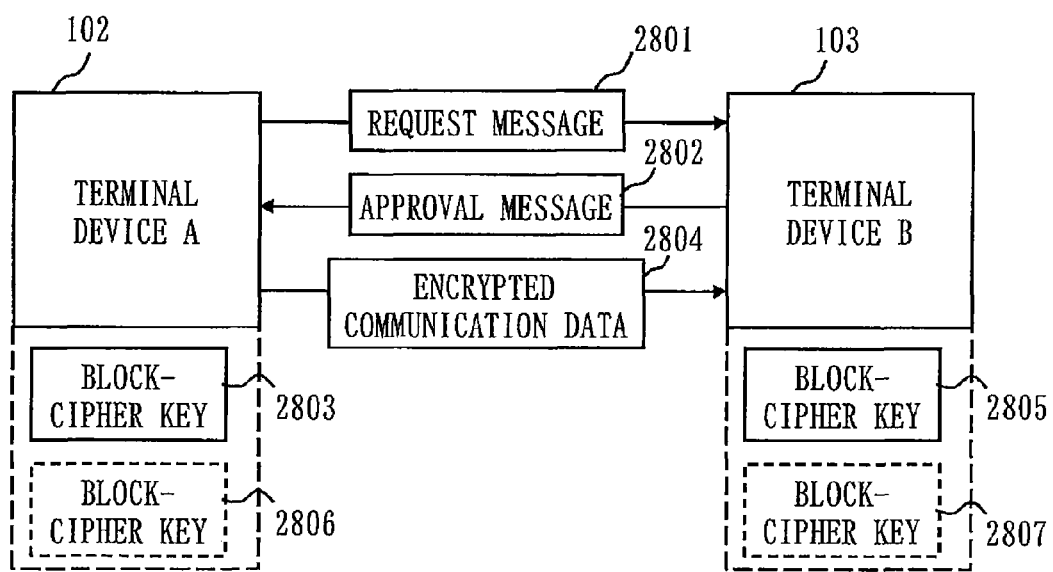
FIG. 28 is a diagram briefly showing the operation of a case where, when the terminal device A 102 and the terminal device B 103 are to start cipher communication, the Vernam-cipher key is running short and only one block-cipher key is left.

FIG. 28 is a diagram briefly showing the operation of a case where, when the terminal device A 102 and the terminal device B 103 are to start cipher communication, the Vernam-cipher key is running short and only one block-cipher key is left.

Note that the terminal device A 102 has a block-cipher key 2803 for the block cipher. Similarly, the terminal device B 103 has a block-cipher key 2805. The block-cipher key 2803 held by the terminal device A 102 and the block-cipher key 2805 held by the terminal device B 103 are the same.

The process performed since the process is started until the terminal device B 103 transmits a block-cipher switching approval message 2802 to the terminal device A 102 is the same as the process shown in FIG. 6, and accordingly an explanation thereof will be omitted.

The terminal device A 102 which has received the block-cipher communication approval message 2802 encrypts communication data by the block cipher using the block-cipher key 2803, to generate encrypted communication data 2804. The terminal device A 102 transmits the generated encrypted communication data 2804 to the terminal device B 103.

The terminal device B 103 which has received the encrypted communication data 2804 decrypts the encrypted communication data 2804 by the block-cipher key 2805, to obtain communication data.

When cipher communication is ended, the terminal device A 102 and the terminal device B 103 respectively randomize the block-cipher key 2803 and the block-cipher key 2805 by a hash function or the like, to generate a block-cipher key 2806 and a block-cipher key 2807. The terminal device A 102 and the terminal device B 103 are set to use the block-cipher key 2806 and the block-cipher key 2807 next time they are to perform encryption by block-cipher keys. At this time, the terminal device A 102 and the terminal device B 103 respectively delete the block-cipher key 2803 and the block-cipher key 2805.

Figure 29:
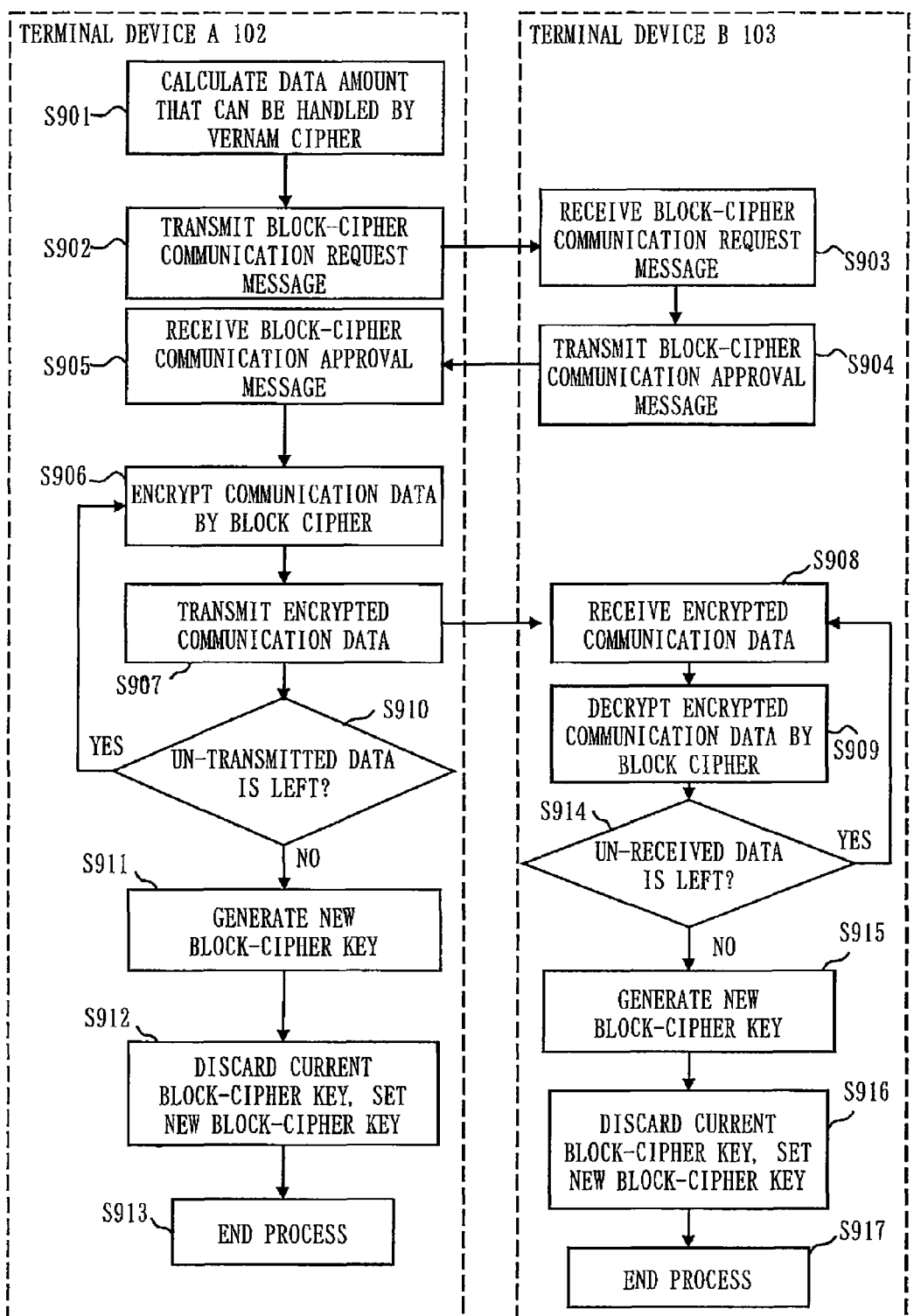
FIG. 29 is a flowchart showing the communication process flow of FIG. 28.

The communication process of FIG. 28 will now be described in detail. FIG. 29 is a flowchart showing the communication process flow of FIG. 28. In the process shown in FIG. 29, a process of renewing the used block-cipher key is performed, in addition to the process shown in FIG. 7 of Embodiment 1.

The process from S901 through S905 is the same as the process from S201 through S205 shown in FIG. 7, and a description thereof will accordingly be omitted.

When the terminal device A 102 receives the block-cipher communication approval message 2802 from the terminal device B 103, the terminal device A 102 encrypts data of a unitary data amount, out of the communication data by the block-cipher key 2803, to generate the encrypted communication data 2804 (S906). Then, the terminal device A 102 transmits the encrypted communication data 2804 to the terminal device B 103 (S907).

The terminal device B 103 receives the encrypted communication data 2804 (S908). Then, the terminal device B 103 decrypts the encrypted communication data 2804 by the block-cipher key 2805, to obtain communication data (S909).

Subsequently, the terminal device A 102 checks whether there is un-transmitted communication data (S910). If there is no un-transmitted communication data (NO in S910), the terminal device A 102 randomizes the block-cipher key 2803 by a hash function or the like, to generate the block-cipher key 2806 (S911). Then, the terminal device A 102 sets the block-cipher key 2806 for the next cipher communication, discards the block-cipher key 2803, and ends the process (S913). If there is un-transmitted communication data (YES in S910), the terminal device A 102 returns to the process of S906.

Similarly, the terminal device B 103 checks whether there is un-received communication data (S914). When the terminal device B 103 does not receive next communication data from the terminal device A 102 within a predetermined time, the terminal device B 103 determines that there is no un-received communication data. If there is no un-received communication data (NO in S914), the terminal device A 102 randomizes the block-cipher key 2805 by a hash function or the like, to generate the block-cipher key 2807 (S915). The hash function or the like used by the terminal device B 103 for randomization is the same as that used by the terminal device A 102 in S911. Hence, the block-cipher key 2807 generated in S915 is the same as the block-cipher key 2806 generated in S911. Then, the terminal device B 103 ends the process (S815). If there is un-received communication data (YES in S914), the terminal device B 103 returns to the process of S908.

The functions of the terminal device A 102 and terminal device B 103 in Embodiment 5 will now be described.

Figure 30:
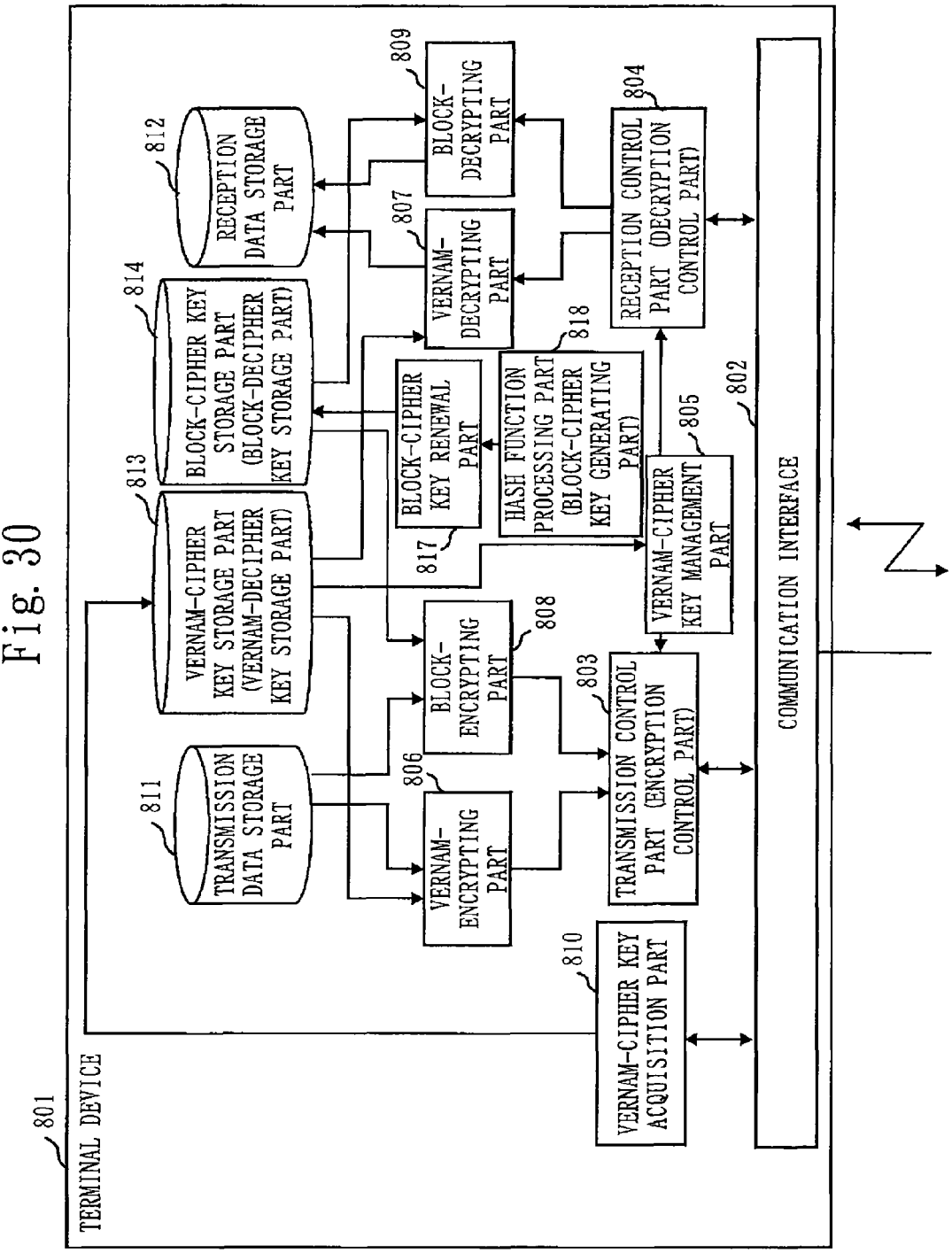
FIG. 30 is a function block diagram for explaining the functional configuration of a terminal device A 102 and terminal device B 103 in Embodiment 5.

FIG. 30 is a function block diagram for explaining the functional configuration of the terminal device A 102 and terminal device B 103 in Embodiment 5. The terminal device shown in FIG. 30 is provided with a hash function processing part 818 (block-cipher key generating part), in addition to the function provided to the terminal device shown in FIG. 27. Also, the process of the block-cipher key renewal part 817 is different in FIG. 30.

The block-cipher key renewal part 817 deletes the currently employed block-cipher key from the block-cipher key storage part 814 and sets the next block-cipher key.

If only one block-cipher key is left and there is no next block-cipher key, the block-cipher key renewal part 817 transfers the currently employed block-cipher key to the hash function processing part. Then, the block-cipher key renewal part 817 receives a new block-cipher key from the hash function processing part 818 and stores it in the block-cipher key storage part 814.

The hash function processing part 818 receives the block-cipher key from the block-cipher key renewal part 817. The hash function processing part 818 randomizes the received block-cipher key by a hash function or the like, to generate a new block-cipher key. Then, the hash function processing part 818 transfers the generated block-cipher key to the block-cipher key renewal part 817.

As described above, in the encryption system 1 according to Embodiment 5, when one block-cipher key is left, a new block-cipher key is generated out of the currently employed block-cipher key. This can enhance the security of cipher communication that uses the block cipher.

The process of generating a new block-cipher key out of a currently employed block-cipher key, like that indicated above, is executed each time cipher communication is conducted as long as only one block-cipher key is left continuously.

Embodiment 6

Embodiment 6 describes how the remaining Vernam-cipher key is expanded at the point when the remaining amount becomes smaller than a predetermined amount in Embodiments 1 to 5. This prevents shortage of the Vernam-cipher key.

An example will now be indicated in which the above function is added to Embodiment 1.

In order to conduct Vernam cipher, a cipher key of the same amount as that of data to be encrypted is needed. Accordingly, if a huge amount of data is to be encrypted, a huge amount of the cipher key will be consumed proportionally. In Embodiment 6, when the remaining amount of the Vernam-cipher key becomes smaller than that determined in advance, the amount of the Vernam-cipher key is increased by expanding the remaining Vernam-cipher key.

For example, at the point when the Vernam-cipher key becomes half, the remaining Vernam-cipher key may be expanded to become twice in length. Then, a Vernam-cipher key of the same length as the original length can be secured.

When, however, a Vernam-cipher key acquired from a key sharing device is expanded many times, the security of the Vernam-cipher key may be impaired. For example, if the Vernam-cipher key acquired from the key sharing device consists of true random numbers, when it is expanded by using pseudo-random numbers as will be described in later embodiments, its security may be impaired.

Hence, in Embodiment 6, the number of times the Vernam-cipher key acquired from the key sharing device can be expanded is limited.

First, the operation of a case will be briefly described where the terminal devices start cipher communication by the Vernam cipher and, in Embodiment 6, expand the Vernam-cipher key at the point when the remaining amount of the Vernam-cipher key becomes smaller than an amount determined in advance.

Figure 31:
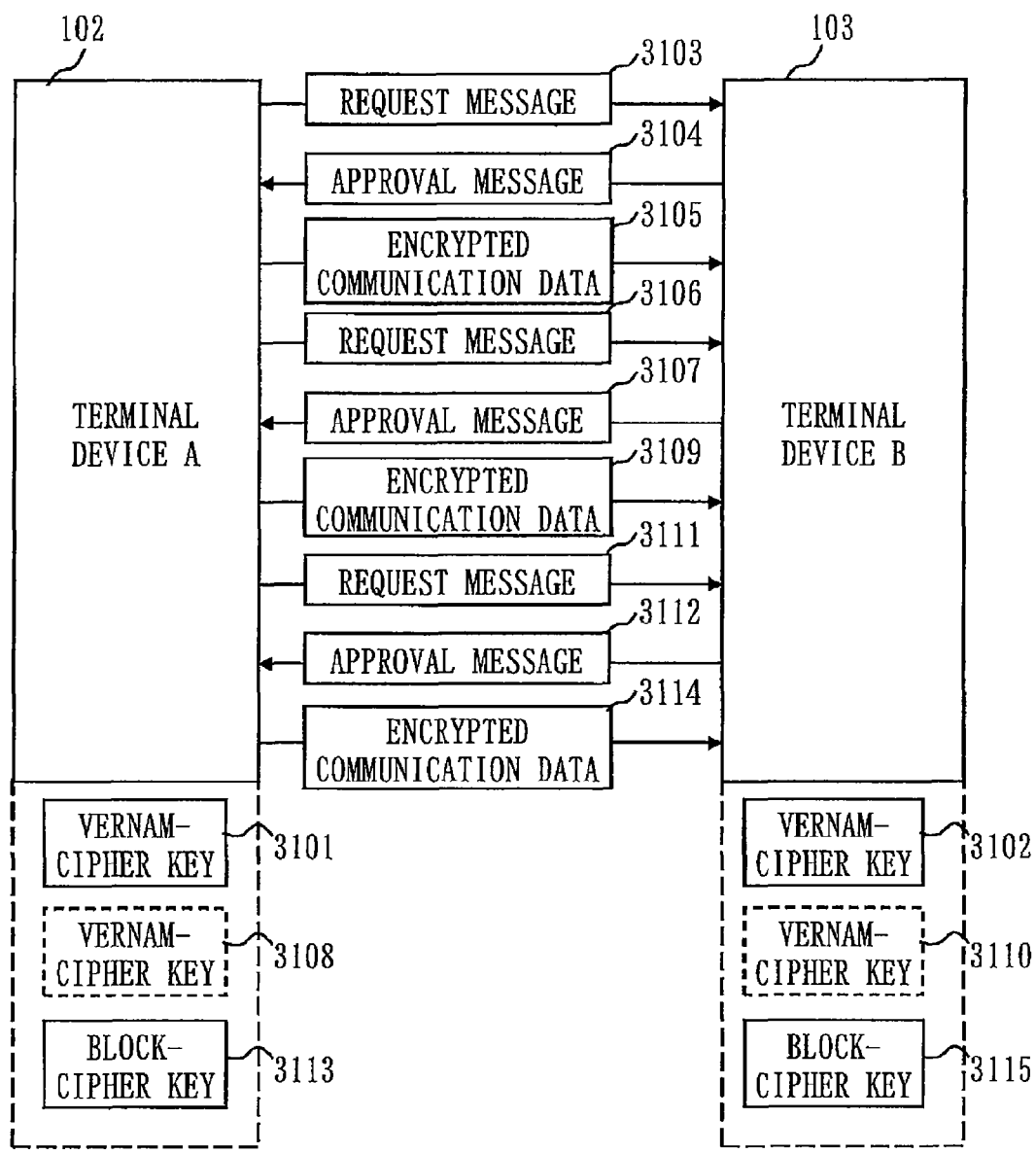
FIG. 31 is a diagram briefly showing the operation of a case where the terminal device A 102 and the terminal device B 103 start cipher communication using the Vernam cipher, and expand the Vernam-cipher key at the point when the remaining amount of the Vernam-cipher key becomes smaller than an amount determined in advance.

FIG. 31 is a diagram briefly showing the operation of a case where the terminal device A 102 and the terminal device B 103 start cipher communication by the Vernam cipher, and expand the Vernam-cipher key at the point when the remaining amount of Vernam-cipher key becomes smaller than an amount determined in advance.

As the preparation of cipher communication, the terminal device A 102 holds a Vernam-cipher key 3101 for the Vernam cipher. Similarly, the terminal device B 103 holds a Vernam-cipher key 3102. The Vernam-cipher key 3101 and the Vernam-cipher key 3102 are the same.

The terminal device A 102 holds a block-cipher key 3113 for the block cipher. Similarly, the terminal device B 103 holds a block-cipher key 3115. The block-cipher key 3113 held by the terminal device A 102 and the block-cipher key 3115 held by the terminal device B 103 are the same.

The process performed since the process is started until the terminal device B 103 obtains communication data out of encrypted communication data 3105 generated by the Vernam cipher is the same as the process shown in FIG. 4, and a description thereof will accordingly be omitted.

If the remaining amount of the Vernam-cipher key becomes smaller than the amount determined in advance because of generation of the encrypted communication data 3105, the terminal device A 102 transmits a Vernam-cipher key expansion request message 3106 to the terminal device B 103.

The terminal device B 103 which has received the Vernam-cipher key expansion request message 3106 transmits a Vernam-cipher key expansion approval message 3107 to the terminal device A 102.

The terminal device A 102 which has received the Vernam-cipher key expansion approval message 3107 expands the Vernam-cipher key 3101, to generate a new Vernam-cipher key 3108. The terminal device A 102 encrypts the communication data by the generated Vernam-cipher key 3108, to generate encrypted communication data 3109. Then, the terminal device A 102 transmits the generated encrypted communication data 3109 to the terminal device B 103.

The terminal device B 103 which has received the encrypted communication data 3109 expands the Vernam-cipher key 3102, to generate a new Vernam-cipher key 3110. The terminal device B 103 decrypts the encrypted communication data 3109 by the generated Vernam-cipher key 3110, to obtain communication data.

Note that the terminal device A 102 and the terminal device B 103 expand the Vernam-cipher keys by the same method they share in advance.

Each time the current remaining amount of the Vernam-cipher key becomes smaller than the predetermined amount, the terminal device A 102 and the terminal device B 103 perform the same expansion process until reaching a predetermined number of times. As the result of performing the expansion process the predetermined number of times, if the Vernam-cipher key becomes smaller than the predetermined amount, the terminal device A 102 and the terminal device B 103 do not perform the expansion process but execute the process to be described below.

In generation of the encrypted communication data 3109 in the terminal device A 102, if encryption is needed to exceed the data communication amount that can be handled by the Vernam cipher, the terminal device A 102 transmits a block-cipher switching request message 3111 to the terminal device B 103.

The terminal device B 103 which has received the block-cipher switching request message 3111 transmits a block-cipher switching approval message 3112 to the terminal device A 102.

The terminal device A 102 which has received the block-cipher switching approval message 3112 encrypts the communication data by a block-cipher key 3113, to generate encrypted communication data 3114. The terminal device A 102 transmits the generated encrypted communication data 3114 to the terminal device B 103.

The terminal device B 103 which has received the encrypted communication data 3114 decrypts the encrypted communication data 3114 by a block-cipher key 3115, to obtain communication data.

Figure 32:
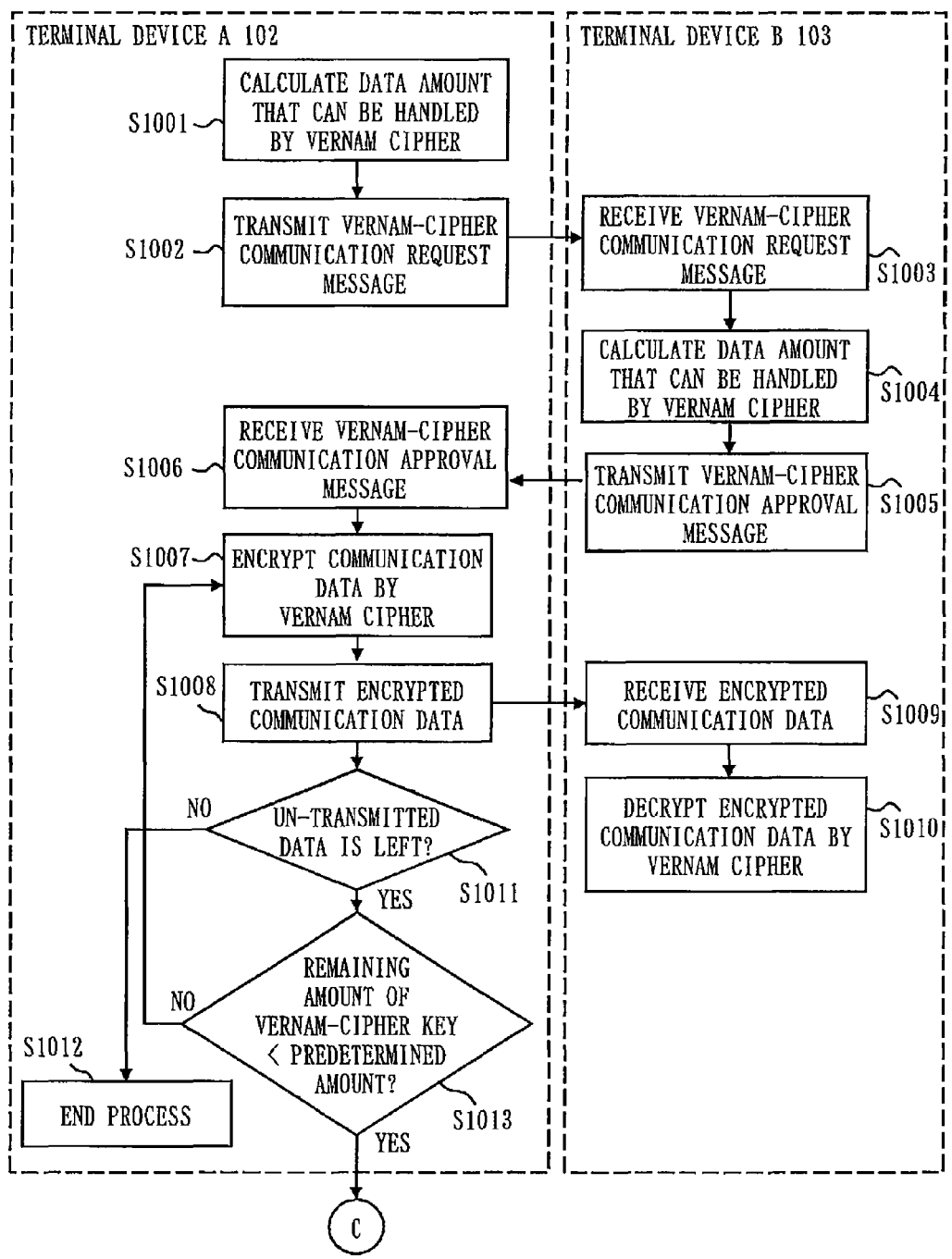
FIG. 32 is a flowchart showing the communication process flow of FIG. 31.
Figure 33:
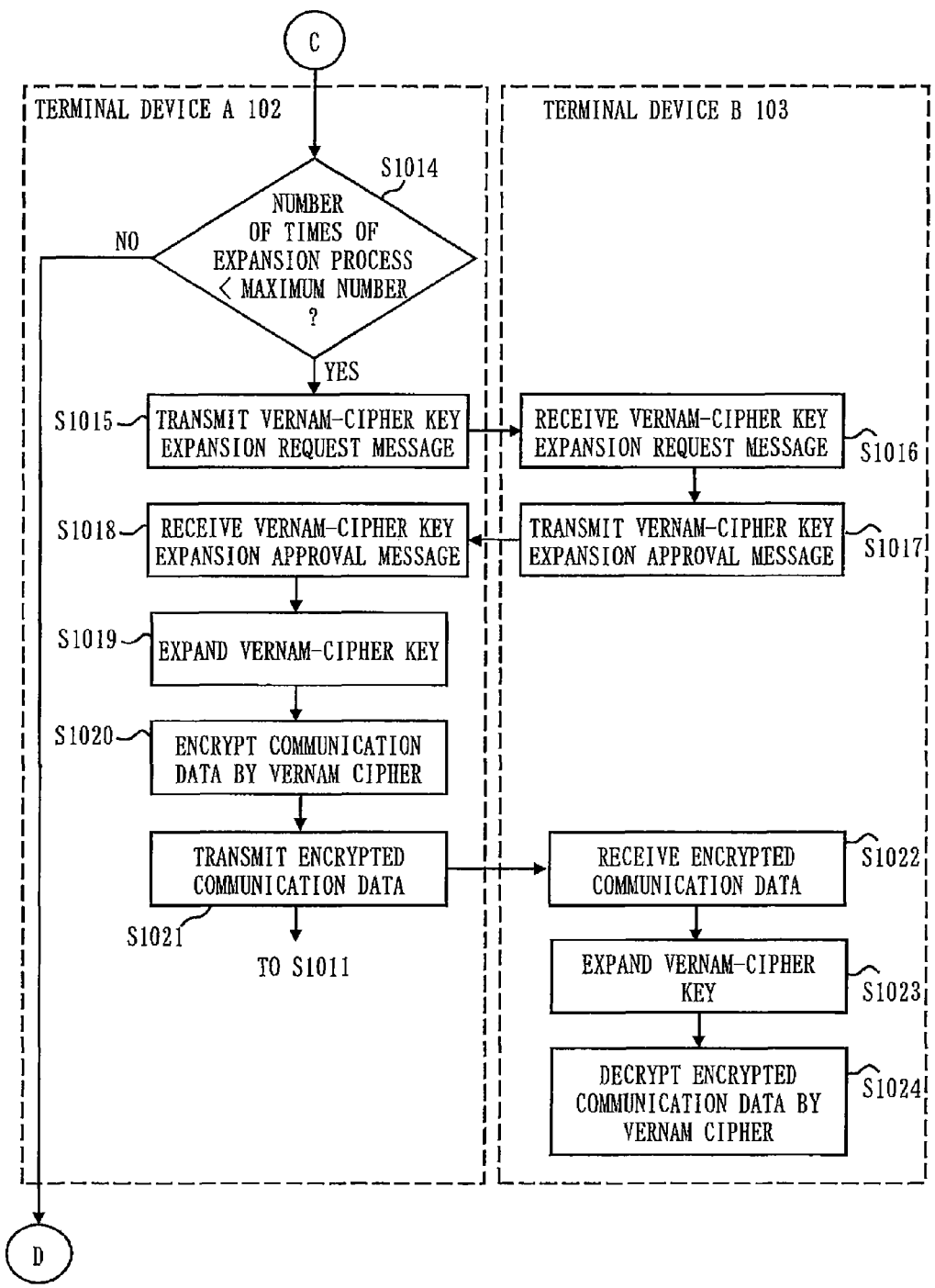
FIG. 33 is a flowchart showing the communication process flow of FIG. 31.
Figure 34:
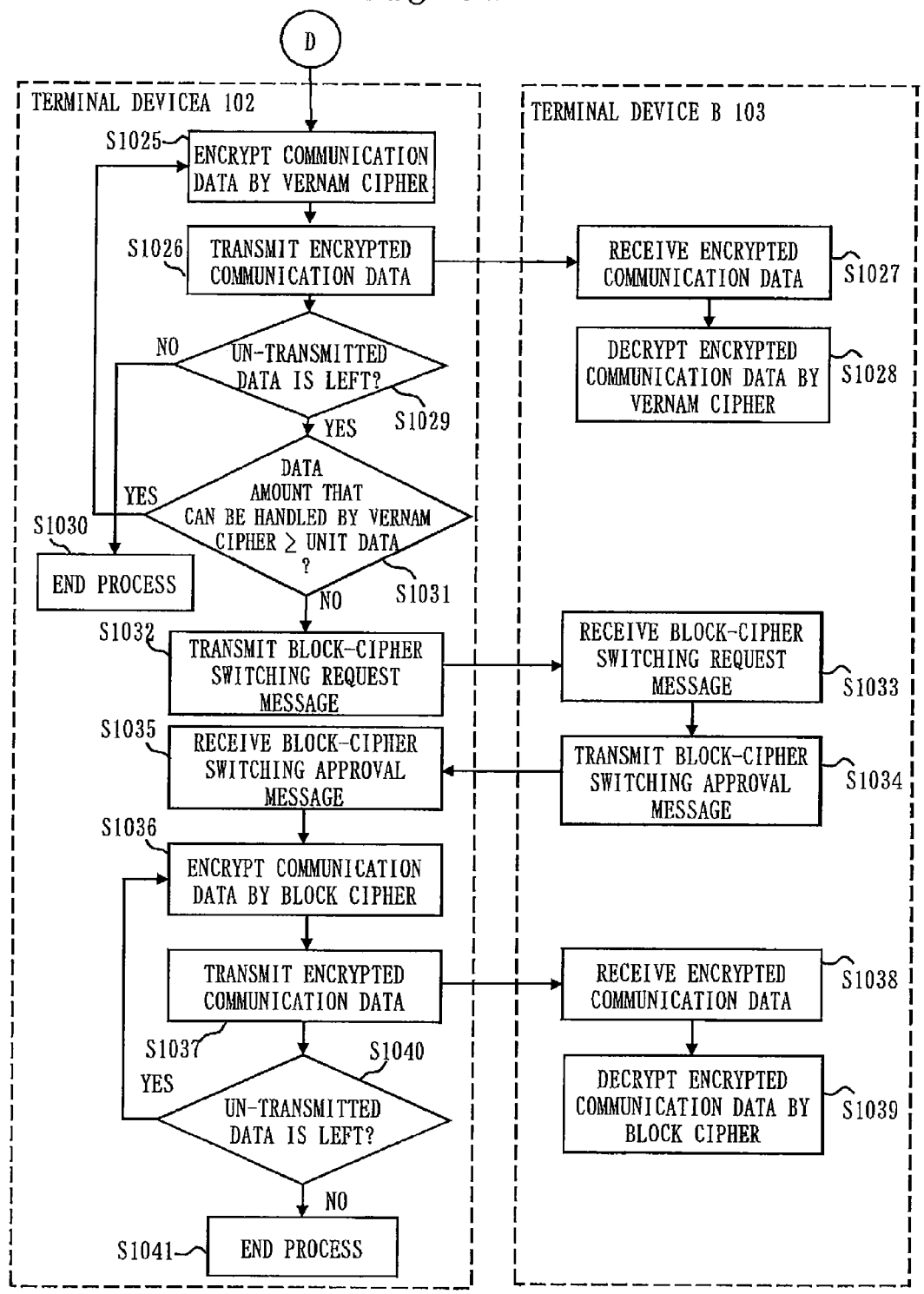
FIG. 34 is a flowchart showing the communication process flow of FIG. 31.

The communication process of FIG. 31 will be described in detail. FIGS. 32 to 34 are flowcharts showing the communication process flow of FIG. 31. In the process shown in FIGS. 32 to 34, the process for expanding the Vernam-cipher key is performed, in addition to the process of FIG. 5 in Embodiment 1.

The process from S1001 through S1012 is the same as the process from S101 through S112 shown in FIG. 5, and a description thereof will accordingly be omitted.

If there is un-transmitted communication data (YES in S1011), the terminal device A 102 checks whether the remaining amount of the Vernam-cipher key is smaller than the amount determined in advance (S1013). If the remaining amount is equal to or more than the amount determined in advance (NO in S1013), the terminal device A 102 returns to the process of S1007. If the remaining amount is smaller than the amount determined in advance (YES in S1013), the terminal device A 102 advances to the process of S1014.

Then, the terminal device A 102 checks whether the number of times the Vernam-cipher key expansion process has been performed so far is smaller than the maximum number of times determined in advance (S1014). If the number of times the expansion process is performed is equal to or more than the number of times determined in advance (NO in S1014), the terminal device A 102 advances to the process of S1025. If the number of times the expansion process is performed is smaller than the number of times determined in advance (YES in S1014), the terminal device A 102 transmits the Vernam-cipher key expansion request message 3106 to the terminal device B 103 (S1015).

The terminal device B 103 receives the Vernam-cipher key expansion request message 3106 (S1016). Then, the terminal device B 103 transmits the Vernam-cipher key expansion approval message 3107 to the terminal device A 102 (S1017).

The terminal device A 102 receives the Vernam-cipher key expansion approval message 3107 (S1018). Then, the terminal device A 102 expands the Vernam-cipher key 3101, to generate a new Vernam-cipher key 3108 (S1019). The terminal device A 102 encrypts data of the unitary data amount, out of the communication data by the generated Vernam-cipher key 3108, to generate the encrypted communication data 3109 (S1020). Then, the terminal device A 102 transmits the encrypted communication data 3109 to the terminal device B 103 (S1021).

The terminal device B 103 receives the encrypted communication data 3109 (S1022). Then, the terminal device B 103 expands the Vernam-cipher key 3102, to generate a new Vernam-cipher key 3110 (S1023). The terminal device B 103 decrypts the encrypted communication data 3109 by the generated Vernam-cipher key 3110, to obtain communication data (S1024).

After transmitting the encrypted communication data 3109 to the terminal device B 103 in S1021, the terminal device A 102 returns to the process of S1011.

If the number of times the expanding process is performed is equal to or more than the number of times determined in advance (NO in S1014), the terminal device A 102 continues encrypting the communication data by the Vernam cipher (S1025).

The process from S1026 through S1041 is the same as the process from S108 through S123 shown in FIG. 5, and a detailed description thereof will accordingly be omitted.

The functions of the terminal device A 102 and terminal device B 103 in Embodiment 6 will now be described.

Figure 35:
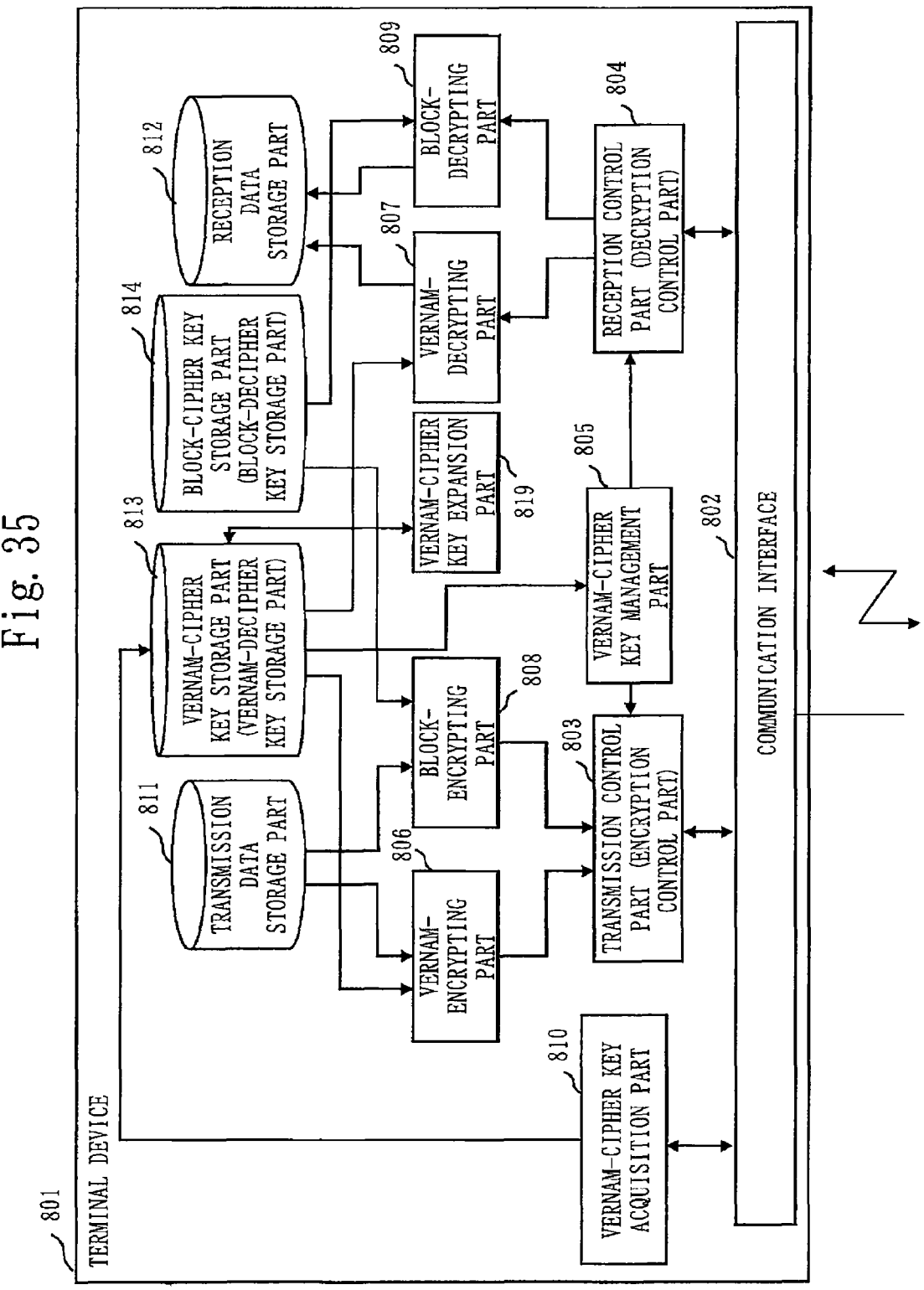
FIG. 35 is a function block diagram showing the functional configuration of a terminal device A 102 and terminal device B 103 in Embodiment 6.

FIG. 35 is a function block diagram showing the functional configuration of a terminal device A 102 and terminal device B 103 in Embodiment 6. The terminal device shown in FIG. 35 is provided with a Vernam-cipher key expansion part 819, in addition to the function provided to the terminal device shown in FIG. 8.

The Vernam-cipher key expansion part 819 acquires the remaining Vernam-cipher key from the Vernam-cipher key storage part 813 and expands the acquired Vernam-cipher key. The Vernam-cipher key expansion part 819 transfers the Vernam-cipher key obtained as the result of expansion, to the Vernam-cipher key storage part 813.

As described above, in the encryption system according to Embodiment 6, when the remaining amount of the Vernam-cipher key becomes smaller than the predetermined amount, the remaining Vernam-cipher key is subjected to the expansion process, so that the remaining Vernam-cipher key is expanded. This prevents shortage of the Vernam-cipher key.

Also, the number of times the Vernam-cipher key acquired from the key sharing device is expanded is limited, so that the degradation in security of the Vernam-cipher key by a predetermined amount or more is prevented.

Embodiment 7

Embodiment 7 describes an example of the Vernam-cipher key expanding method described in Embodiment 6.

In Embodiment 7, the Vernam-cipher key is expanded by mixing pseudo-random numbers in the remaining Vernam-cipher key in a predetermined proportion. This prevents shortage of the Vernam-cipher key while maintaining the randomness of the Vernam-cipher key.

Figure 36:
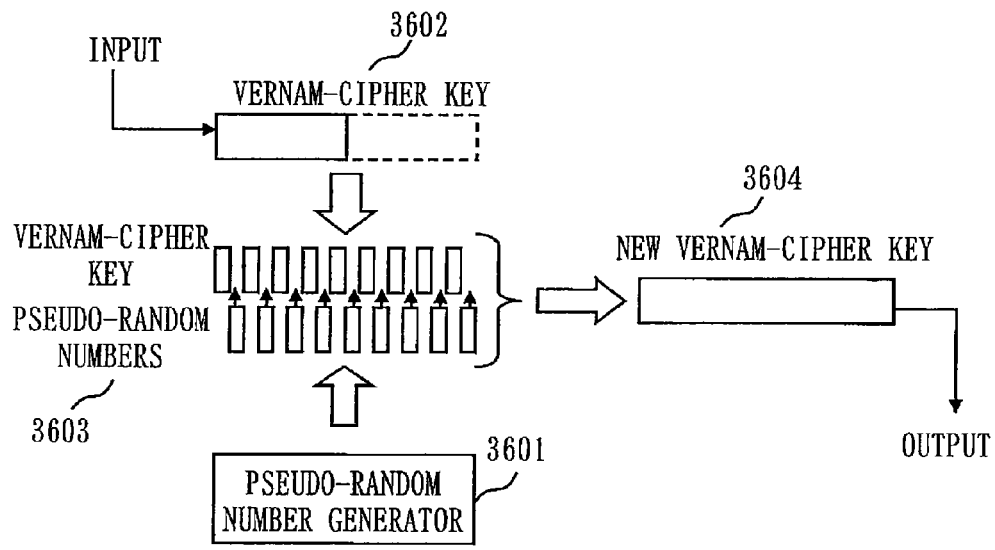
FIG. 36 is a diagram for explaining the process of a Vernam-cipher key expansion part 819 in Embodiment 7.

FIG. 36 is a diagram for explaining the process of the Vernam-cipher key expansion part 819 in Embodiment 7.

The Vernam-cipher key expansion part 819 incorporates a pseudo-random number generator 3601. When a Vernam-cipher key 3602 is inputted, the Vernam-cipher key expansion part 819 decomposes it into small units, for example, bitwise. The Vernam-cipher key expansion part 819 then interposes pseudo-random numbers 3603 received from the pseudo-random number generator 3601 into the decomposed Vernam-cipher key 3602.

By this process, the Vernam-cipher key expansion part 819 generates a new Vernam-cipher key 3604 out of the inputted Vernam-cipher key 3602, and outputs it. In this example, the length of the new Vernam-cipher key 3604 is twice the length of the inputted Vernam-cipher key 3602.

Embodiment 8

Embodiment 8 describes an example which is an example of the Vernam-cipher key expanding method described in Embodiment 6 but is different from the example of Embodiment 7.

In Embodiment 8, using the remaining Vernam-cipher key as the seed, pseudo-random numbers are generated by a hash function or cryptosystem, and the obtained pseudo-random numbers are treated as a new Vernam-cipher key. This prevents exhaustion of the Vernam-cipher key while maintaining the randomness of the Vernam-cipher key.

Figure 37:
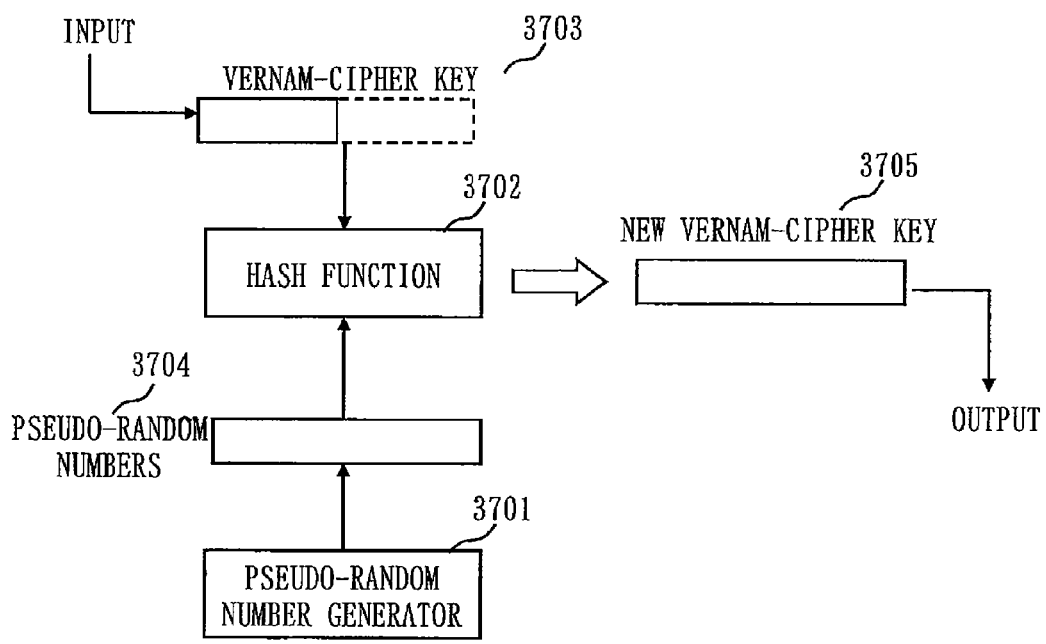
FIG. 37 is a diagram for explaining the process of a Vernam-cipher key expansion part 819 in Embodiment 8.

FIG. 37 is a diagram for explaining the process of the Vernam-cipher key expansion part 819 in Embodiment 8.

The Vernam-cipher key expansion part 819 incorporates a pseudo-random number generator 3701 and a hash function 3702. When a Vernam-cipher key 3703 is inputted, the Vernam-cipher key expansion part 819 combines the Vernam-cipher key 3703 with pseudo-random numbers 3704 received from the pseudo-random number generator 3701, and inputs the combination to the hash function 3702. To combine the pseudo-random numbers 3704 and the Vernam-cipher key 3703 means to add the pseudo-random numbers 3704 before or after the Vernam-cipher key 3703. The combination is randomized by the hash function 3702, and the randomized combination is outputted as a new Vernam-cipher key 3705.

By this process, the Vernam-cipher key expansion part 819 generates the new Vernam-cipher key 3705 out of the inputted Vernam-cipher key 3703, and outputs the generated new Vernam-cipher key 3705. In this example, the length of the new Vernam-cipher key 3705 is restored to the length of the original Vernam-cipher key by the hash function 3702.

Embodiment 9

Embodiments 1 to 8 have been described on the premise that the terminal device is connected to the key sharing device. When, however, the terminal device is a portable terminal such as a mobile telephone, a situation where the terminal device and the key sharing device are not connected is possible. In this case, because the timing to transfer the Vernam-cipher key or block-cipher key from the key sharing device to the terminal device is not the same between the terminal devices, the amount of the cipher key held by the terminal device may be different between the terminal devices.

For example, assume that the terminal device A 102 acquires a Vernam-cipher key from the key sharing device C 104 at a certain point, and after that the key sharing device C 104 and the key sharing device D 105 share a new Vernam-cipher key; then, the terminal device B 103 acquires the Vernam-cipher key from the key sharing device D 105. Then, it follows that the terminal device B 103 holds the Vernam-cipher key that the terminal device A 102 does not. In this case, when cipher communication is to be conducted between the terminal device A 102 and the terminal device B 103, the Vernam-cipher key of the terminal device A 102 will run short first.

In view of this, Embodiment 9 describes a case where, before conducting cipher communication, the terminal devices share information on the Vernam-cipher keys they hold respectively, and cipher communication is switched depending on the statuses of the Vernam-cipher keys that the terminal devices hold.

First, the process of a case will be described where the terminal device A 102 and the terminal device B 103 start cipher communication by the Vernam cipher in Embodiment 9, and switch the cryptosystem to cipher communication using the block cipher at the point when the Vernam-cipher key starts to run short.

Figure 38:
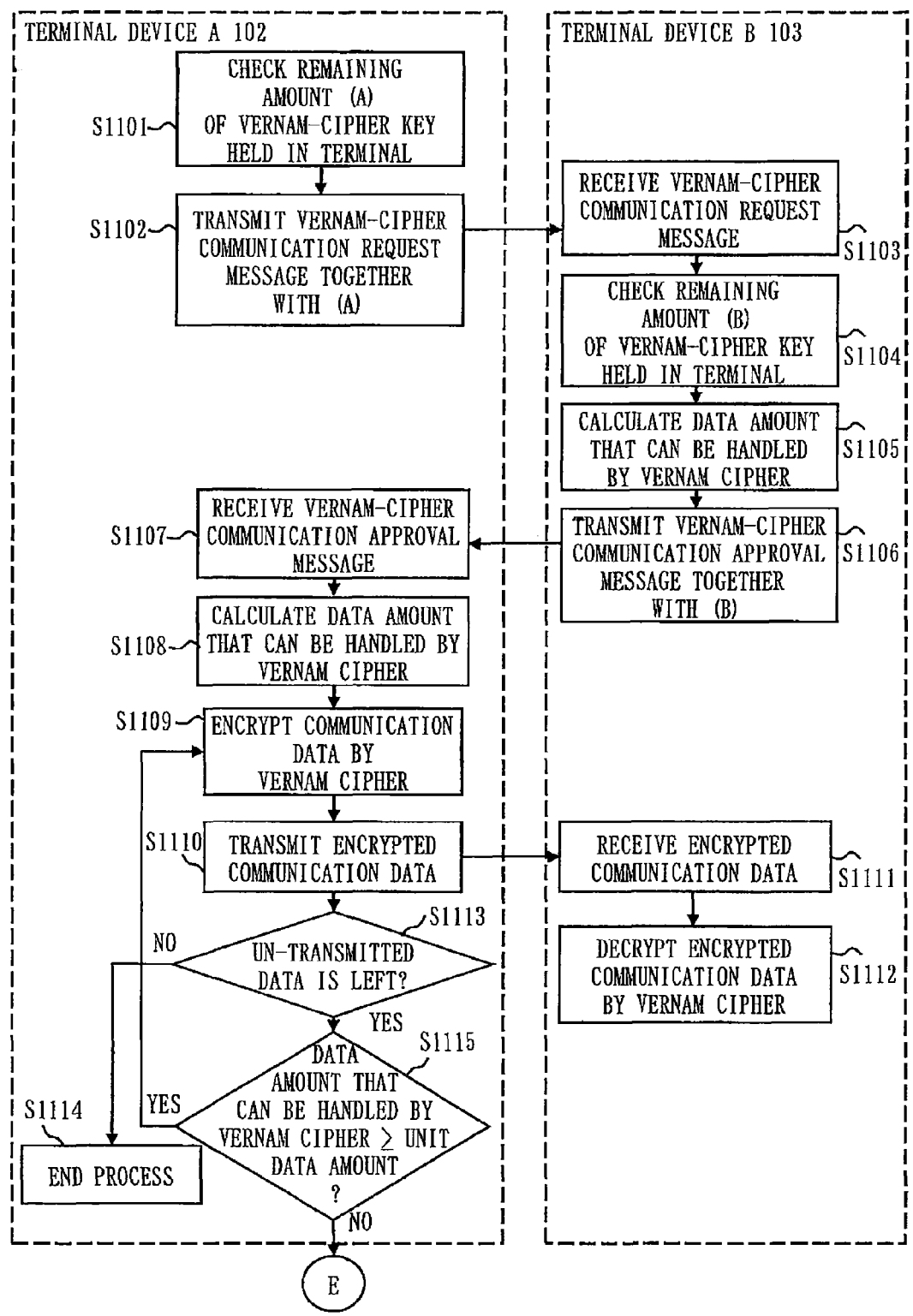
FIG. 38 is a flowchart showing the communication process flow of FIG. 4 in Embodiment 9.
Figure 39:
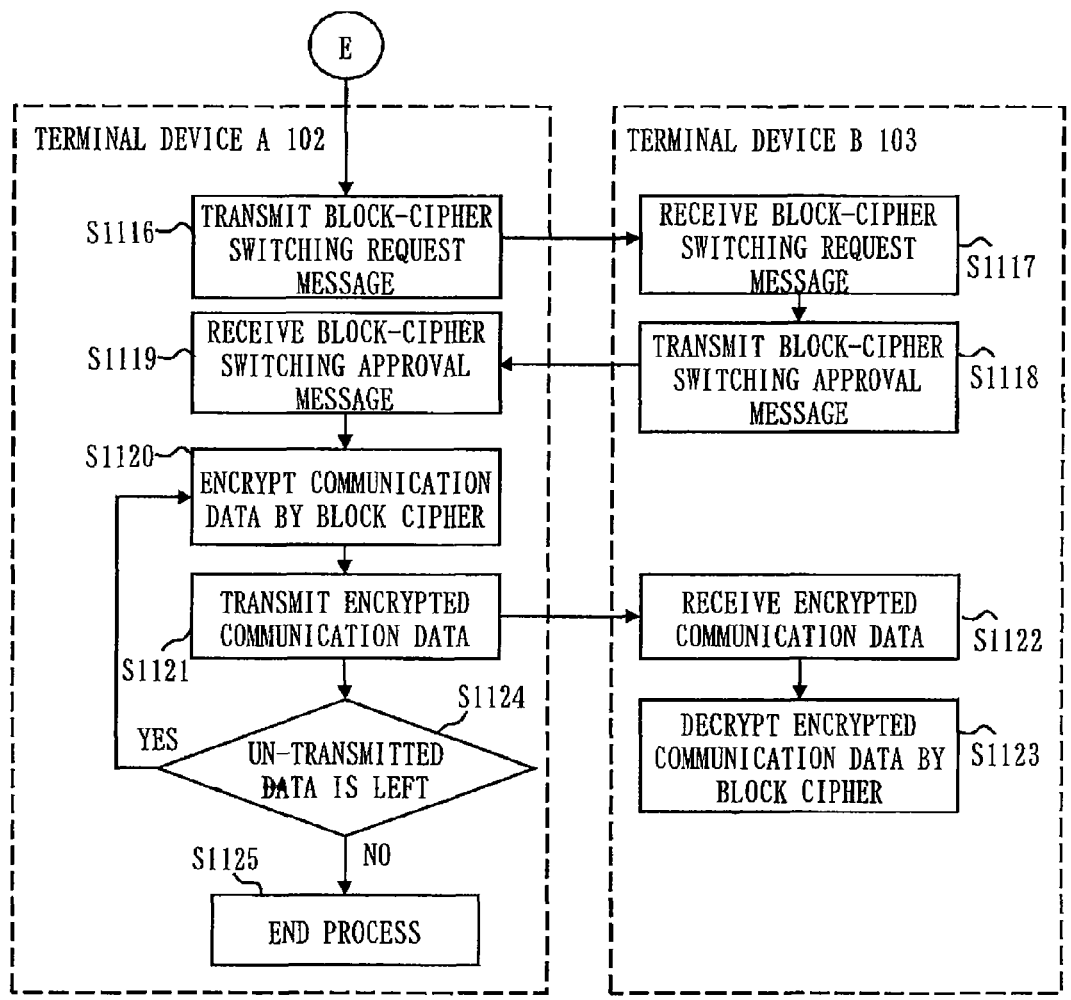
FIG. 39 is a flowchart showing the communication process flow of FIG. 4 in Embodiment 9.

FIGS. 38 and 39 are flowcharts showing the communication process flow of FIG. 4 in Embodiment 9. In the process shown in FIGS. 38 and 39, a process of sharing the remaining amount of the Vernam-cipher key between the terminal devices in advance is performed, in addition to the process of FIG. 5 in Embodiment 1.

The terminal device A 102 checks the amount of the Vernam-cipher key 401 it holds (S1101), and transmits the Vernam-cipher communication request message 403, together with the remaining amount value of the Vernam-cipher key 401, to the terminal device B 103 (S1102).

The terminal device B 103 receives the Vernam-cipher communication request message 403 from the terminal device A 102 (S1103). Then, the terminal device B 103 checks the amount of the Vernam-cipher key 402 it holds (S1104), and calculates the data amount that can be cipher-communicated by the Vernam cipher (S1105). Subsequently, the terminal device B 103 transmits the Vernam-cipher communication approval message 404, together with the remaining amount value of the Vernam-cipher key 402, to the terminal device A 102 (S1106).

The terminal device A 102 receives the Vernam-cipher communication approval message 404 from the terminal device B 103 (S1107). Then, the terminal device A 102 calculates the data amount that can be cipher-communicated by the Vernam cipher (S1108). The terminal device A 102 also encrypts data of the unitary data amount, out of the communication data by using the Vernam-cipher key 401, to generate the encrypted communication data 405 (S1109). Then, the terminal device A 102 transmits the encrypted communication data 405 to the terminal device B 103 (S1110).

The terminal device B 103 receives the encrypted communication data 405 from the terminal device A 102 (S1111). Then, the terminal device B 103 decrypts the encrypted communication data 405 by the Vernam-cipher key 402, to obtain communication data (S1112).

Subsequently, the terminal device A 102 checks whether there is un-transmitted communication data (S1113). If there is no un-transmitted communication data (NO in S1113), the terminal device A 102 ends the process (S1114). If there is un-transmitted communication data (YES in S1113), the terminal device A 102 advances to the process of S1115.

The terminal device A 102 checks whether the data amount that can be cipher-communicated by the Vernam cipher is equal to or larger than the unitary data amount which is encrypted by one encryption (S1115). At this time, the terminal device A 102 calculates the data amount which it can cipher-communicate by the Vernam cipher, from the data amount calculated in (S1108). The terminal device A 102 also calculates the data amount that the terminal device B 103 can cipher-communicate by the Vernam cipher at this time point, from the remaining amount of the Vernam-cipher key which is held by the terminal device B 103 and which the terminal device A 102 receives together with the Vernam-cipher communication approval message 404. Then, the terminal device A 102 checks whether the smaller data amount, between the data amount that the terminal device A 102 can cipher-communicate and the data amount that the terminal device B 103 can cipher-communicate, by the Vernam cipher is equal to or exceeds the unitary data amount which is encrypted by one encryption.

If the data amount that is smaller is equal to or larger than the unitary data amount (YES in S1115), the terminal device A 102 returns to the process of S1109. If the smaller data amount is smaller than the unitary data amount (NO in S1115), the terminal device A 102 transmits the block-cipher switching request message 406 to the terminal device B 103 (S1116).

The process from S1117 through S1125 is the same as the process from S115 through S123 shown in FIG. 5, and a description thereof will accordingly be omitted.

The operation of a case will be briefly described where cipher communication by the block cipher is to be started when the Vernam-cipher key of the reception-side terminal device is running short at the start of communication and cipher communication by the Vernam cipher cannot be started.

Figure 40:
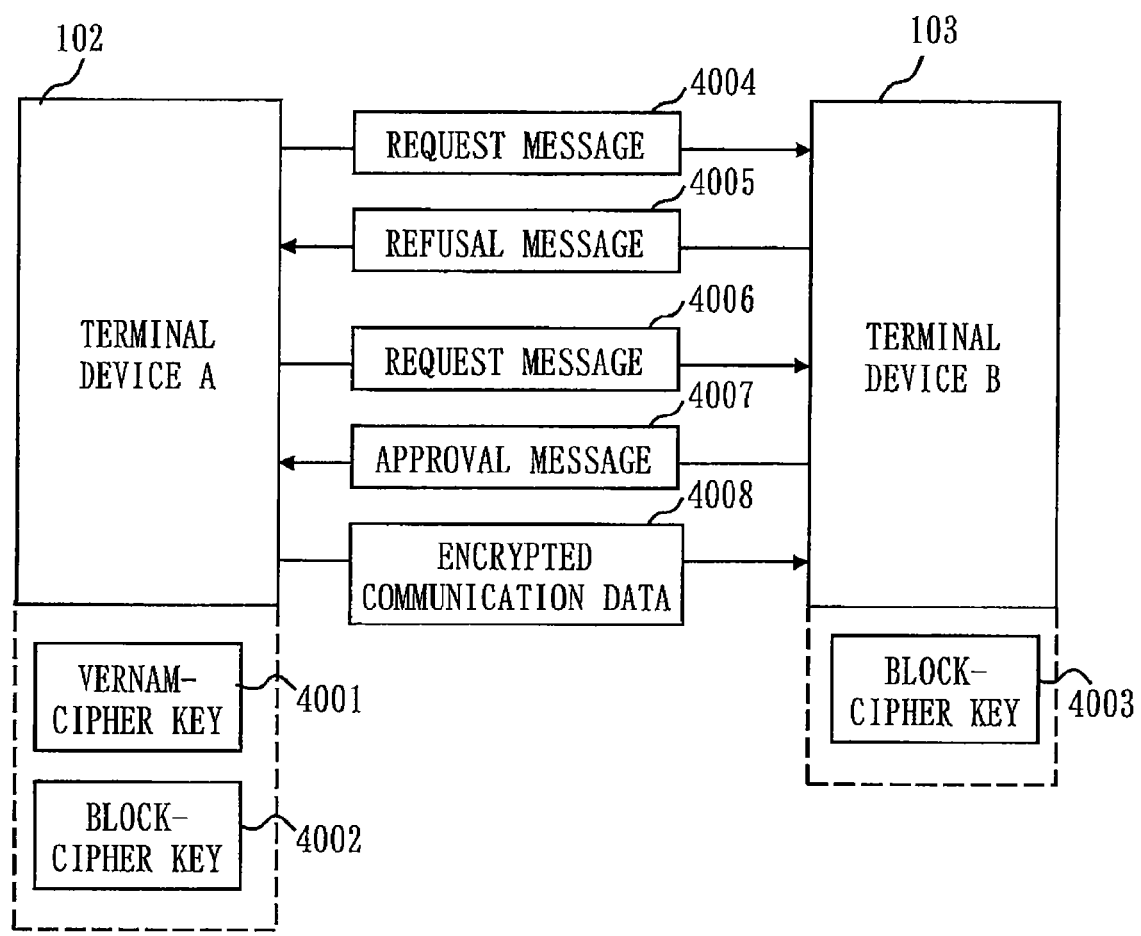
FIG. 40 is a diagram briefly showing the operation of a case where in Embodiment 9, a terminal device A 102 and a terminal device B 103 start cipher communication using the block cipher because the Vernam-cipher key of the terminal device B 103 is running short at the start of the cipher communication.

FIG. 40 is a diagram briefly showing the operation of a case where in Embodiment 9, the terminal device A 102 and the terminal device B 103 start cipher communication by the block cipher, because the Vernam-cipher key of the terminal device B 103 is running short at the point when the terminal device A 102 and the terminal device B 103 start cipher communication.

Assume that the terminal device A 102 holds a Vernam-cipher key 4001 and a block-cipher key 4002 and that the terminal device B 103 does not hold a Vernam-cipher key but holds a block-cipher key 4003. Namely, the Vernam-cipher key in the terminal device B 103 is exhausted.

First, the terminal device A 102 checks the amount of the Vernam-cipher key 4001 it holds, and transmits a Vernam-cipher communication request message 4004 to the terminal device B 103.

The terminal device B 103 which has received the Vernam-cipher communication request message 4004 confirms that the Vernam-cipher key is exhausted, and transmits a Vernam-cipher communication refusal message 4005.

The terminal device A 102 which has received the Vernam-cipher communication refusal message 4005 transmits a block-cipher communication request message 4006 to the terminal device B 103.

The terminal device B 103 which has received the block-cipher communication request message 4006 transmits a block-cipher communication approval message 4007 to the terminal device A 102.

The subsequent process to this is the same as the process shown in FIG. 6, and a description thereof will accordingly be omitted.

Figure 41:
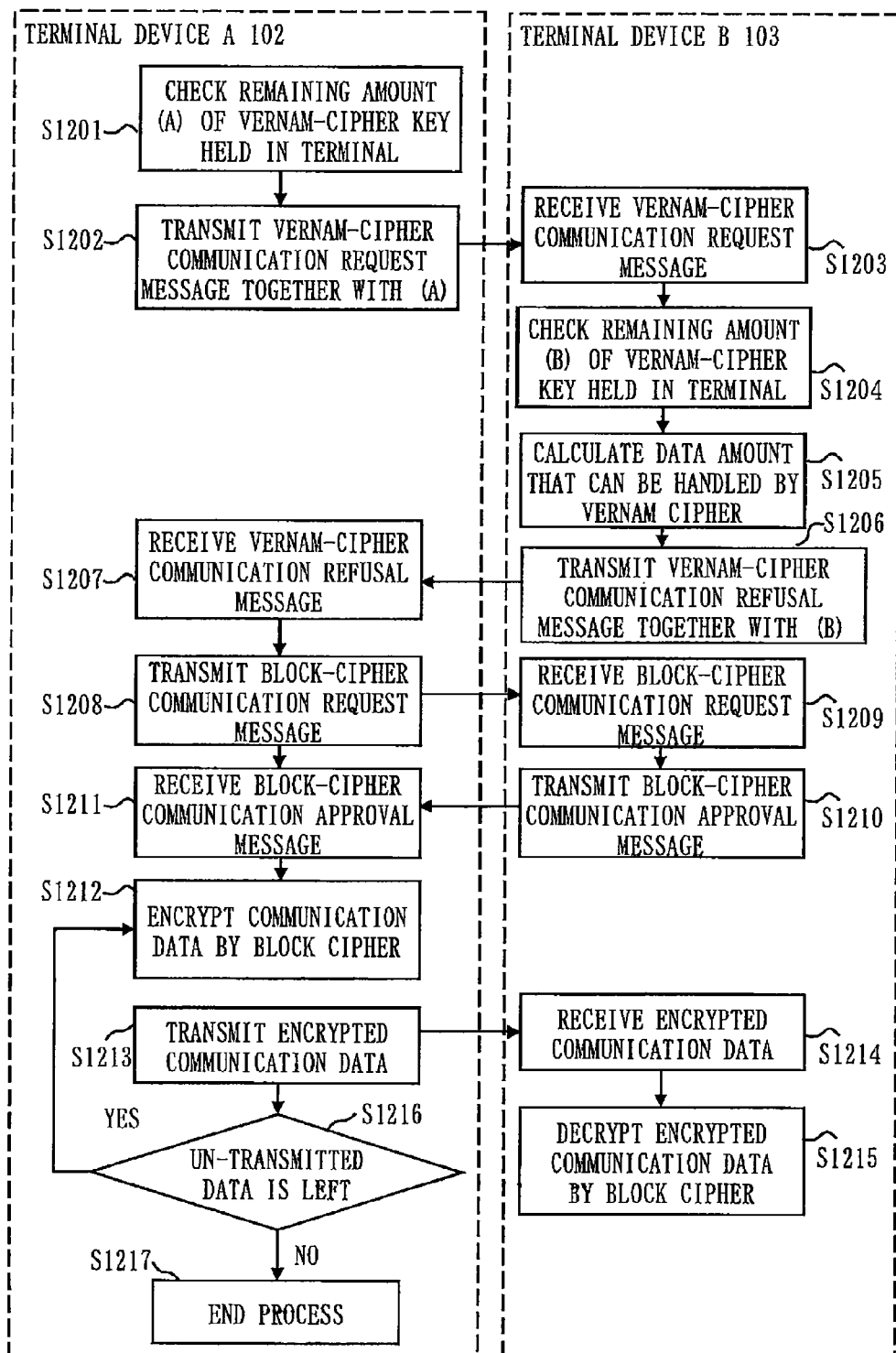
FIG. 41 is a flowchart showing the communication process flow of FIG. 40.

The communication process of FIG. 40 will be described in detail. FIG. 41 is a flowchart showing the communication process flow of FIG. 40.

First, the terminal device A 102 checks the amount of the Vernam-cipher key 4001 it holds (S1201), and transmits the Vernam-cipher communication request message 4004 to the terminal device B 103 (S1202).

The terminal device B 103 receives the Vernam-cipher communication request message 4004 (S1203). Then, the terminal device B 103 checks the amount of the Vernam-cipher key it holds (S1204), and calculates that the data amount that can be cipher-communicated by the Vernam cipher is running short (S1205). The terminal device B 103 transmits the Vernam-cipher communication refusal message 4005 to the terminal device A 102 (S1206).

The terminal device A 102 receives the Vernam-cipher communication refusal message 4005 (S1207). Then, the terminal device A 102 transmits the block-cipher communication request message 4006 to the terminal device B 103 (S1208).

The process from S1209 through S1217 is the same as the process from S203 through S211 shown in FIG. 7, and a description thereof will accordingly be omitted.

The process of the terminal device A 102 which is a transmission-side terminal device will be described in detail.

Figure 42:
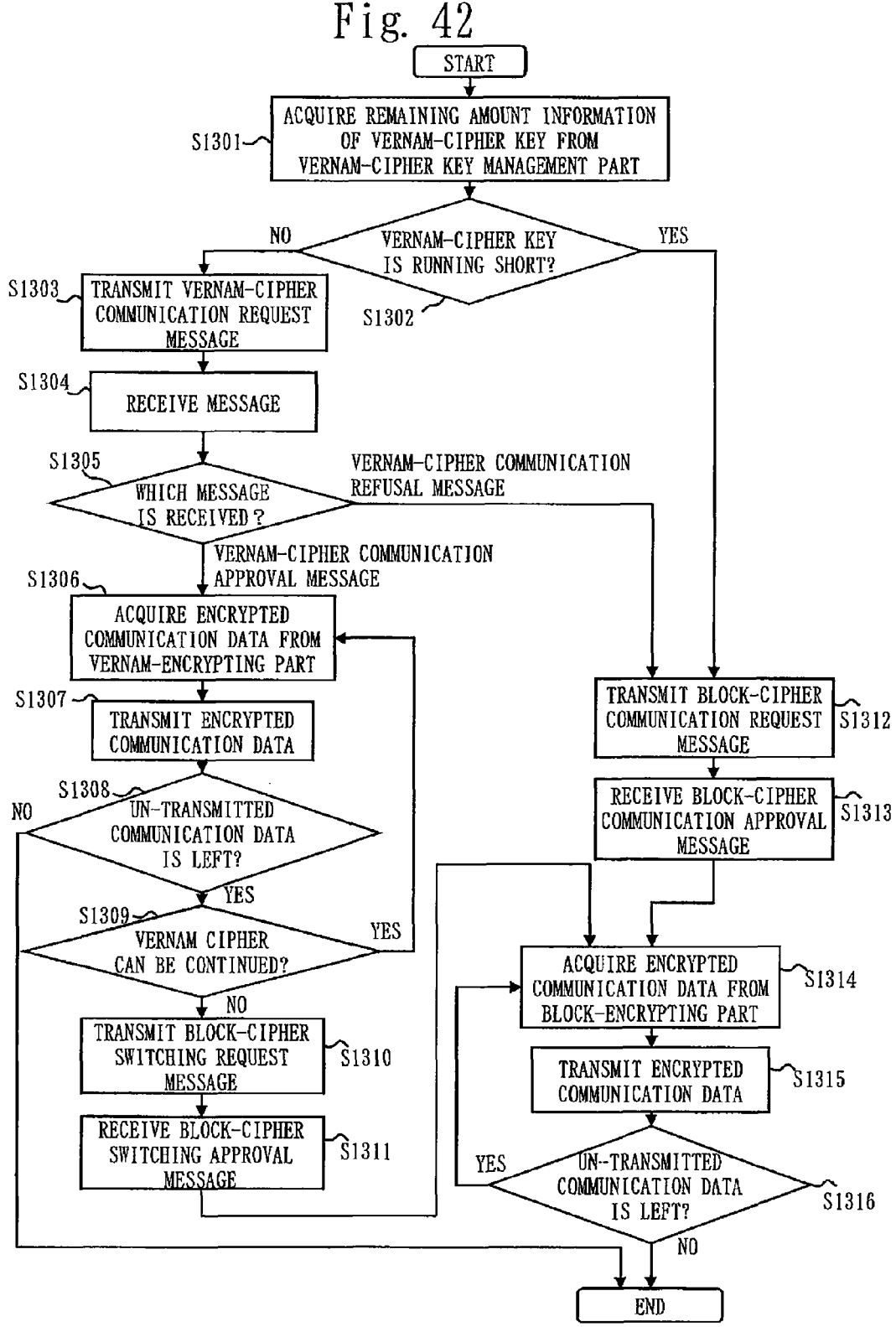
FIG. 42 is a flowchart showing the process flow of a transmission control part 803 of a terminal device 801 in Embodiment 9.

FIG. 42 is a flowchart showing the process flow of the transmission control part 803 of the terminal device 801 in Embodiment 9.

The transmission control part 803 acquires remaining amount information indicating whether or not the remaining amount of the Vernam-cipher key is running short, from the Vernam-cipher key management part 805 (S1301). If the remaining amount of the Vernam-cipher key is not running short (NO in S1302), the transmission control part 803 advances to the process of S1303. If the remaining amount of the Vernam-cipher key is running short (YES in S1302), the transmission control part 803 advances to the process of S1312 (S1302).

The transmission control part 803 transmits the Vernam-cipher communication request message to the terminal device B 103 via the communication interface 802 (S1303), and receives a message from the terminal device B 103 (S1304). If the received message is a Vernam-cipher communication approval message, the transmission control part 803 advances to the process of S1306. If the received message is a Vernam-cipher communication refusal message, the transmission control part 803 advances to the process of S1312.

The process from S1306 through S1316 is the same as the process from S305 to S315 shown in FIG. 9, and a description thereof will accordingly be omitted.

The process of the terminal device B 103 which is a reception-side terminal device will be described in detail.

Figure 43:
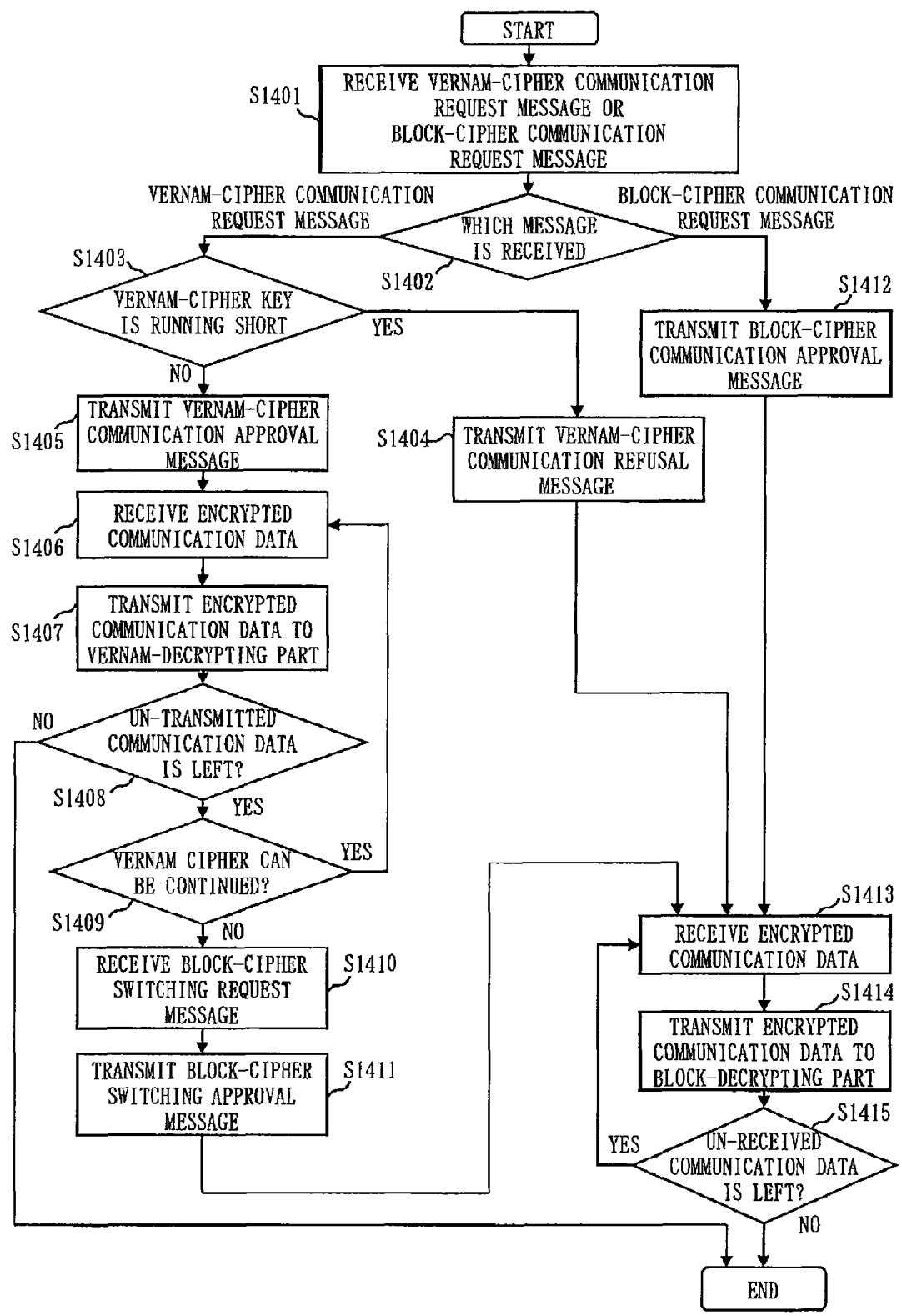
FIG. 43 is a flowchart showing the process flow of a reception control part 804 of the terminal device 801 in Embodiment 9.

FIG. 43 is a flowchart showing the process flow of the reception control part 804 of the terminal device 801 in Embodiment 9.

The reception control part 804 receives a Vernam-cipher communication request message or a block-cipher communication request message from the terminal device A 102 via the communication interface 802 (S1401). If the reception control part 804 receives a Vernam-cipher communication request message, it advances to the process of S1403; if it receives a block-cipher communication request message, it advances to the process of S1403 (S1402).

The reception control part 804 acquires remaining amount information indicating whether or not the remaining amount of the Vernam-cipher key is running short, from the Vernam-cipher key management part 805 (S1403). If the remaining amount of the Vernam-cipher key is running short (YES in S1403), the reception control part 804 advances to the process of S1404. If the remaining amount of the Vernam-cipher key is not running short (NO in S1403), the reception control part 804 advances to the process of S1405.

If the remaining amount of the Vernam-cipher key is running short, the reception control part 804 transmits a Vernam-cipher communication refusal message to the terminal device A 102 (S1404), and advances to the process of S1413.

The process from S1405 through S1415 is the same as the process from S403 through S413 shown in FIG. 10, and a description thereof will accordingly be omitted.

As described above, in the encryption system 1 according to Embodiment 9, the terminal devices share the remaining amounts of the Vernam-cipher keys they hold respectively. Thus, even when the Vernam-cipher keys they hold are different, the cryptosystem can be switched.

In the above description, the cryptosystem is switched to adapt to either one of the terminal device A 102 and the terminal device B 103 in which the remaining amount of the Vernam-cipher key is smaller.

A case is also possible where the Vernam-cipher key held by the terminal device A 102 and the Vernam-cipher key held by the terminal device 103 are not the same. Namely, there may be a case where the terminal device B 103 does not hold part of the Vernam-cipher key held by the terminal device A 102, and the terminal device A 102 does not hold part of the Vernam-cipher key held by the terminal device B 103. In this case, the cryptosystem must be switched in accordance with the remaining amount of the Vernam-cipher key that the terminal device A 102 and the terminal device B 103 hold in common.

In this case, for example, when the terminal device is to acquire the Vernam-cipher key from the key sharing device, the terminal device counts the bit count of the Vernam-cipher key. For example, first, if the terminal device has acquired a 1000-bit Vernam-cipher key from the key sharing device, the terminal device counts this as having acquired the bits of the Vernam-cipher key, from the 1st bit to the 1000th bit. Then, when the terminal device has acquired a 500-bit Vernam cipher key from the key sharing device, the terminal device counts this as having acquired the bits of the Vernam-cipher key, from the 1001st bit to the 1500th bit.

The terminal device also counts the bit count of the Vernam-cipher key it has employed. For example, if the terminal device has initially used a 100-bit Vernam cipher key, the terminal device counts this as having used the bits of the Vernam-cipher key, from 1st bit to the 100th bit.

As a result, the terminal device can learn what bits of the Vernam-cipher key, from what-number bit to what-number bit, are currently left available.

In this case, instead of checking the remaining amount of the Vernam-cipher key, the terminal device A 102 checks what bits of the Vernam-cipher key, from what-number bit to what-number bit, are left available. Then, the terminal device A 102 transmits information indicating what bits of the Vernam-cipher key, from what-number bit to what-number bit, are left available, together with the Vernam cipher communication request message, to the terminal device B 103.

The terminal device B 103 checks what bits of the Vernam-cipher key, from what-number bit to what-number bit, are left available. Then, the terminal device B 103 specifies the common portion of the Vernam-cipher key held by the terminal device A 102 and the Vernam-cipher key held by the terminal device B 103. If the data amount that can be cipher-communicated by the common portion exceeds the unitary data amount which is encrypted by one encryption, the terminal device B 103 transmits, together with the Vernam-cipher communication approval message, information indicating what bits of the Vernam-cipher key, from what-number bit to what-number bit, are left available, to the terminal device A 102. If the common portion does not exceed the unitary data amount, the terminal device B 103 sends a Vernam-cipher communication refusal message in return.

When the terminal device A 102 receives a Vernam-cipher communication approval message, the terminal device A 102 specifies the common portion of the Vernam-cipher key held by the terminal device A 102 and the Vernam-cipher key held by the terminal device B 103. Then, the terminal device A 102 encrypts the data of the unit amount, out of the communication data by the specified common-portion Vernam-cipher key, to generate encrypted data, and transmits the encrypted data to the terminal device B 103.

If there is un-transmitted communication data, the terminal device A 102 checks whether the data amount that can be cipher-communicated by the remaining common-portion Vernam-cipher key exceeds the unitary data amount which is encrypted by one encryption. If this data amount exceeds the unitary data amount, the terminal device A 102 conducts cipher communication by the Vernam cipher. If this data amount does not exceed the unitary data amount, the terminal device A 102 switches to cipher communication by the block cipher.

Embodiment 10

Embodiment 4 has described how a plurality of block-cipher keys are held; a block-cipher key used for cipher communication is discarded periodically; and cipher communication is performed using a new block-cipher key. In Embodiment 4, the description was made on the premise that the terminal device is connected to the key sharing device.

However, as described in Embodiment 9, when, for example, the terminal device is a portable terminal, a situation is possible where the terminal device and the key sharing device are not connected. In this case, it is possible that the cipher keys held by the respective terminal devices are different because the timing and the frequency the Vernam-cipher key or block-cipher key is transferred from the key sharing device to the terminal device do not coincide between the terminal devices. Also, there is a possibility that, due to a communication error or the like between the terminal devices, the Vernam-cipher key and the block-cipher key are consumed differently. For these reasons, the cipher key to be used for cipher communication must be determined at the start of communication.

Hence, Embodiment 10 will describe how the respective terminal devices share the number of block-cipher keys they hold before cipher communication, and switch cipher communication in accordance with the statuses of the block-cipher keys that they hold.

First, the process of a case in Embodiment 10 will be described where the terminal device A 102 and the terminal device B 103 start cipher communication by the Vernam cipher, and the cryptosystem is switched to cipher communication by the block cipher at the point when the Vernam-cipher key starts to run short.

Figure 44:
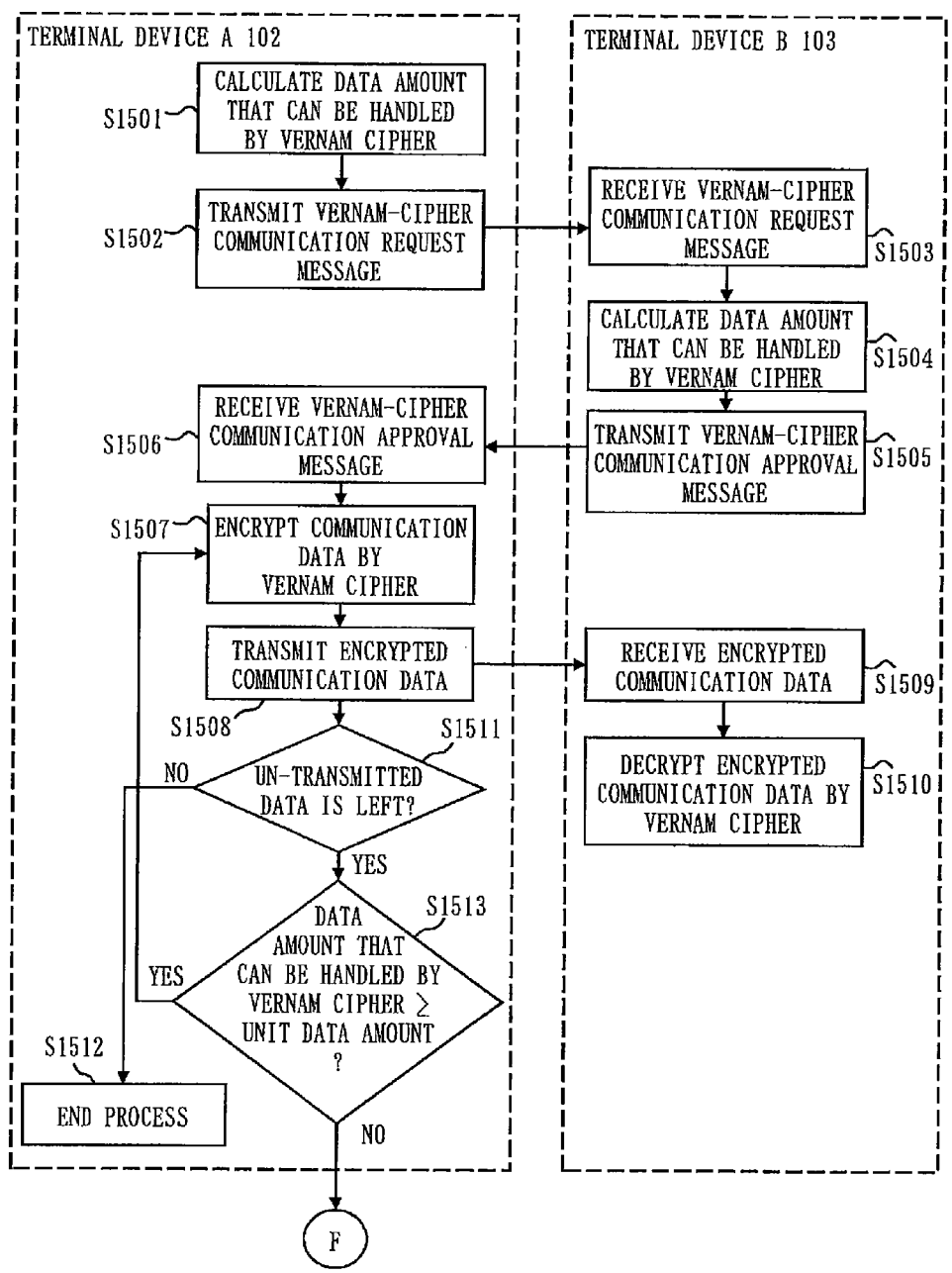
FIG. 44 is a flowchart showing the communication process flow of FIG. 22 in Embodiment 10.
Figure 45:
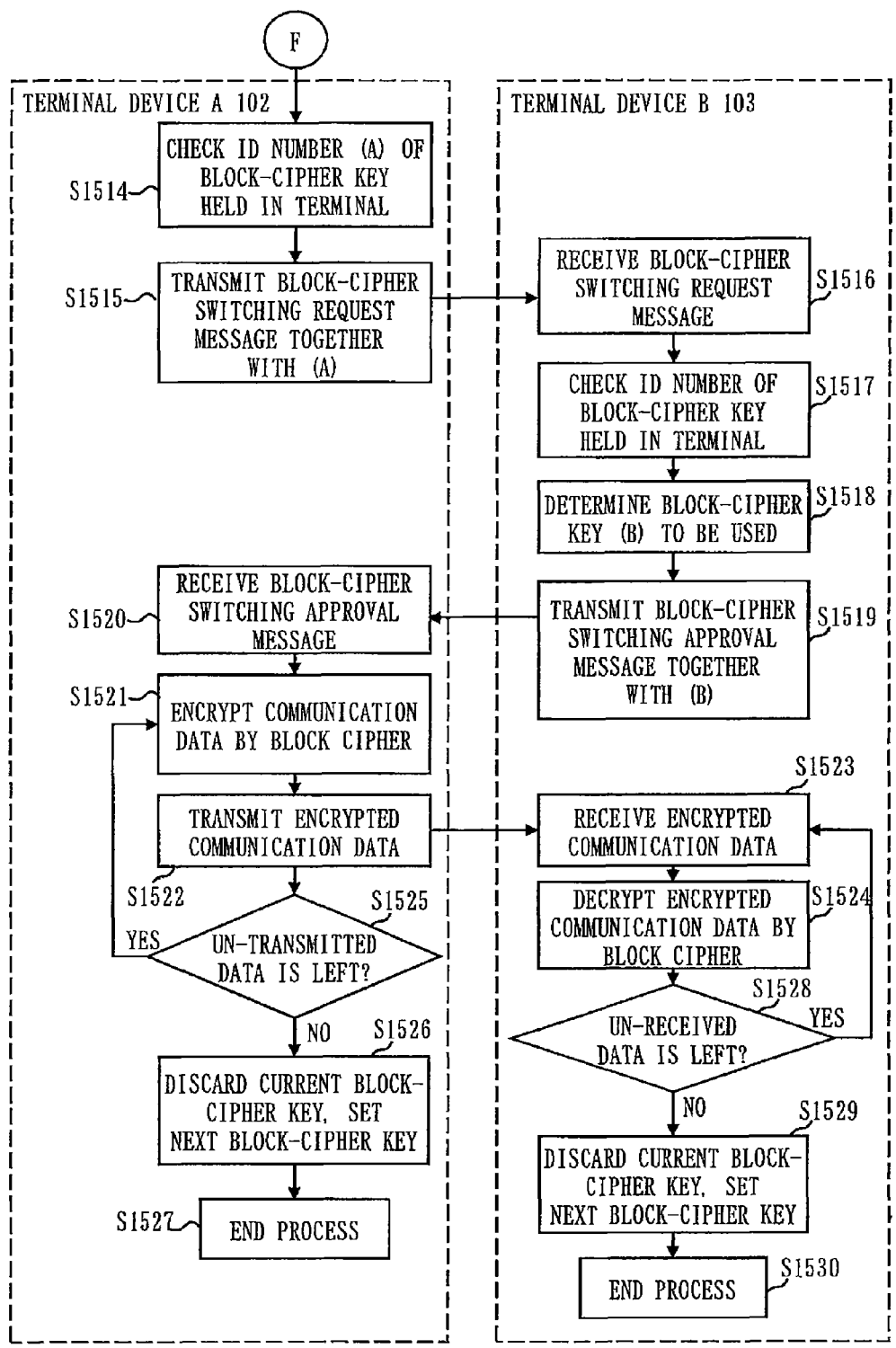
FIG. 45 is a flowchart showing the communication process flow of FIG. 22 in Embodiment 10.

FIGS. 44 and 45 are flowcharts showing the communication process flow of FIG. 22 in Embodiment 10. In the process shown in FIGS. 44 and 45, a process of sharing block-cipher key information by the terminal devices in advance is executed, in addition to the process of FIGS. 23 and 24 in Embodiment 4.

In Embodiment 10, note that the block-cipher keys are identified by the ID numbers as shown in FIG. 22, in the same manner as in Embodiment 4.

The process from S1501 through S1513 is the same as the process from S701 through S713 shown in FIG. 23 (the process from S101 through S113 shown in FIG. 5), and a description thereof will accordingly be omitted.

If the data amount that can be cipher-communicated by the Vernam cipher is equal to or exceeds the unitary data amount which is encrypted by one encryption (YES in S1513), the terminal device A 102 checks the block-cipher keys of what ID numbers, from what ID number to what ID number, it holds (S1514). Then, the terminal device A 102 transmits, together with a block-cipher switching request message 2212, the ID numbers of the block-cipher keys it holds, to the terminal device B 103 (S1515).

The terminal device B 103 receives the block-cipher switching request message 2212 and the ID numbers of the block-cipher keys (S1516). Then, the terminal device B 103 checks the ID numbers of the block-cipher keys it holds (S1517), and determines the block-cipher key to be used for cipher communication (S1518). For example, the terminal device B 103 determines, of the block-cipher keys commonly held by both the terminal device A 102 and the terminal device B 103, a block-cipher key having the smallest ID number, as the bock-cipher key to be used for cipher communication. Then, the terminal device B 103 transmits the ID number of the determined block-cipher key, together with the block-cipher switching approval message 2213, to the terminal device A 102 (S1519).

The terminal device A 102 receives the block-cipher switching approval message 2213 and the ID number of the determined block-cipher key (S1520). Then, the terminal device A 102 encrypts the communication data by the block-cipher key indicated by the received ID number, to generate the encrypted communication data 2214 (S1521). The terminal device A 102 transmits the encrypted communication data 2214 to the terminal device B 103 (S1522).

The terminal device B 103 receives the encrypted communication data 2214 (S1523). The terminal device B 103 decrypts the encrypted communication data 2214 by the block-cipher key of the ID number determined in (S1518), to obtain communication data (S1524).

The process from S1525 through S1530 is the same as the process from S722 through S727, and a description thereof will accordingly be omitted.

The operation of a case will be briefly described where cipher communication by the block cipher is started when the Vernam-cipher key of the reception-side terminal device is running short at the start of communication and cipher communication by the Vernam cipher cannot be started.

Figure 46:
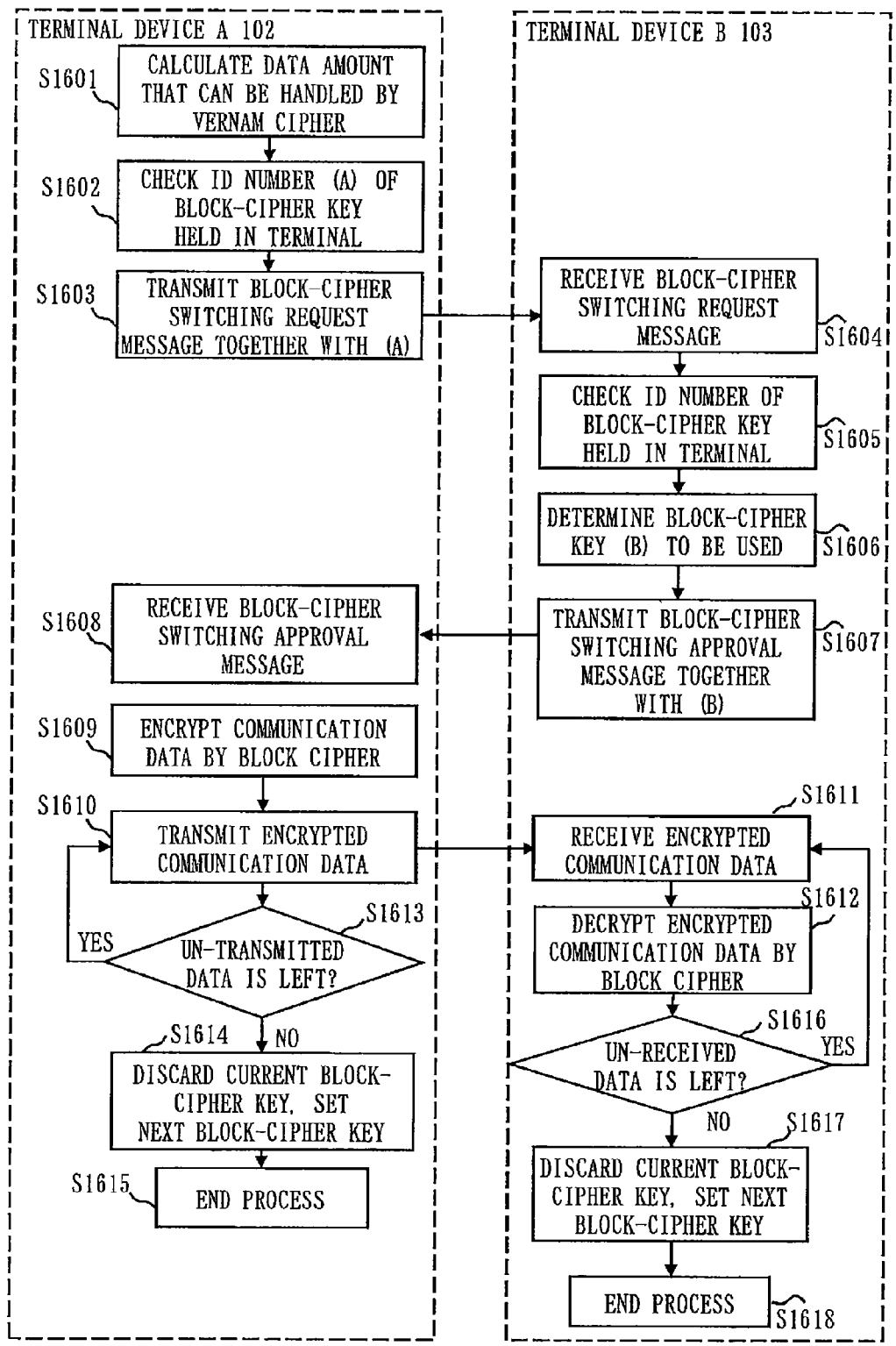
FIG. 46 is a flowchart showing the communication process flow of FIG. 25 in Embodiment 10.

FIG. 46 is a flowchart showing the communication process flow of FIG. 25 in Embodiment 10. In the process shown in FIG. 46, a process of sharing block-cipher key information between the terminal devices in advance is performed, in addition to the process of FIG. 26 in Embodiment 4.

The terminal device A 102 checks the amount of the Vernam-cipher key it holds, and learns that the Vernam-cipher key is running short (S1601). When the data amount that can be cipher-communicated by the Vernam cipher is smaller than the unitary data amount which is encrypted by one encryption, it is determined that the Vernam-cipher key is running short. Then, the terminal device A 102 checks the block-cipher keys of what ID numbers, from what ID number to what ID number, it holds (S1602). The terminal device A 102 transmits, together with a block-cipher switching request message 2507, the ID numbers of the block-cipher keys it holds, to the terminal device B 103 (S1603).

The terminal device B 103 receives the block-cipher switching request message 2507 and the ID numbers of the block-cipher keys (S1604). Then, the terminal device B 103 checks the ID numbers of the block-cipher keys it holds (S1605), and determines the block-number key to be used for cipher communication (S1606). For example, the terminal device B 103 determines, of the block-cipher keys held by both the terminal device A 102 and the block-cipher keys held by the terminal device B 103, the block-cipher key having the smallest ID number, as the block-cipher key to be used for cipher communication. Then, the terminal device B 103 transmits the ID number of the determined block-cipher key, together with the block-cipher switching approval message 2508, to the terminal device A 102 (S1607).

The terminal device A 102 receives the block-cipher switching approval message 2508 and the ID number of the determined block-cipher key (S1608). Then, the terminal device A 102 encrypts the communication data by the block-cipher key indicated by the received ID number, to generate the encrypted communication data 2509 (S1609). The terminal device A 102 transmits the encrypted communication data 2509 to the terminal device B 103 (S1610).

The terminal device B 103 receives the encrypted communication data 2509 (S1611). Then, the terminal device B 103 decrypts the encrypted communication data 2509 by the block-cipher key of the ID number determined in (S1606), to obtain communication data (S1612).

The process from S1613 through S1618 is the same as the process from S810 through S815 in FIG. 26, and a description thereof will accordingly be omitted.

The process of the terminal device A 102 which is a transmission-side terminal device will be described in detail.

Figure 47:
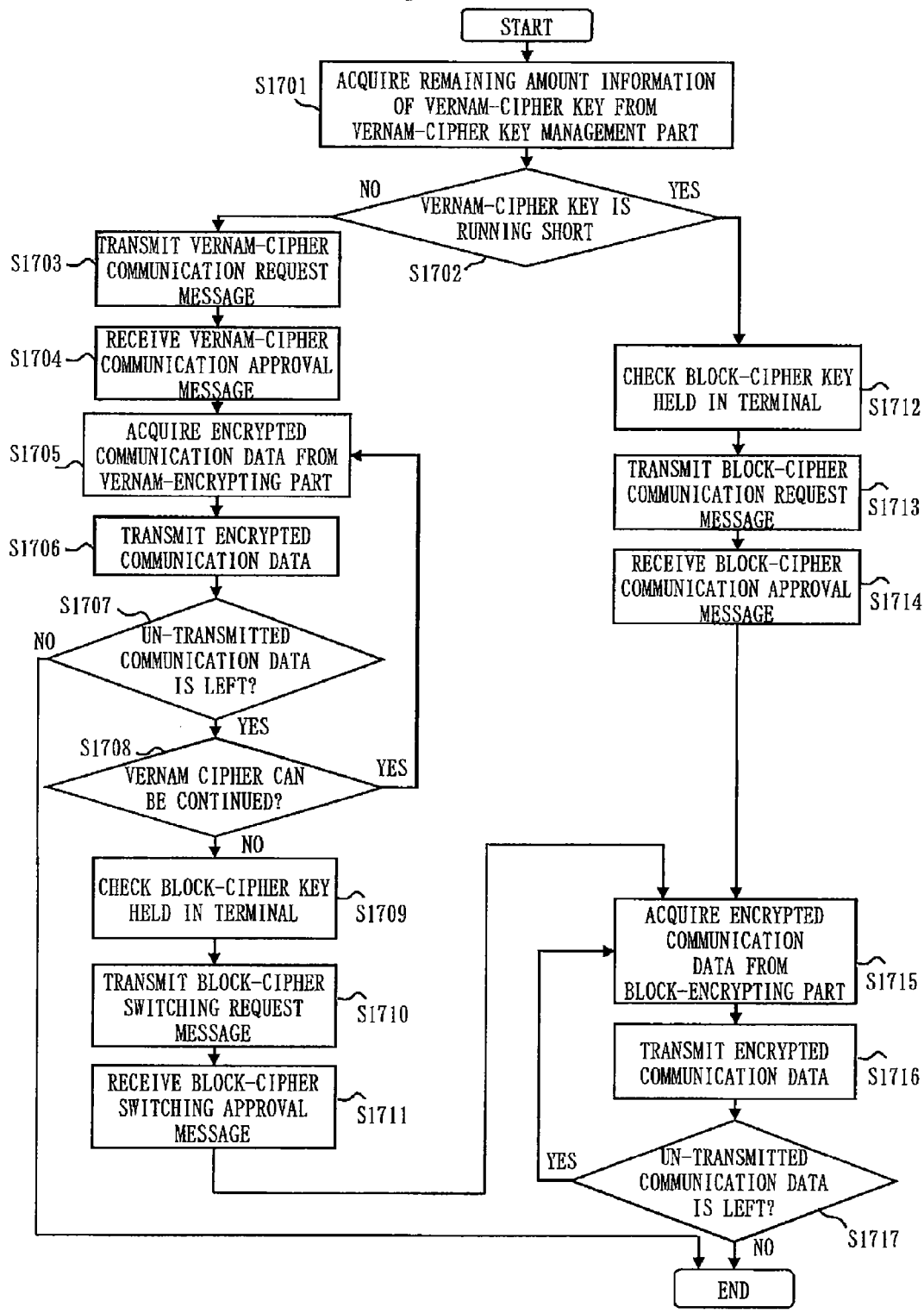
FIG. 47 is a flowchart showing the process flow of a transmission control part 803 of a terminal device 801 in Embodiment 10.
Figure 48:
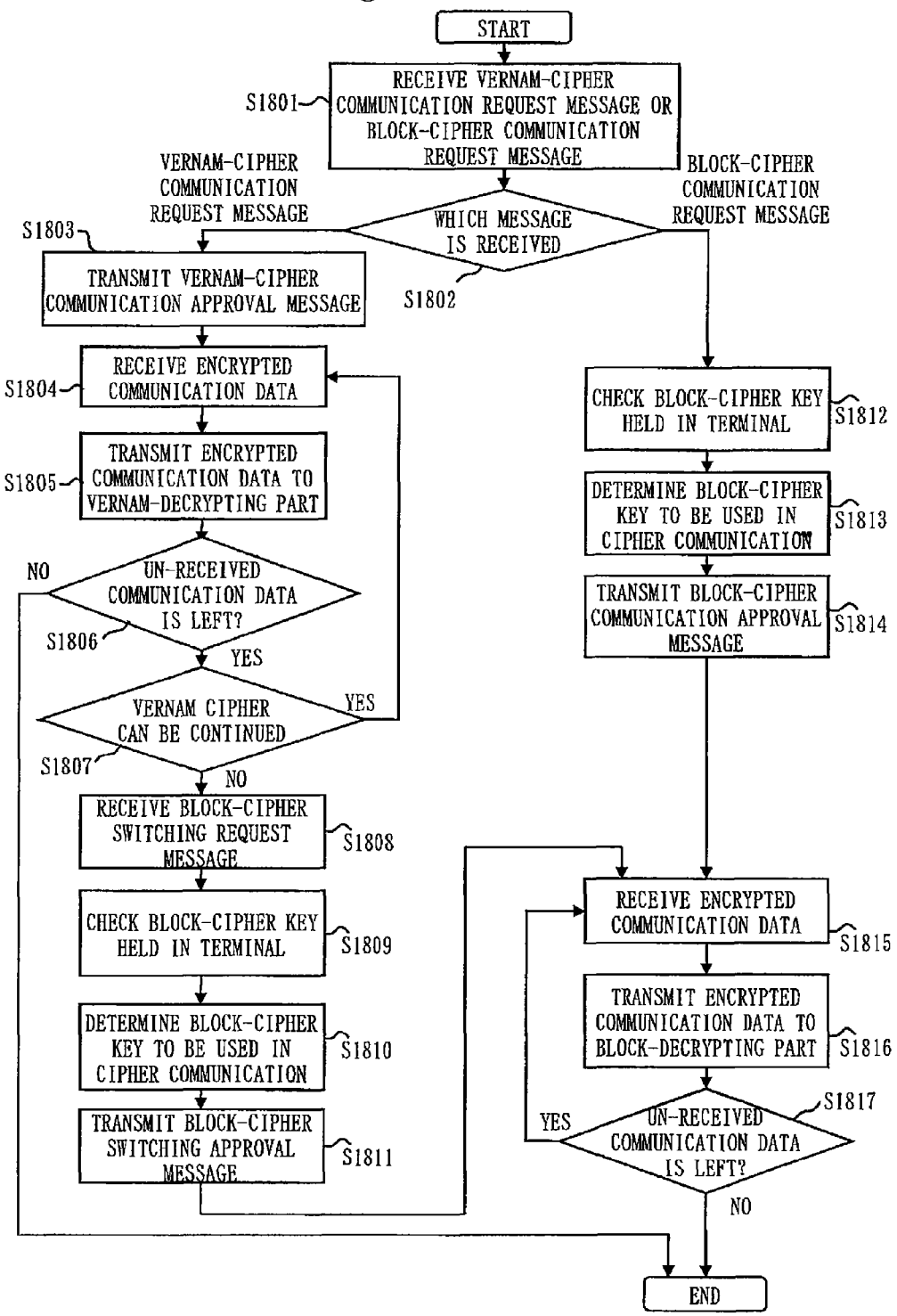
FIG. 48 is a flowchart showing the process flow of a reception control part 804 of the terminal device 801 in Embodiment 10.

FIG. 47 is a flowchart showing the process flow of the transmission control part 803 of the terminal device 801 in Embodiment 10.

The process from S1701 through S1708 is the same as the process from S301 through S308 shown in FIG. 9, and a description thereof will accordingly be omitted.

The process from S1709 through S1711 will be described.

The transmission control part 803 checks the ID number of the block-cipher key stored in the block-cipher key storage part 814 (S1709). The transmission control part 803 transmits, together with the block-cipher switching request message, the ID number of the block-cipher key stored in the block-cipher key storage part 814, to the terminal device B 103 via the communication interface 802 (S1710). Then, the transmission control part 803 receives, together with the block-cipher switching request message, the ID number of the block-cipher key to be used for cipher communication, from the terminal device B 103 (S1711), and advances to the process of S1715.

The process from S1712 through S1714 will be described.

The transmission control part 803 checks the ID number of the block-cipher key stored in the block-cipher key storage part 814 (S1712). The transmission control part 803 transmits, together with the block-cipher communication request message, the ID number of the block-cipher key stored in the block-cipher key storage part 814, to the terminal device B 103 via the communication interface 802 (S1713). Then, the transmission control part 803 receives, together with the block-cipher communication approval message, the ID number of the block-cipher key to be used for cipher communication, from the terminal device B 103 (S1714), and advances to the process of S1715.

The process from S1715 downward will be described.

The transmission control part 803 causes the block-encrypting part 808 to encrypt data of the unitary data amount, out of the communication data by the block-cipher key of the ID number received in S1711 or S1714, to acquire encrypted communication data (S1715). Then, the transmission control part 803 transmits the encrypted communication data to the terminal device B 103 (S1716).

Subsequently, the transmission control part 803 checks whether there is un-transmitted communication data (S1717). If there is no un-transmitted communication data (NO in S1717), the transmission control part 803 ends the process. If there is un-transmitted communication data (YES in S1717), the transmission control part 803 returns to the process of S1715.

The process of the terminal device B 103 which is a reception-side terminal device will be described in detail.

The process from S1801 through 1807 is the same as the process from S401 through S407 shown in FIG. 10, and a description thereof will accordingly be omitted.

The process from S1808 through S1811 will be described.

The reception control part 804 receives the block-cipher switching request message, and the ID numbers of the block-cipher keys held by the terminal device A 102, from the terminal device A 102 (S1808). The reception control part 804 checks the ID numbers of the block-cipher keys stored in the block-cipher key storage part 814 (S1809). The reception control part 804 determines the block-cipher key to be used for cipher communication (S1810), from the ID numbers of the block-cipher keys held by the terminal device A 102 and received in (S1808), and the ID numbers of the block-cipher keys held by the terminal device B 103 and checked in (S1809). Then, the reception control part 804 transmits the ID number of the determined block-cipher key, together with the block-cipher switching approval message, to the terminal device A 102 via the communication interface 802 (S1811), and advances to the process of S1815.

The process from S1812 through S1814 will be described.

The reception control part 804 checks the ID numbers of the block-cipher keys stored in the block-cipher key storage part 814 (S1812). The reception control part 804 determines the block-cipher key to be used for cipher communication, from the ID numbers of the block-cipher keys received in (S1802) and held by the terminal device A 102, and the ID numbers of the block-cipher keys checked in (S1812) and held by the terminal device B 103 (S1813). Then, the reception control part 804 transmits the ID number of the determined block-cipher key, together with the block-cipher communication approval message, to the terminal device A 102 via the communication interface 802 (S1814), and advances to the process of S1815.

The process from S1815 downward will be described.

The reception control part 804 receives the encrypted communication data from the terminal device A 102 (S1815). The reception control part 804 transmits the received, encrypted communication data to the block-decrypting part 809, to have the encrypted communication data decrypted by the block-cipher key of the ID number determined in S1810 or S1813, to generate communication data (S1816). The generated communication data is stored in the reception data storage part 812.

Subsequently, the reception control part 804 checks whether there is un-received communication data (S1817). If there is no un-transmitted communication data (NO in S1817), the reception control part 804 ends the process. If there is un-transmitted communication data (YES in S1817), the reception control part 804 returns to the process of S1815.

As described above, in the encryption system 1 according to Embodiment 10, the terminal devices share the amounts of the block-cipher keys they hold respectively. Thus, even when the block-cipher keys they hold are different, the cryptosystem can be switched.

Embodiment 11

Embodiment 5 has described that in the case of conducting encryption by the block cipher at the point when only one block-cipher key is left, how the current block-cipher key is renewed by randomization using a hash function or the like. In Embodiment 5, if the numbers of renewals of the block-cipher keys are not synchronized due to a communication error or the like, cipher communication cannot be performed.

In view of this, Embodiment 11 describes how the terminal devices share the numbers of renewals of the block-cipher keys they hold before conducting cipher communication, so that the numbers of renewals of the respective block-cipher keys the terminal devices hold are synchronized.

The operation of a case will be briefly described where cipher communication by the block cipher is started when the Vernam-cipher key of the reception-side terminal device is running short at the start of communication and cipher communication by the Vernam cipher cannot be started.

Figure 49:
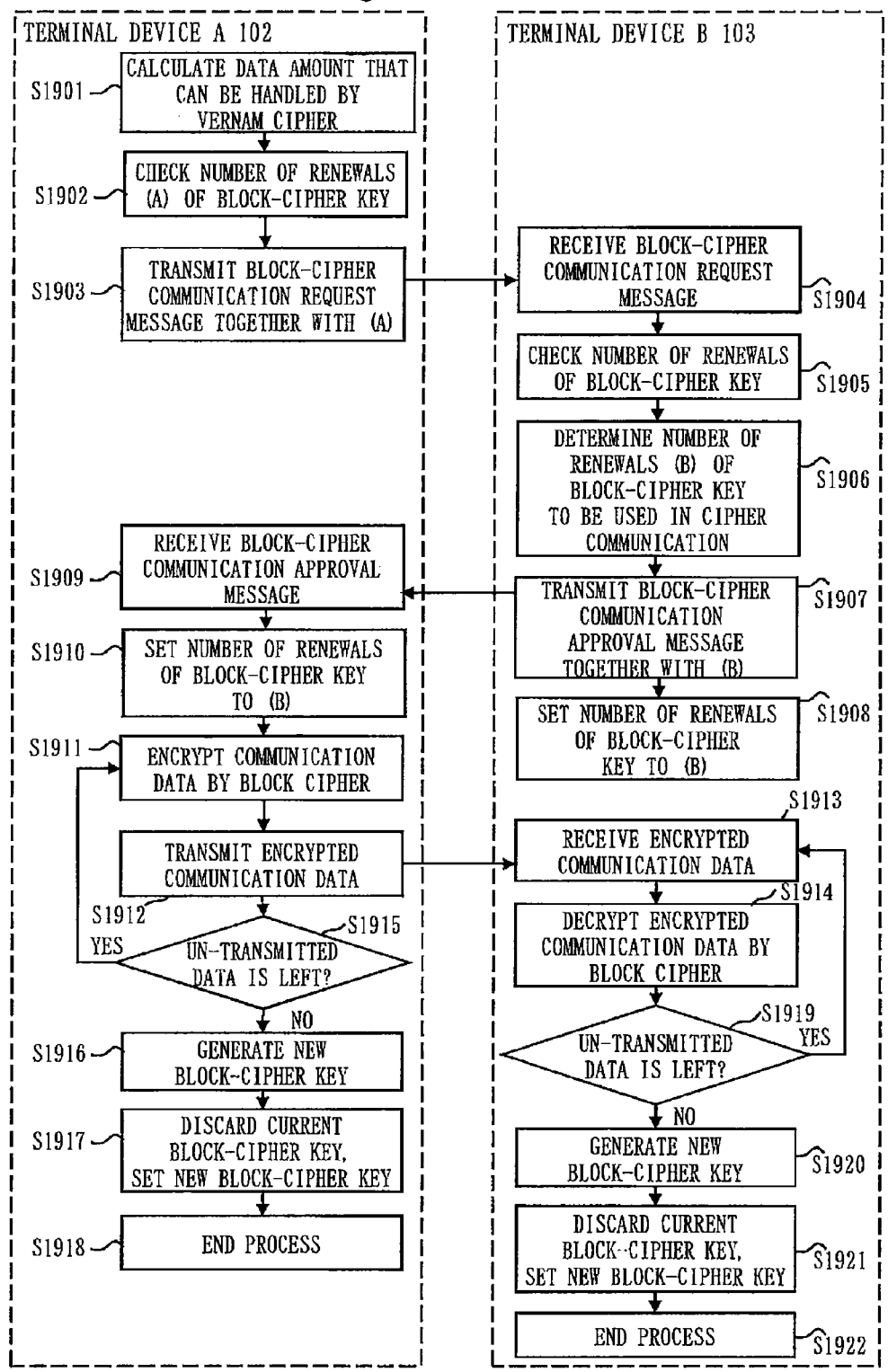
FIG. 49 is a flowchart showing the communication process flow of FIG. 28 in Embodiment 11.

FIG. 49 is a flowchart showing the communication process flow of FIG. 28 in Embodiment 11. In the process shown in FIG. 49, a process of sharing the number of renewals of the block-cipher key between the terminal devices is performed in advance, in addition to the process of FIG. 29 in Embodiment 5.

The terminal device A 102 checks the amount of the Vernam-cipher key it holds, and learns that the Vernam-cipher key is running short (S1901). When the data amount that can be cipher-communicated by the Vernam cipher is smaller than the unitary data amount which is encrypted by one encryption, it is determined that the Vernam-cipher key is running short. Then, the terminal device A 102 checks the number of renewals of the block-cipher keys it holds (S1902). The terminal device A 102 transmits, together with a block-cipher communication request message 2801, the number of renewals of the block-cipher keys, to the terminal device B 103 (S1903).

The terminal device B 103 receives the block-cipher communication request message 2801 and the number of renewals of the block-cipher key from the terminal device A 102 (S1904). Then, the terminal device B 103 checks the number of renewals of the block-cipher keys it holds (S1905). The terminal device B 103 determines the number of renewals of the block-number key to be used for cipher communication (S1906). For example, regarding the block-cipher key, the terminal device B 103 determines, of the number of renewals in the terminal device A 102 and the number of renewals in the terminal device B 103, the larger number of renewals, as the number of renewals of the block-cipher key to be used for cipher communication. Then, the terminal device B 103 transmits the determined number of renewals of the block-cipher key, together with the block-cipher communication approval message 2804 to the terminal device A 102 (S1907).

If the block-cipher key determined in (S1906) is not renewed the determined number of renewals, the terminal device B 103 repeatedly executes the renewal process until reaching the determined number of renewals (S1908). Hence, the block-cipher key becomes usable in cipher communication. The case where the determined number of renewals is not reached means a case where the block-cipher key is renewed the number of times smaller than the determined number of renewals.

The terminal device A 102 receives the block-cipher switching approval message 2804 and the determined number of renewals of the block-cipher key (S1909). If the block-cipher key is not renewed the received number of renewals, the terminal device A 102 repeatedly executes the renewal process until reaching the received number of renewals (S1910). Hence, the block-cipher key becomes usable in cipher communication. The case where the received number of renewals is not reached means that the block-cipher key is renewed the number of times smaller than the received number of renewals. The terminal device A 102 encrypts the communication data by the block-cipher key in a state usable in cipher communication, to generate the encrypted communication data 2804 (S1911). Then, the terminal device A 102 transmits the encrypted communication data 2804 to the terminal device B 103 (S1912).

The terminal device B 103 receives the encrypted communication data 2804 (S1913). Then, the terminal device B 103 decrypts the encrypted communication data 2804 by the block-cipher key in the state usable for cipher communication, to obtain communication data (S1914).

The process from S1915 through S1922 is the same as the process from S910 through S917 shown in FIG. 29, and a description thereof will accordingly be omitted.

The process of the terminal device A 102 which is a transmission-side terminal device will be described in detail.

Figure 50:
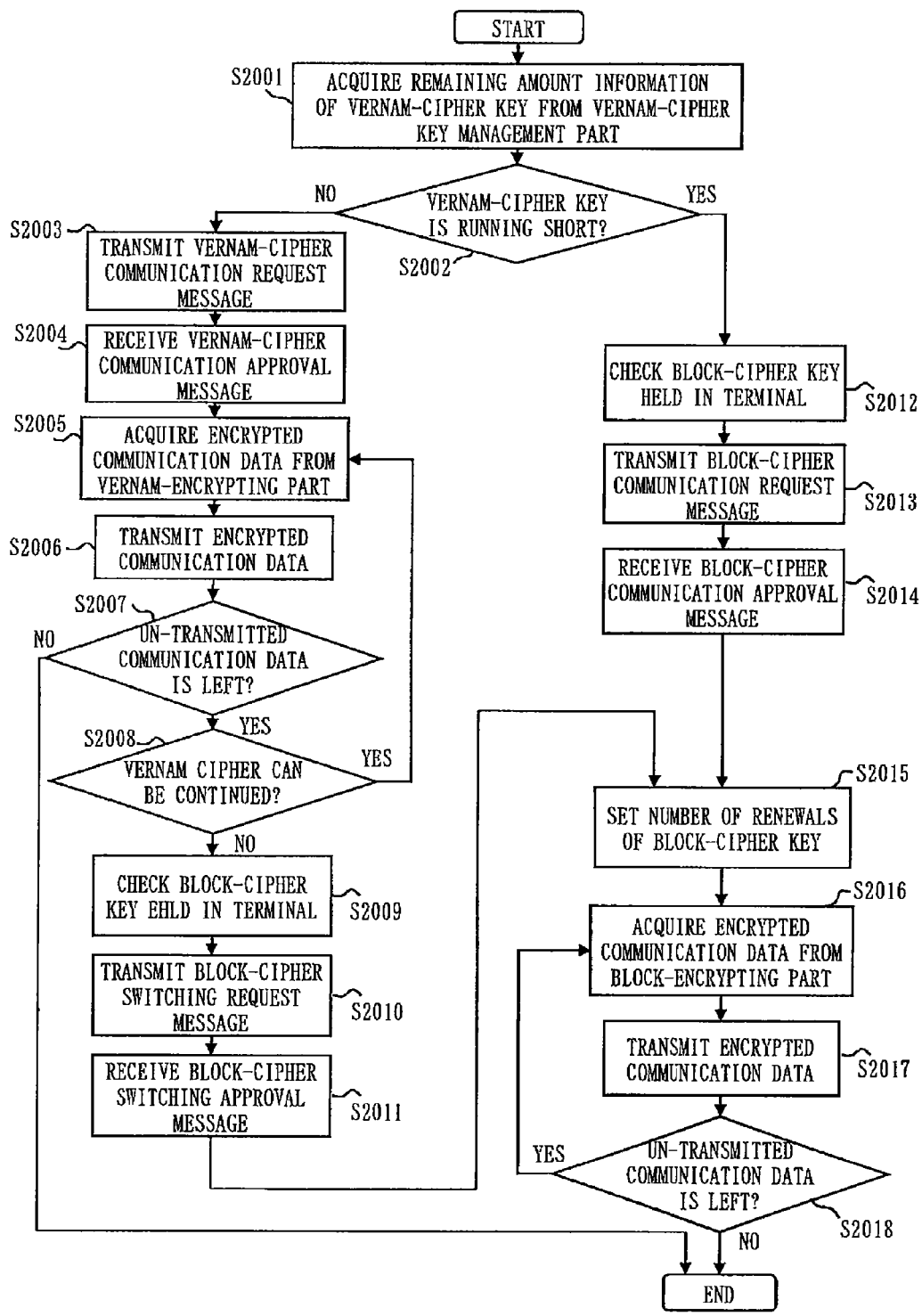
FIG. 50 is a flowchart showing the process flow of a transmission control part 803 of a terminal device 801 in Embodiment 11.

FIG. 50 is a flowchart showing the process flow of the transmission control part 803 of the terminal device 801 in Embodiment 11.

The process from S2001 through S2008 is the same as the process from S301 through S308 shown in FIG. 9, and a description thereof will accordingly be omitted.

The transmission control part 803 checks the number of renewals of the block-cipher key stored in the block-cipher key storage part 814 (S2009). The transmission control part 803 transmits the number of renewals of the block-cipher key stored in the block-cipher key storage part 814, together with the block-cipher switching request message to the terminal device B 103 via the communication interface 802 (S2010). Then, the transmission control part 803 receives the number of renewals of the block-cipher key to be used in cipher communication, together with the block-cipher switching approval message from the terminal device B 103 (S2011), and advances to the process of S2015.

The process from S2012 through S2014 will be described.

The transmission control part 803 checks the number of renewals of the block-cipher key stored in the block-cipher key storage part 814 (S2012). The transmission control part 803 transmits the number of renewals of the block-cipher key stored in the block-cipher key storage part 814, together with the block-cipher communication request message to the terminal device B 103 via the communication interface 802 (S2013). Then, the transmission control part 803 receives the number of renewals of the block-cipher key to be used in cipher communication, together with the block-cipher switching approval message from the terminal device B 103 (S2014), and advances to the process of S2015.

The process from S2015 downward will be described.

If the number of renewals of the block-cipher key is not renewed the number of renewals received in S2011 or S2014, the transmission control part 803 repeatedly executes the renewal process until reaching the received number of renewals (S2015). Hence, the block-cipher key is set in a state usable in cipher communication. The transmission control part 803 causes the block-encrypting part 808 to encrypt data of the unitary data amount, out of the communication data by the block-cipher key is set in the state usable in cipher communication, to obtain encrypted communication data (S2016). Then, the transmission control part 803 transmits the encrypted communication data to the terminal device B 103 (S2017).

Subsequently, the transmission control part 803 checks whether there is un-transmitted communication data (S2018). If there is no un-transmitted communication data (NO in S2018), the transmission control part 803 ends the process. If there is un-transmitted communication data (YES in S2018), the transmission control part 803 returns to the process of S2016.

The process of the terminal device B 103 which is a reception-side terminal device will be described in detail.

Figure 51:
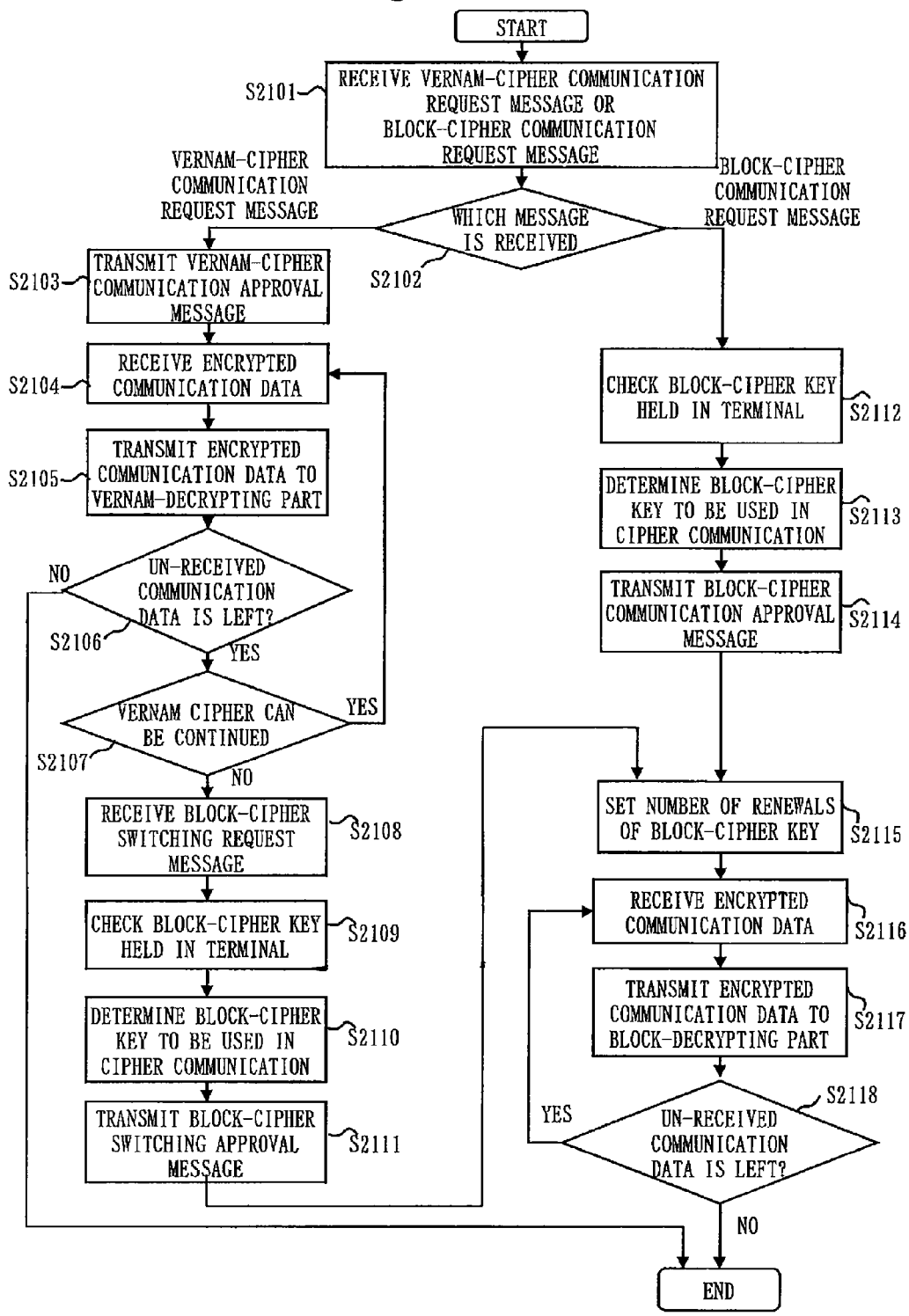
FIG. 51 is a flowchart showing the process flow of a reception control part 804 of the terminal device 801 in Embodiment 11.

FIG. 51 is a flowchart showing the process flow of the reception control part 804 of the terminal device 801 in Embodiment 11.

The process from S2101 through S2107 is the same as the process from S401 through S407 shown in FIG. 10, and a description thereof will accordingly be omitted.

The process from S2108 through 2111 will be described.

The reception control part 804 receives the block-cipher switching request message and the number of renewals of the block-cipher key held by the terminal device A 102, from the terminal device A 102 (S2108). The reception control part 804 checks the number of renewals of the block-cipher key stored in the block-cipher key storage part 814 (S2109). The reception control part 804 determines the block-cipher key to be used in cipher communication and the number of renewals of the block-cipher key, based on the number of renewals of the block-cipher key received in (S2108) and held by the terminal device A 102, and the number of renewals of the block-cipher key checked in (S2109) and held by the terminal device B 103 (S2110). Then, the reception control part 804 transmits the determined number of renewals of the block-cipher key, together with the block-cipher switching approval message to the terminal device A 102 via the communication interface 802 (S2111), and advances to the process of S2115.

The process from S2112 through S2114 will be described.

The reception control part 804 checks the number of renewals of the block-cipher key stored in the block-cipher key storage part 814 (S2112). The reception control part 804 determines the block-cipher key to be used in cipher communication and the number of renewals of the block-cipher key, based on the number of renewals of the block-cipher key received in (S2102) and held by the terminal device A 102, and the number of renewals of the block-cipher key checked in (S2112) and held by the terminal device B 103 (S2113). Then, the reception control part 804 transfers the determined number of renewals of the block-cipher key, together with the block-cipher communication approval message to the terminal device A 102 via the communication interface 802 (S2114), and advances to the process of S2115.

The process from S2115 downward will be described.

If the block-cipher key is not renewed the number of renewals determined in S2110 or S2113, the reception control part 804 repeatedly executes the renewal process until reaching the determined number of renewals (S2115). Hence, the block-cipher key becomes usable in cipher communication. The reception control part 804 receives encrypted communication data from the terminal device A 102 (S2116). The reception control part 804 transmits the received encrypted communication data to the block-decrypting part 809 to have the communication data decrypted by the block-cipher key in the state usable in cipher communication, to generate communication data (S2117). The generated communication data is stored in the reception data storage part 812.

Subsequently, the reception control part 804 checks whether there is un-received communication data (S2118). If there is no un-received communication data (NO in S2118), the reception control part 804 ends the process. If there is un-received communication data (YES in S2118), the reception control part 804 returns to the process of S2116.

As described above, in the encryption system 1 according to Embodiment 11, the terminal devices share the number of renewals of the block-cipher key they each hold. Therefore, even if the numbers of renewals of the block-cipher keys they hold differ, the cryptosystem can be switched.

Embodiment 12

Usually, when a Vernam-cipher key and a block-cipher key are not in use, they are stored in a non-volatile memory or the like. In Embodiment 12, the Vernam-cipher key and the block-cipher key are loaded in a volatile memory such as a RAM immediately before use, and are deleted from the non-volatile memory. As a result, the Vernam-cipher key and the block-cipher key which are already used are prevented from being extracted due to fraudulent power cut-off or the like.

Usually, the Vernam-cipher key and the block-cipher key (to be each referred to as a cipher key in this embodiment) need be held in the device even when the power of the device is cut off. Hence, an un-used cipher key will be held in a non-volatile storage device such as a HDD.

In Embodiment 12, after encryption or decryption by the cipher key is completed, the cipher key used for encryption or decryption is deleted and the same cipher key will not be used again in the same device, in order to prevent encrypted communication data from being decrypted by an unauthorized person.

However, if the power of the device is cut off after the start of encryption or decryption process and before completion of the encryption or decryption process, a case is possible where the cipher key is not deleted correctly. Particularly in this case, a situation may occur where the encrypted communication data flows through the communication path and at the same time the cipher key remains in the device. In this situation, the cipher key might be illegally extracted from the device and the encrypted communication data might be decrypted.

Figure 52:
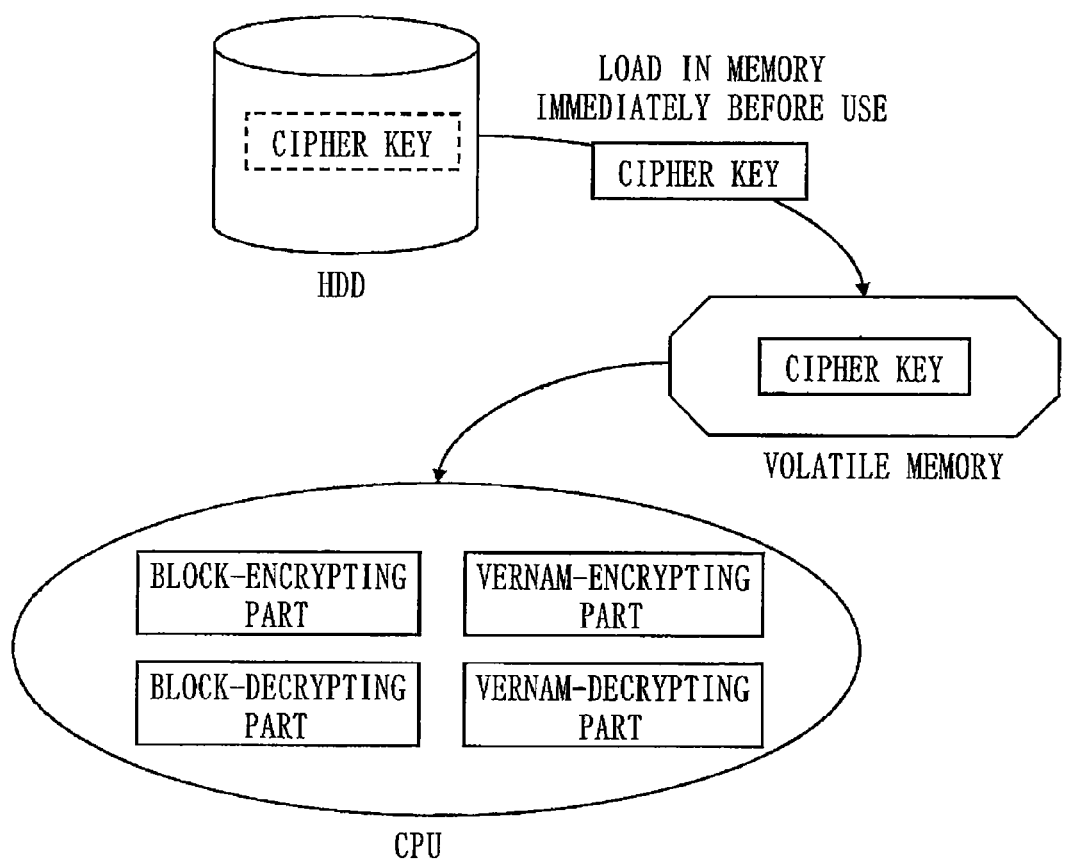
FIG. 52 is a diagram for explaining the operation of a terminal device in Embodiment 12.

FIG. 52 is a diagram for explaining the operation of the terminal device in Embodiment 12.

As shown in FIG. 52, the terminal device loads a cipher key which when not in use is stored in the non-volatile storage device such as an HDD, in the volatile memory immediately before the use, and deletes the cipher key in the HDD or non-volatile memory. Then, even when the power of the device is cut off, as the cipher key does not remain in the device, the cipher key will not be exposed by illegal extraction. Thus, there is no danger that the encrypted communication data might be decrypted undesirably.

For example, the Vernam-cipher key storage part 813 and the block-cipher key storage part 814 are non-volatile storage devices such as HDDs.

The Vernam-encrypting part 806, the Vernam-decrypting part 807, the block-encrypting part 808, or the block-decrypting part 809 which has received an encryption instruction or decryption instruction from the transmission control part 803 or the reception control part 804 acquires a cipher key from the Vernam-cipher key storage part 813 or the reception control part 804. Then, the Vernam-encrypting part 806, the Vernam-decrypting part 807, the block-encrypting part 808, or the block-decrypting part 809 stores the acquired cipher key in a volatile storage device such as a RAM (Random Access Memory), and deletes the acquired cipher key from the Vernam-cipher key storage part 813 or the block-cipher key storage part 814. The Vernam-encrypting part 806, the Vernam-decrypting part 807, the block-encrypting part 808, or the block-decrypting part 809 then conduct encryption or decryption by the cipher key stored in the volatile storage device.

Embodiment 13

Embodiment 13 describes how to notify the remaining amounts of the Vernam-cipher key and block-cipher key, the cryptosystem used for current cipher communication, and the cryptosystem switching timing. This notification enables the user of the terminal device to instinctively learn the current status of the cipher communication and of the cipher key.

Usually, since the Vernam-cipher key and the block-cipher key (to be referred to as cipher keys hereinafter in this embodiment) are held in the terminal device, it is not easy for the user to lean information on these cipher keys. Also, the encryption process and decryption process in cipher communication are carried out within the terminal device. Therefore, when cipher communication by the Vernam cipher is switched to cipher communication by the block cipher due to the shortage of, for example, the Vernam-cipher key, it is not easy for the user to notice the cryptosystem switching timing.

Switching of the cryptosystem signifies change of the security of cipher communication. The remaining amount of the cipher key serves as an index indicating the time period taken until cryptosystem switching takes place. Therefore, it is significant that the user can learn information on switching of the cryptosystem and information on the remaining amount of the cipher key. In Embodiment 13, during cipher communication, the remaining amount of the current cipher key and the cryptosystem are notified to the user by means of screen display, sound, and the vibration of the terminal.

First, the functions of the terminal device A 102 and the terminal device B 103 in Embodiment 13 will be described.

Figure 53:
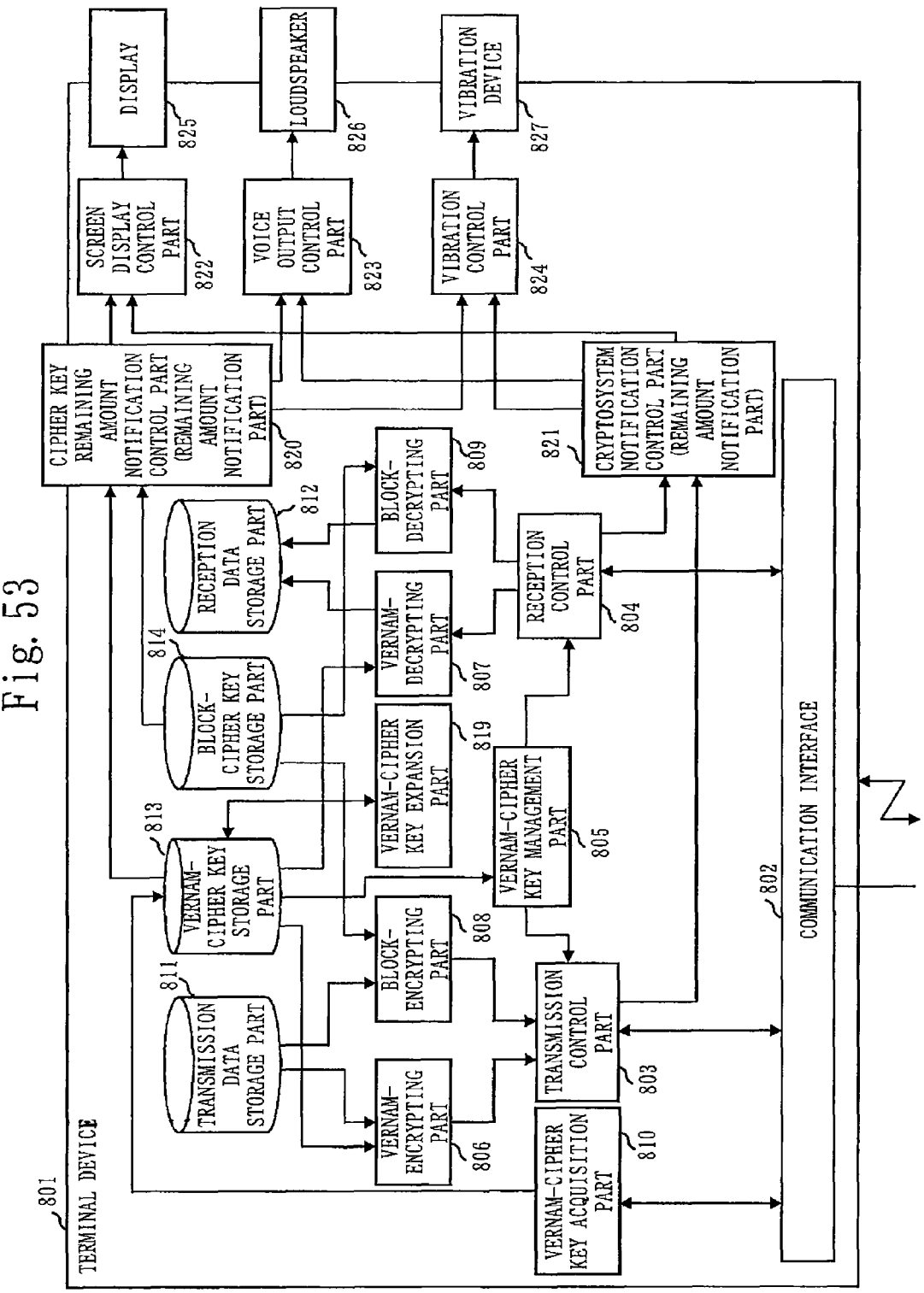
FIG. 53 is a function block diagram for explaining the functional configuration of a terminal device A 102 and terminal device B 103 in Embodiment 13.

FIG. 53 is a function block diagram for explaining the functional configuration of the terminal device A 102 and the terminal device B 103 in Embodiment 13. The terminal device shown in FIG. 53 is provided with a cipher key remaining amount notification control part 820 (remaining amount notification part), a cryptosystem notification control part 821 (remaining amount notification part), a screen display control part 822, a sound output control part 823, a vibration control part 824, a display 825, a loudspeaker 826, and a vibration device 827, in addition to the function provided to the terminal device shown in FIG. 8.

The cipher key remaining amount notification control part 820 acquires remaining amount information on the Vernam-cipher key from the Vernam-cipher key storage part 813, and remaining amount information on the block-cipher key from the block-cipher key storage part 814. The cipher key remaining amount notification control part 820 converts, by the processing device, the acquired remaining amount information of the Vernam-cipher key and the acquired remaining amount information of the block-cipher key into notification information for notifying the user of the remaining amount of the cipher key, and sends the notification information to the screen display control part 822, the sound output control part 823, and the vibration control part 824.

The cryptosystem notification control part 821 acquires information indicating the currently employed cryptosystem from the transmission control part 803 and the reception control part 804. Then, the cryptosystem notification control part 821 converts the acquired information indicating the cryptosystem into information for notifying the user of the cryptosystem, and sends the resultant information to the screen display control part 822, the sound output control part 823, and the vibration control part 824. When the cryptosystem is switched, the cryptosystem notification control part 821 sends information indicating that the cryptosystem is switched, to the screen display control part 822, the sound output control part 823, and the vibration control part 824.

The screen display control part 822 instructs the display 825 to perform screen display based on the information received from the cipher key remaining amount notification control part 820 and the cryptosystem notification control part 821.

The sound output control part 823 instructs the loudspeaker 826 to output sound based on the information received from the cipher key remaining amount notification control part 820 and the cryptosystem notification control part 821.

The vibration control part 824 instructs the vibration device 827 to vibrate the terminal based on the information received from the cipher key remaining amount notification control part 820 and the cryptosystem notification control part 821.

The display 825 is equipment that can display pictures and characters on a screen such as a liquid-crystal display.

The loudspeaker 826 is equipment that can output sound.

The vibration device 827 is a device that can vibrate the terminal.

For example, the cipher key remaining amount notification control part 820 causes the display 825 to constantly display the remaining amount of the Vernam-cipher key and the remaining amount of the block-cipher key, in the form of numerical values or the like on the display 825. When the Vernam-cipher key becomes smaller than the amount predetermined in advance and the expansion process explained in Embodiment 6 is executed, the cipher key remaining amount notification control part 820 displays information indicating this on the display 825, and causes the loudspeaker 826 to output sound and vibrates the vibration device 827. When the cryptosystem is switched from the Vernam cipher to the block cipher, the cryptosystem notification control part 821 displays information indicating this switching on the display 825 and causes the loudspeaker 826 to output sound and vibrates the vibration device 827. Furthermore, when the last one block-cipher key is used and block-cipher key randomization described in Embodiment 5 is conducted, the cipher key remaining amount notification control part 820 displays information indicating this on the display 825, and causes the loudspeaker 826 to output sound and vibrates the vibration device 827.

Namely, each time the cipher key is converted or the cryptosystem is switched and the security of cipher communication is degraded, the cipher key remaining amount notification control part 820 and the cryptosystem notification control part 821 notify the user of this.

For example, each time the cipher key is converted or the cryptosystem is switched, the information may be displayed on the display 825 with characters, symbols, and figures in different colors, the type or duration of the sound may be changed, or the type and interval of the vibration may be changed.

Before the cipher key is converted or the cryptosystem is switched and the security of cipher communication is degraded, the cipher key remaining amount notification control part 820 and cryptosystem notification control part 821 may notify the user that the cipher key will be converted or the cryptosystem will be switched soon. This can prompt the user to acquire, for example, the Vernam-cipher key from the key sharing device.

Embodiment 14

Embodiment 14 will describe a method of realizing cipher communication in the embodiments described above.

The communication process in implemental Embodiments 1 to 13 before cipher communication can be realized by SIP (Session Initiation Protocol).

More specifically, in accordance with the SIP sequence, the Vernam-cipher communication request message and the block-cipher communication request message are produced as INVITE messages, and information on the cipher key and the like is described using the SDP (Session Description Protocol). The Vernam-cipher communication approval message and the block-cipher communication approval message are produced as reply messages indicating 200 OK, and information on the cipher key and the like is described using the SDP, as with the INVITE message. The Vernam-cipher communication refusal message is produced as a reply message indicating 400 Not Acceptable.

Cipher communication, switching of the cryptosystem in cipher communication, and the like can be realized using the SRTP (Secure Real-Time Protocol).

More specifically, the cryptosystem to be started and the cipher key are determined by a negotiation according to the SIP, and cipher communication and switching of the cryptosystem can be implemented by communication according to the SRTP.

The hardware configuration of the terminal device 801 in the above embodiments will be described.

Figure 54:
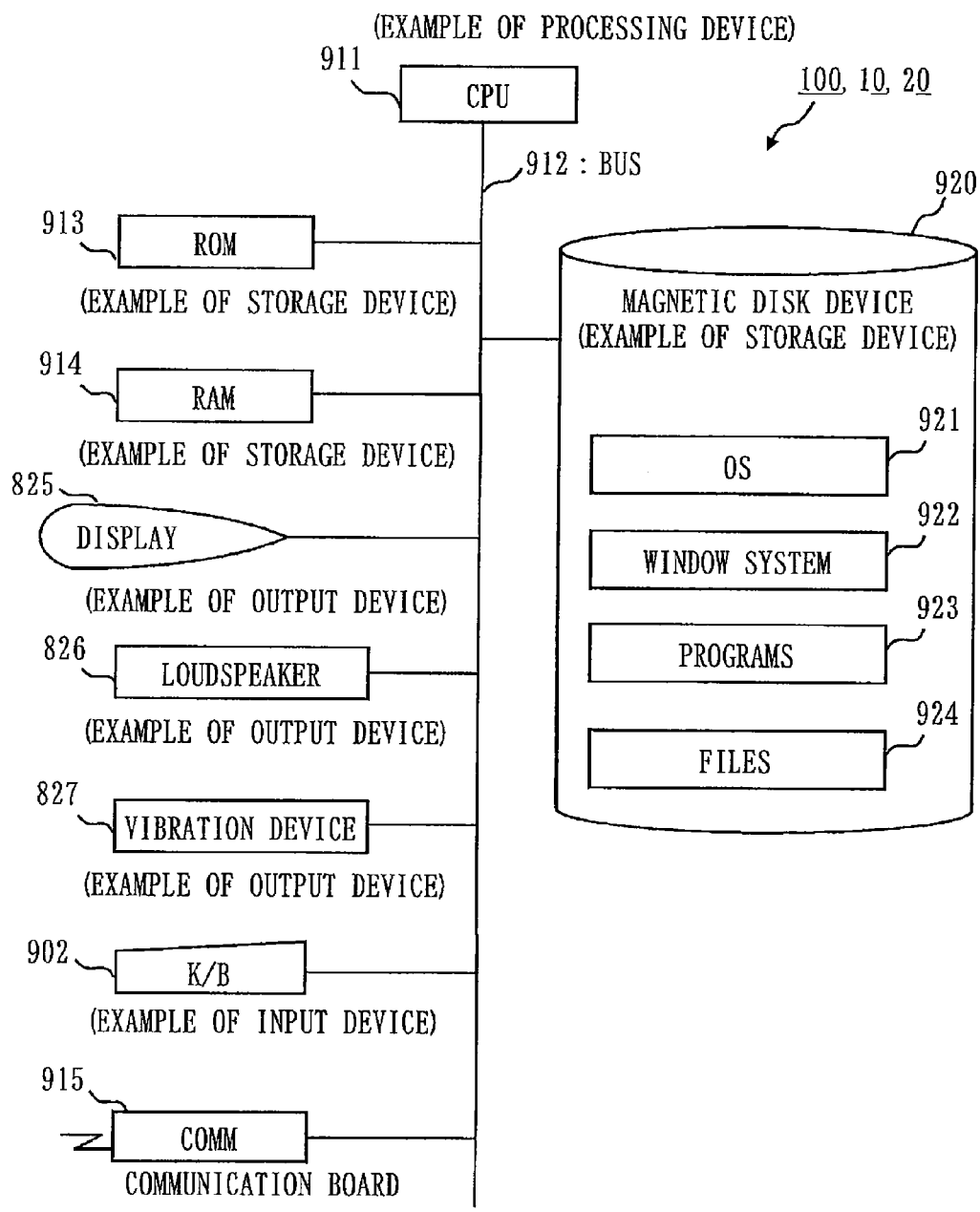
FIG. 54 is a diagram showing a hardware configuration example of the terminal device 801.

FIG. 54 is a diagram showing a hardware configuration example of the terminal device 801.

As shown in FIG. 54, the terminal device 801 is provided with a CPU 911 (also referred to as a Central Processing Unit, central processing device, processing device, computation device, microprocessor, microcomputer, or processor) which executes programs. The CPU 911 is connected to a ROM 913, a RAM 914, a display 825, a keyboard 902 (K/B), a loudspeaker 826, a vibration device 827, a communication board 915 (an example of the communication interface 802), and a magnetic disk device 920 (an HDD or fixed disk drive) via a bus 912, and controls these hardware devices. In place of the magnetic disk device 920, a storage device such as an optical disk device or memory card read/write device may be employed. The magnetic disk device 920 is connected via a predetermined fixed disk interface.

The magnetic disk device 920, the ROM 913, or the like stores an operating system 921 (OS), a window system 922, programs 923, and files 924. The CPU 911, the operating system 921, and the window system 922 execute each program of the programs 923.

The programs 923 include software and programs that execute the functions described as the "transmission control part 803", the "reception control part 804", the "Vernam-cipher key management part 805", the "Vernam-encrypting part 806", the "Vernam-decrypting part 807", the "block-encrypting part 808", the "block-decrypting part 809", the "Vernam-cipher key acquisition part 810", the "block-cipher key acquisition part 815", the "cipher key conversion part 816", the "block-cipher key renewal part 817", the "hash function processing part 818", the "Vernam-cipher key expansion part 819", the "cipher key remaining amount notification control part 820", the "cryptosystem notification control part 821", the "screen display control part 822", the "sound output control part 823", and the like in the above description; and other programs. The programs are read and executed by the CPU 911.

The files 924 store information, data, signal values, variable values, and parameters to be stored in the "transmission data storage part 811", the "reception data storage part 812", the "Vernam-cipher key storage part 813", and the "block-cipher key storage part 814", as the entries of a "database". The "database" is stored in a recording medium such as a disk or memory. The information, data, signal values, variable values, and parameters stored in the recording medium such as the disk or memory are read out to a main memory or cache memory by the CPU 911 through a read/write circuit, and are used for the operations of the CPU 911 such as extraction, search, look-up, comparison, computation, calculation, process, output, print, and display. The information, data, signal values, variable values, and parameters are temporarily stored in the main memory, cache memory, or a buffer memory during the operations of the CPU 911 including extraction, search, look-up, comparison, computation, calculation, process, output, print, and display.

As with the terminal device 801, the key sharing device 1101 is provided with a CPU 911 which executes programs. The CPU 911 is connected to a ROM 913, a RAM 914, a keyboard 902 (K/B), a communication board 915 (an example of the communication interface 1102), and a magnetic disk device 920 via a bus 912, and controls these hardware devices.

The magnetic disk device 920, the ROM 913, or the like stores an operating system 921 (OS), a window system 922, programs 923, and files 924. The CPU 911, the operating system 921, and the window system 922 execute each program of the programs 923.

The programs 923 include software and programs that execute the functions described as the "Vernam-cipher key sharing part 1103", the "Vernam-cipher key transfer part 1104", the "block-cipher key sharing part 1106", the "block-cipher key transfer part 1107", and the like; and other programs.

The files 924 store information, data, signal values, variable values, and parameters to be stored in the Vernam-cipher key storage part 1105 and the block-cipher key storage part 1108 in the above explanation, as the entries of a "database".

The arrows in the flowcharts in the above explanation mainly represent input/output of data and signals. The data and signal values are stored in the memory of the RAM 914, the recording medium such as an optical disk, or in an IC chip. The data and signals are transmitted online via a transmission medium such as the bus 912, signal lines, or cables; or electric waves.

A "part" in the above explanation may be a "circuit", "device", "equipment", "means" or "function"; or a "step", "procedure", or "process". A "device" may be a "circuit", "equipment", "means", or "function"; or a "step", "procedure", or "process". Namely, a "part" may be realized as firmware stored in the ROM 913. Alternatively, a "part" may be implemented by only software; by only hardware such as an element, a device, a substrate, or a wiring line; by a combination of software and hardware; or furthermore by a combination of software, hardware, and firmware. The firmware and software are stored, as programs, in the recording medium such as the ROM 913. The program is read by the CPU 911 and executed by the CPU 911. Namely, the program causes the computer or the like to function as a "part" described above. Alternatively, the program causes the computer or the like to execute the procedure and method of the "part" described above.

REFERENCE SIGNS LIST

101, 106: network; 102: terminal device A; 103: terminal device B; 104: key sharing device C; 105: key sharing device D; 107, 108: communication cable; 604: encrypted communication data; 801: terminal device; 802: communication interface; 803: transmission control part; 804: reception control part; 805: Vernam-cipher key management part; 806: Vernam-encrypting part; 807: Vernam-decrypting part; 808: block-encrypting part; 809: block-decrypting part; 810: Vernam-cipher key acquisition part; 811: transmission data storage part; 812: reception data storage part; 813: Vernam-cipher key storage part; 814: block-cipher key storage part; 815: block-cipher key acquisition part; 816: cipher key conversion part; 817: block-cipher key renewal part; 818: hash function processing part; 819: Vernam-cipher key expansion part; 820: cipher key remaining amount notification control part; 821: cryptosystem notification control part; 822: screen display control part; 823: sound output control part; 824: vibration control part; 825: display; 826: loudspeaker; 827: vibration device; 1101: key sharing device; 1102: communication interface; 1103: Vernam-cipher key sharing part; 1104: Vernam-cipher key transfer part; 1105: Vernam-cipher key storage part; 1106: block-cipher key sharing part; 1107: block-cipher key transfer part; 1108: block-cipher key storage part

The invention claimed is:

1. An encryption device comprising:
circuitry configured to provide:
a one-time pad cipher key storage part which stores a one-time pad cipher key formed of a plurality of bits and used in a one-time pad cipher;
a one-time pad encrypting part which encrypts communication data by the one-time pad cipher by sequentially using part of the one-time pad cipher key stored in the one-time pad cipher key storage part, to generate encrypted data;
a block-cipher key storage part which stores a block-cipher key used in a block cipher;
a block-encrypting part which encrypts the communication data by the block cipher by using the block-cipher key stored in the block-cipher key storage part, to generate encrypted data; and
an encryption control part which controls whether the communication data is to be encrypted by the one-time pad encrypting part, or by the block-encrypting part, depending on a remaining bit count of the one-time pad cipher key stored in the one-time pad cipher key storage part, wherein when the communication data is sequentially encrypted by the one-time pad encrypting part in units of predetermined unitary data, if the bit count of the one-time pad cipher key stored in the one-time pad cipher key storage part becomes smaller than a bit count of the unitary data to be encrypted next, the encryption control part performs switching so that the block-encrypting part encrypts the communication data.

2. The encryption device according to claim 1 wherein, when the communication data is encrypted by the block-encrypting part, if the one-time pad cipher key stored in the one-time pad cipher key storage part becomes equal to or exceeds a predetermined first bit count larger than the bit count of the unitary data, the encrypting control part perform switching so that the one-time pad encrypting part encrypts the communication data.

3. The encryption device according to claim 1, wherein, when the one-time pad cipher key stored in the one-time pad cipher key storage part is equal to or exceeds the unitary data amount at communication start, the encryption control part causes the one-time pad encrypting part to encrypt the communication data, and when the one-time pad cipher key stored in the one-time pad cipher key storage part is smaller than the unitary data amount at communication start, the encryption control part causes the block-encrypting part to encrypt the communication data.

4. The encryption device according to claim 1, wherein the encryption control part further controls whether the communication data is to be encrypted by the one-time pad encrypting part, or the block-encrypting part, depending on the remaining bit count of the one-time pad cipher key stored in a destination terminal of the communication data.

5. The encryption device according claim 1, the circuitry being further configured to provide:
a one-time pad cipher key expansion part which expands the bit count of the one-time pad cipher key stored in the one-time pad cipher key storage part by a method shared in advance with a destination terminal of the communication data, when the one-time pad cipher key stored in the one-time pad cipher key storage part becomes smaller than a predetermined second bit count.

6. The encryption device according to claim 5, wherein the one-time pad cipher key expansion part stops expanding the one-time pad cipher key when a process of expanding the bit count of the one-time pad cipher key is executed a number of times equal to or larger than a predetermined number of times.

7. The encryption device according to claim 5,
wherein the one-time pad cipher key expansion part expands the bit count of the one-time pad cipher key by a method of inserting a random value at every predetermined bit in the one-time pad cipher key stored in the one-time pad cipher key storage part.

8. The encryption device according claim 5,
wherein the one-time pad cipher key expansion part treats, as a new one-time pad cipher key, a random number value generated by a calculation method of a predetermined random number generating function that takes as input the one-time pad cipher key stored in the one-time pad cipher key storage part.

9. The encryption device according claim 1, the circuitry being further configured to provide:
a cipher key conversion part which generates a block-cipher key out of the one-time pad cipher key stored in the one-time pad cipher key storage part, by a method shared in advance with a destination terminal of the communication data,
wherein the block-cipher key storage part stores the block-cipher key generated by the cipher key conversion part.

10. The encryption device according to claim 1,
wherein the block-cipher key storage part stores a plurality of block-cipher keys,
the circuitry is further configured to provide:
a block-cipher key renewal part which deletes a used block-cipher key employed by the block-encrypting part for encryption, from the block-cipher key storage part.

11. The encryption device according to claim 1, the circuitry being further configured to provide:
a block-cipher key generating part which generates a new block-cipher key out of the block-cipher key stored in the block-cipher key storage part, by a method shared in advance with a destination terminal of the communication data.

12. The encryption device according to claim 1,
wherein when the block-encrypting part is to perform encryption, the encryption control part determines which block-cipher key is to be used with a destination terminal of the communication data, and causes the block-encrypting part to perform encryption using the block-cipher key determined.

13. The encryption device according claim 1,
wherein the one-time pad cipher key storage part comprises a non-volatile storage device which stores the one-time pad cipher key, and
wherein the one-time pad encrypting part copies the one-time pad cipher key from the one-time pad cipher key storage part to a volatile storage device, deletes the one-time pad cipher key, being the original, from the one-time pad cipher key storage part, and then encrypts the communication data by using the one-time pad cipher key copied in the volatile storage device.

14. The encryption device according claim 1, the circuitry being further configured to provide:
a notification part which, when the encryption control part switches a cryptosystem employed, notifies a user that the cryptosystem is switched.

15. An encryption system comprising an encryption device and a decryption device,
wherein the encryption device includes:
circuitry configured to provide:
a one-time pad cipher key storage part which stores a one-time pad cipher key formed of a plurality of bits and used in a one-time pad cipher;
a one-time pad encrypting part which encrypts communication data by the one-time pad cipher by sequentially using part of the one-time pad cipher key stored in the one-time pad cipher key storage part, to generate encrypted data;
a block-cipher key storage part which stores a block-cipher key used in a block cipher;
a block-encrypting part which encrypts communication data by the block cipher by using the block-cipher key stored in the block-cipher key storage part, to generate encrypted data; and
an encryption control part which controls whether the communication data is to be encrypted by the one-time pad encrypting part, or by the block-encrypting part, depending on a remaining bit count of the one-time pad cipher key stored in the one-time pad cipher key storage part, and notifies to the decryption device a message indicating which one of the one-time pad encrypting part and the block-encrypting part is to perform encryption, and
wherein the decryption device includes:
circuitry configured to provide:
a one-time pad decipher key storage part which stores a one-time pad decipher key formed of a plurality of bits and used in the one-time pad cipher;
a one-time pad decrypting part which decrypts encrypted data by the one-time pad cipher by sequentially using part of the one-time pad decipher key stored in the one-time pad decipher key storage part, to generate communication data;
a block-decipher key storage part which stores a block-decipher key used in the block cipher;
a block-decrypting part which decrypts encrypted data by the block cipher by using the block-decipher key stored in the block-decipher key storage part, to generate communication data; and
a decryption control part which controls whether the encrypted data is to be decrypted by the one-time pad decrypting part, or by the block-decrypting part, in accordance with a message notified by the encryption control part.

16. An encryption method comprising:
a one-time pad encrypting step, by a processing device, of encrypting communication data by a one-time pad cipher by sequentially using part of a one-time pad cipher key formed of a plurality of bits and stored in a storage device, to generate encrypted data;
a block-encrypting step, by the processing device, of encrypting the communication data by a block cipher by using a block-cipher key stored in the storage device, to generate encrypted data; and
an encryption control step, by the processing device, of controlling whether the communication data is to be encrypted in the one-time pad encrypting step by the one-time pad cipher, or in the block-encrypting step by the block cipher, depending on a remaining bit count of the one-time pad cipher key stored in the storage device,
wherein when the communication data is sequentially encrypted in the one-time pad encrypting step in units of predetermined unitary data, if the bit count of the one-time pad cipher key stored in the storage device becomes smaller than a bit count of the unitary data to be encrypted next, the method includes performing switching so that the block-encrypting part encrypts the communication data.

17. A non-transitory computer readable medium storing an encryption program which causes a computer to execute a method comprising:

a one-time pad encrypting process of encrypting communication data by a one-time pad cipher by sequentially using part of a one-time pad cipher key formed of a plurality of bits and stored in a storage device, to generate encrypted data;

a block-encrypting process of encrypting the communication data by a block cipher by using a block-cipher key stored in the storage device, to generate encrypted data; and an encryption control process of controlling whether the communication data is to be encrypted in the one-time pad encrypting process by the one-time pad cipher, or in the block-encrypting process by the block cipher, depending on a remaining bit count of the one-time pad cipher key stored in the storage device, wherein when the communication data is sequentially encrypted in the one-time pad encrypting process in units of predetermined unitary data, if the bit count of the one-time pad cipher key stored in the storage device becomes smaller than a bit count of the unitary data to be encrypted next, the method includes performing switching so that the block-encrypting part encrypts the communication data.

* * * * *